US012425197B2

(12) United States Patent
Li

(10) Patent No.: US 12,425,197 B2
(45) Date of Patent: Sep. 23, 2025

(54) GENERATION OF A CRYPTOGRAPHY KEY FOR A ROBOTIC GARDEN TOOL

(71) Applicant: TECHTRONIC CORDLESS GP, Anderson, SC (US)

(72) Inventor: Shing Hin Li, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 246 days.

(21) Appl. No.: 18/357,642

(22) Filed: Jul. 24, 2023

(65) Prior Publication Data

US 2024/0039708 A1 Feb. 1, 2024

Related U.S. Application Data

(60) Provisional application No. 63/393,352, filed on Jul. 29, 2022.

(51) Int. Cl.
*H04L 9/08* (2006.01)
(52) U.S. Cl.
CPC .......... *H04L 9/0838* (2013.01); *H04L 9/0825* (2013.01)
(58) Field of Classification Search
CPC ............................ H04L 9/0838; H04L 9/0825
USPC .......................................................... 380/44
See application file for complete search history.

(56) References Cited

U.S. PATENT DOCUMENTS

| 923,312 A | 6/1909 | Alexanderson |
|---|---|---|
| 2,511,124 A | 6/1950 | Phelps |
| 2,539,779 A | 1/1951 | Grosso |
| 2,701,942 A | 2/1955 | Caldwell, Jr. et al. |
| 2,751,030 A | 6/1956 | Null |
| 2,914,902 A | 12/1959 | Beymer |
| 3,057,140 A | 10/1962 | Amos et al. |
| 3,147,662 A | 9/1964 | Snook |
| 3,311,738 A | 3/1967 | Makow |

(Continued)

FOREIGN PATENT DOCUMENTS

| AU | 2006100911 A4 | 11/2006 |
|---|---|---|
| AU | 2011239326 A1 | 11/2011 |

(Continued)

OTHER PUBLICATIONS

US 8,272,092 B2, 09/2012, Schnittman et al. (withdrawn)

(Continued)

*Primary Examiner* — Moeen Khan
(74) *Attorney, Agent, or Firm* — Michael Best & Friedrich LLP

(57) ABSTRACT

A communication system includes an external device and a robotic garden tool. The external device is configured to generate a first key pair including a first private key for a robotic garden tool and a first public key for a server device. The external device transmits the first private key to the robotic garden tool, and transmits the first public key to the server device. The robotic garden tool is configured to receive an encrypted first instruction from the server device. The encrypted first instruction was encrypted by the server device using the first public key. The robotic garden tool is configured to decrypt the encrypted first instruction using the first private key to generate a decrypted first instruction. The robotic garden tool is configured to control operation of the robotic garden tool in accordance with the decrypted first instruction.

16 Claims, 7 Drawing Sheets

(56) References Cited

U.S. PATENT DOCUMENTS

| | | |
|---|---|---|
| 3,393,598 A | 7/1968 | Bettinger |
| 3,500,622 A | 3/1970 | Bowen |
| 3,570,227 A | 3/1971 | Bellinger |
| 3,612,574 A | 10/1971 | Klopfer et al. |
| 3,680,295 A | 8/1972 | Rutherford |
| 3,776,327 A | 12/1973 | Klopfer et al. |
| 4,065,913 A | 1/1978 | Fisher et al. |
| 4,126,990 A | 11/1978 | Fisher et al. |
| 4,126,991 A | 11/1978 | Gobin et al. |
| 4,165,597 A | 8/1979 | Scanland et al. |
| 4,205,510 A | 6/1980 | Raniero |
| 4,268,964 A | 5/1981 | Moore |
| 4,306,375 A | 12/1981 | Goldfarb et al. |
| 4,333,202 A | 6/1982 | Block |
| 4,351,132 A | 9/1982 | Molin |
| 4,468,884 A | 9/1984 | Goldfarb et al. |
| 4,492,058 A | 1/1985 | Goldfarb et al. |
| 4,511,343 A | 4/1985 | Goldfarb et al. |
| 4,522,606 A | 6/1985 | Goldfarb et al. |
| 4,547,166 A | 10/1985 | Goldfarb et al. |
| 4,591,347 A | 5/1986 | Goldfarb et al. |
| 4,596,412 A | 6/1986 | Everett et al. |
| 4,627,563 A | 12/1986 | Meyer |
| 4,652,247 A | 3/1987 | Goldfarb et al. |
| 4,673,370 A | 6/1987 | Goldfarb et al. |
| 4,693,656 A | 9/1987 | Guthrie |
| 4,787,794 A | 11/1988 | Guthrie |
| 4,826,066 A | 5/1989 | Koester et al. |
| 4,902,260 A | 2/1990 | Im |
| 4,916,813 A | 4/1990 | Elia |
| 4,951,985 A | 8/1990 | Pong et al. |
| 4,958,068 A | 9/1990 | Pong et al. |
| 4,962,453 A | 10/1990 | Pong, Jr. et al. |
| 4,964,265 A | 10/1990 | Young |
| 4,968,878 A | 11/1990 | Pong et al. |
| 5,024,728 A | 6/1991 | Morita et al. |
| 5,025,969 A | 6/1991 | Koester et al. |
| 5,323,593 A | 6/1994 | Cline et al. |
| 5,363,633 A | 11/1994 | Masaru |
| 5,402,110 A | 3/1995 | Oliver et al. |
| 5,406,778 A | 4/1995 | Lamb et al. |
| 5,507,137 A | 4/1996 | Norris |
| 5,540,037 A | 7/1996 | Lamb et al. |
| 5,548,278 A | 8/1996 | Oliver et al. |
| 5,553,445 A | 9/1996 | Lamb et al. |
| 5,561,972 A | 10/1996 | Rolfe |
| 5,572,856 A | 11/1996 | Ku |
| 5,577,868 A | 11/1996 | Chen |
| 5,703,569 A | 12/1997 | Oliver et al. |
| 5,785,480 A | 7/1998 | Difeo |
| 5,821,731 A | 10/1998 | Kuki et al. |
| 5,850,135 A | 12/1998 | Kuki et al. |
| 5,916,111 A | 6/1999 | Colens |
| 5,942,869 A | 8/1999 | Katou et al. |
| 6,076,025 A | 6/2000 | Ueno et al. |
| 6,101,795 A | 8/2000 | Diekhans |
| 6,212,917 B1 | 4/2001 | Rathbun |
| 6,255,793 B1 | 7/2001 | Peless et al. |
| 6,300,737 B1 | 10/2001 | Bergvall et al. |
| 6,321,515 B1 | 11/2001 | Colens |
| D451,931 S | 12/2001 | Abramson et al. |
| 6,338,013 B1 | 1/2002 | Ruffner |
| 6,339,735 B1 | 1/2002 | Peless et al. |
| 6,417,641 B2 | 7/2002 | Peless et al. |
| 6,442,845 B2 | 9/2002 | Wheeler et al. |
| 6,443,509 B1 | 9/2002 | Levin et al. |
| 6,460,253 B1 | 10/2002 | Wheeler et al. |
| 6,465,982 B1 | 10/2002 | Bergvall et al. |
| 6,481,515 B1 | 11/2002 | Kirkpatrick et al. |
| 6,493,613 B2 | 12/2002 | Peless et al. |
| 6,502,017 B2 | 12/2002 | Ruffner |
| 6,525,509 B1 | 2/2003 | Petersson et al. |
| 6,586,908 B2 | 7/2003 | Petersson et al. |
| 6,594,844 B2 | 7/2003 | Jones |
| 6,600,981 B2 | 7/2003 | Ruffner |
| 6,604,348 B2 | 8/2003 | Hunt |
| 6,611,738 B2 | 8/2003 | Ruffner |
| 6,615,108 B1 | 9/2003 | Peless et al. |
| 6,636,847 B1 | 10/2003 | Spires |
| 6,650,975 B2 | 11/2003 | Ruffner |
| 6,662,889 B2 | 12/2003 | De Fazio et al. |
| 6,728,607 B1 | 4/2004 | Anderson |
| 6,763,282 B2 | 7/2004 | Glenn et al. |
| 6,779,217 B2 | 8/2004 | Fisher |
| 6,809,490 B2 | 10/2004 | Jones et al. |
| 6,813,557 B2 | 11/2004 | Schmidt et al. |
| 6,850,024 B2 | 2/2005 | Peless et al. |
| 6,870,792 B2 | 3/2005 | Chiappetta |
| 6,879,878 B2 | 4/2005 | Glenn et al. |
| 6,885,912 B2 | 4/2005 | Peless et al. |
| 6,907,336 B2 | 6/2005 | Gray et al. |
| 6,934,615 B2 | 8/2005 | Flann et al. |
| 6,984,952 B2 | 1/2006 | Peless et al. |
| 7,010,425 B2 | 3/2006 | Gray et al. |
| 7,024,842 B2 | 4/2006 | Hunt et al. |
| 7,024,843 B2 | 4/2006 | Hunt et al. |
| 7,047,712 B1 | 5/2006 | Hunt et al. |
| 7,053,580 B2 | 5/2006 | Aldred |
| 7,069,111 B2 | 6/2006 | Glenn et al. |
| 7,076,348 B2 | 7/2006 | Bucher et al. |
| 7,079,923 B2 | 7/2006 | Abramson et al. |
| 7,079,943 B2 | 7/2006 | Flann et al. |
| 7,085,624 B2 | 8/2006 | Aldred et al. |
| 7,103,457 B2 | 9/2006 | Dean |
| 7,110,881 B2 | 9/2006 | Gray et al. |
| 7,114,318 B2 | 10/2006 | Poulson et al. |
| 7,117,660 B1 | 10/2006 | Colens |
| 7,133,746 B2 | 11/2006 | Abramson et al. |
| 7,146,786 B2 | 12/2006 | Brandon |
| 7,155,308 B2 | 12/2006 | Jones |
| 7,155,309 B2 | 12/2006 | Peless et al. |
| 7,166,983 B2 | 1/2007 | Jung |
| 7,167,775 B2 | 1/2007 | Abramson et al. |
| 7,173,391 B2 | 2/2007 | Jones et al. |
| 7,174,157 B2 | 2/2007 | Gassho et al. |
| 7,211,980 B1 | 5/2007 | Bruemmer et al. |
| 7,216,033 B2 | 5/2007 | Flann et al. |
| 7,227,334 B2 | 6/2007 | Yang et al. |
| 7,228,214 B2 | 6/2007 | Flann et al. |
| 7,233,683 B2 | 6/2007 | Han et al. |
| 7,242,791 B2 | 7/2007 | Han et al. |
| 7,286,902 B2 | 10/2007 | Kim et al. |
| D559,867 S | 1/2008 | Abramson |
| 7,332,890 B2 | 2/2008 | Cohen et al. |
| 7,349,759 B2 | 3/2008 | Peless et al. |
| 7,363,994 B1 | 4/2008 | Defazio et al. |
| 7,369,460 B2 | 5/2008 | Chiappetta et al. |
| 7,369,924 B2 | 5/2008 | Han et al. |
| 7,388,343 B2 | 6/2008 | Jones et al. |
| D573,610 S | 7/2008 | Abramson |
| 7,395,648 B1 | 7/2008 | Silbernagel et al. |
| 7,418,328 B2 | 8/2008 | Romig |
| 7,429,843 B2 | 9/2008 | Jones et al. |
| 7,430,455 B2 | 9/2008 | Casey et al. |
| 7,444,214 B2 | 10/2008 | Cho et al. |
| 7,469,525 B2 | 12/2008 | Zeigler et al. |
| 7,474,941 B2 | 1/2009 | Kim et al. |
| 7,480,958 B2 | 1/2009 | Song et al. |
| 7,480,960 B2 | 1/2009 | Kim |
| 7,497,053 B2 | 3/2009 | Nicolet |
| 7,499,774 B2 | 3/2009 | Barrett et al. |
| 7,499,775 B2 | 3/2009 | Filippov et al. |
| 7,499,776 B2 | 3/2009 | Allard et al. |
| 7,499,804 B2 | 3/2009 | Svendsen et al. |
| 7,505,848 B2 | 3/2009 | Flann et al. |
| 7,539,557 B2 | 5/2009 | Yamauchi |
| 7,568,873 B2 | 8/2009 | Rambo |
| 7,574,282 B2 | 8/2009 | Petersson et al. |
| 7,577,499 B2 | 8/2009 | Sun et al. |
| 7,587,260 B2 | 9/2009 | Bruemmer et al. |
| 7,590,413 B2 | 9/2009 | May |
| 7,596,934 B2 | 10/2009 | Waesche et al. |
| 7,610,122 B2 | 10/2009 | Anderson |
| 7,610,123 B2 | 10/2009 | Han et al. |

(56) References Cited

U.S. PATENT DOCUMENTS

| | | |
|---|---|---|
| 7,613,543 B2 | 11/2009 | Petersson et al. |
| 7,614,835 B2 | 11/2009 | Kitamura |
| 7,617,890 B2 | 11/2009 | Romig |
| 7,647,144 B2 | 1/2010 | Haegermarck |
| D610,072 S | 2/2010 | Wallet et al. |
| 7,663,333 B2 | 2/2010 | Jones et al. |
| 7,688,676 B2 | 3/2010 | Chiappetta et al. |
| 7,690,066 B2 | 4/2010 | Stoltz et al. |
| D615,920 S | 5/2010 | Kline et al. |
| 7,707,812 B2 | 5/2010 | Cheung |
| 7,720,572 B2 | 5/2010 | Ziegler et al. |
| 7,729,801 B2 | 6/2010 | Abramson |
| 7,730,705 B2 | 6/2010 | Kubinski |
| 7,769,490 B2 | 8/2010 | Abramson et al. |
| 7,787,989 B2 | 8/2010 | Colens |
| 7,792,607 B2 | 9/2010 | Han et al. |
| 7,801,645 B2 | 9/2010 | Taylor et al. |
| 7,805,220 B2 | 9/2010 | Taylor et al. |
| 7,805,676 B2 | 9/2010 | Schemers et al. |
| 7,805,918 B2 | 10/2010 | Silbernagel et al. |
| D628,145 S | 11/2010 | Vaidya |
| 7,840,210 B2 | 11/2010 | May |
| 7,843,431 B2 | 11/2010 | Robbins et al. |
| 7,844,396 B2 | 11/2010 | Zeitzew |
| 7,853,373 B2 | 12/2010 | Traster et al. |
| 7,876,927 B2 | 1/2011 | Han et al. |
| 7,885,738 B2 | 2/2011 | Park et al. |
| 7,908,834 B2 | 3/2011 | Keski-Luopa |
| 7,929,504 B2 | 4/2011 | Wentink et al. |
| 7,953,526 B2 | 5/2011 | Durkos et al. |
| 7,957,837 B2 | 6/2011 | Ziegler et al. |
| 7,957,850 B2 | 6/2011 | Anderson |
| 7,958,709 B2 | 6/2011 | Coleman et al. |
| 7,958,712 B2 | 6/2011 | Cheung |
| 7,979,175 B2 | 7/2011 | Allard et al. |
| 7,992,251 B2 | 8/2011 | Chung et al. |
| 8,020,657 B2 | 9/2011 | Allard et al. |
| 8,022,667 B2 | 9/2011 | Anderson |
| 8,031,086 B2 | 10/2011 | Thacher et al. |
| 8,046,103 B2 | 10/2011 | Abramson et al. |
| 8,065,866 B2 | 11/2011 | Tamas et al. |
| 8,078,338 B2 | 12/2011 | Pack et al. |
| 8,079,433 B2 | 12/2011 | Teague et al. |
| D652,431 S | 1/2012 | Näslund |
| 8,091,105 B2 | 1/2012 | Lee |
| 8,106,626 B2 | 1/2012 | Li et al. |
| 8,107,318 B2 | 1/2012 | Chiappetta et al. |
| 8,108,092 B2 | 1/2012 | Phillips et al. |
| 8,121,730 B2 | 2/2012 | Sung et al. |
| D656,163 S | 3/2012 | Johansson et al. |
| 8,135,498 B2 | 3/2012 | Hyung et al. |
| 8,150,574 B2 | 4/2012 | Han et al. |
| 8,195,333 B2 | 6/2012 | Ziegler et al. |
| 8,195,342 B2 | 6/2012 | Anderson |
| 8,195,358 B2 | 6/2012 | Anderson |
| 8,199,109 B2 | 6/2012 | Robbins et al. |
| 8,200,428 B2 | 6/2012 | Anderson |
| 8,208,907 B2 | 6/2012 | May |
| 8,209,053 B2 | 6/2012 | Kim et al. |
| 8,224,500 B2 | 7/2012 | Anderson |
| 8,224,516 B2 | 7/2012 | Anderson |
| 8,229,618 B2 | 7/2012 | Tolstedt et al. |
| 8,234,010 B2 | 7/2012 | Thompson et al. |
| 8,234,848 B2 | 8/2012 | Messina et al. |
| 8,237,389 B2 | 8/2012 | Fitch et al. |
| 8,239,992 B2 | 8/2012 | Schnittman et al. |
| 8,255,092 B2 | 8/2012 | Phillips et al. |
| 8,271,132 B2 | 9/2012 | Nielsen et al. |
| 8,292,007 B2 | 10/2012 | Defazio et al. |
| 8,295,125 B2 | 10/2012 | Chiappetta et al. |
| 8,295,979 B2 | 10/2012 | Thacher et al. |
| 8,297,032 B2 | 10/2012 | Ninomiya et al. |
| 8,297,903 B2 | 10/2012 | Hohmann et al. |
| 8,306,659 B2 | 11/2012 | Abramson et al. |
| 8,311,674 B2 | 11/2012 | Abramson |
| 8,326,469 B2 | 12/2012 | Phillips et al. |
| 8,336,282 B2 | 12/2012 | Messina et al. |
| 8,340,438 B2 | 12/2012 | Anderson |
| 8,347,444 B2 | 1/2013 | Schnittman et al. |
| 8,350,810 B2 | 1/2013 | Robbins et al. |
| 8,352,113 B2 | 1/2013 | Johnson et al. |
| 8,370,985 B2 | 2/2013 | Schnittman et al. |
| 8,390,251 B2 | 3/2013 | Cohen et al. |
| 8,392,044 B2 | 3/2013 | Thompson et al. |
| 8,392,065 B2 | 3/2013 | Tolstedt et al. |
| 8,396,592 B2 | 3/2013 | Jones et al. |
| 8,396,597 B2 | 3/2013 | Anderson |
| 8,396,611 B2 | 3/2013 | Phillips et al. |
| D679,294 S | 4/2013 | Tajik et al. |
| D679,295 S | 4/2013 | Tajik et al. |
| 8,412,377 B2 | 4/2013 | Casey et al. |
| 8,428,776 B2 | 4/2013 | Letsky |
| 8,433,468 B2 | 4/2013 | Johnson et al. |
| 8,438,695 B2 | 5/2013 | Gilbert, Jr. et al. |
| 8,442,700 B2 | 5/2013 | Anderson |
| 8,447,440 B2 | 5/2013 | Phillips et al. |
| 8,447,454 B2 | 5/2013 | Biber et al. |
| 8,461,803 B2 | 6/2013 | Cohen et al. |
| 8,463,438 B2 | 6/2013 | Jones et al. |
| 8,467,928 B2 | 6/2013 | Anderson |
| 8,471,133 B1 | 6/2013 | Lin |
| 8,473,187 B2 | 6/2013 | Kammel et al. |
| 8,476,867 B2 | 7/2013 | Li et al. |
| 8,478,442 B2 | 7/2013 | Casey et al. |
| 8,498,788 B2 | 7/2013 | Kondekar |
| D688,276 S | 8/2013 | Näslund |
| 8,508,329 B2 | 8/2013 | Veenstra |
| 8,521,329 B2 | 8/2013 | Park et al. |
| 8,532,821 B2 | 9/2013 | Ko |
| 8,532,822 B2 | 9/2013 | Abramson et al. |
| 8,560,145 B2 | 10/2013 | Anderson |
| 8,565,920 B2 | 10/2013 | Casey et al. |
| 8,572,266 B2 | 10/2013 | Larocca |
| 8,577,517 B2 | 11/2013 | Phillips et al. |
| 8,577,538 B2 | 11/2013 | Lenser et al. |
| 8,594,842 B2 | 11/2013 | Abramson |
| 8,599,645 B2 | 12/2013 | Chiappetta et al. |
| 8,619,141 B2 | 12/2013 | Anderson |
| 8,634,960 B2 | 1/2014 | Sandin et al. |
| 8,635,015 B2 | 1/2014 | Anderson |
| 8,655,539 B2 | 2/2014 | Yoo et al. |
| 8,660,879 B2 | 2/2014 | Machtelinck |
| 8,666,550 B2 | 3/2014 | Anderson et al. |
| 8,666,554 B2 | 3/2014 | Anderson |
| 8,666,587 B2 | 3/2014 | Anderson |
| 8,671,656 B2 | 3/2014 | Paden |
| 8,676,378 B2 | 3/2014 | Tian et al. |
| 8,706,339 B2 | 4/2014 | Thompson et al. |
| 8,712,623 B2 | 4/2014 | Sato et al. |
| 8,725,316 B2 | 5/2014 | Thompson et al. |
| 8,726,454 B2 | 5/2014 | Gilbert, Jr. et al. |
| 8,731,295 B2 | 5/2014 | Schepelmann et al. |
| 8,739,057 B2 | 5/2014 | Cheong et al. |
| 8,744,626 B2 | 6/2014 | Johnson et al. |
| 8,744,663 B2 | 6/2014 | Sato et al. |
| 8,749,196 B2 | 6/2014 | Cohen et al. |
| 8,760,397 B2 | 6/2014 | Robbins et al. |
| 8,761,935 B2 | 6/2014 | Casey et al. |
| 8,781,627 B2 | 7/2014 | Sandin et al. |
| 8,788,092 B2 | 7/2014 | Casey et al. |
| 8,818,567 B2 | 8/2014 | Anderson |
| 8,818,602 B2 | 8/2014 | Yamamura et al. |
| 8,838,274 B2 | 9/2014 | Jones et al. |
| 8,838,291 B2 | 9/2014 | Jägenstedt et al. |
| 8,839,477 B2 | 9/2014 | Schnittman et al. |
| 8,843,244 B2 | 9/2014 | Phillips et al. |
| 8,854,001 B2 | 10/2014 | Cohen et al. |
| 8,856,150 B2 | 10/2014 | Machtelinck |
| 8,868,237 B2 | 10/2014 | Sandin et al. |
| 8,869,337 B2 | 10/2014 | Sumonthee |
| 8,869,369 B1 | 10/2014 | Roach |
| 8,874,269 B2 | 10/2014 | Biber et al. |
| 8,874,300 B2 | 10/2014 | Allard et al. |
| D718,339 S | 11/2014 | Damshak et al. |

(56) References Cited

U.S. PATENT DOCUMENTS

| | | |
|---|---|---|
| D718,340 S | 11/2014 | Damshak et al. |
| D718,341 S | 11/2014 | Gur et al. |
| 8,892,352 B2 | 11/2014 | Petereit et al. |
| D718,793 S | 12/2014 | Gur et al. |
| 8,911,192 B2 | 12/2014 | Hohmann et al. |
| 8,918,241 B2 | 12/2014 | Chen et al. |
| 8,925,667 B2 | 1/2015 | Chen |
| 8,930,023 B2 | 1/2015 | Gutmann et al. |
| 8,930,024 B2 | 1/2015 | Abramson |
| 8,938,318 B2 | 1/2015 | Bergström et al. |
| 8,942,862 B2 | 1/2015 | Markusson et al. |
| 8,954,193 B2 | 2/2015 | Sandin et al. |
| 8,958,911 B2 | 2/2015 | Wong et al. |
| 8,958,939 B2 | 2/2015 | Einecke et al. |
| 8,965,578 B2 | 2/2015 | Versteeg et al. |
| 8,989,946 B2 | 3/2015 | Anderson |
| 8,989,972 B2 | 3/2015 | Anderson |
| 8,996,171 B2 | 3/2015 | Anderson et al. |
| 8,996,177 B2 | 3/2015 | Coenen |
| D729,280 S | 5/2015 | Näslund et al. |
| 9,021,777 B2 | 5/2015 | Johnson et al. |
| 9,026,299 B2 | 5/2015 | Johnson et al. |
| 9,026,302 B2 | 5/2015 | Stout et al. |
| 9,031,050 B2 | 5/2015 | Cherian et al. |
| 9,037,294 B2 | 5/2015 | Chung et al. |
| 9,043,016 B2 | 5/2015 | Filippov et al. |
| 9,043,129 B2 | 5/2015 | Bonefas et al. |
| D731,402 S | 6/2015 | Tedesco et al. |
| 9,043,952 B2 | 6/2015 | Sandin et al. |
| 9,043,953 B2 | 6/2015 | Sandin et al. |
| 9,072,218 B2 | 7/2015 | Johnson et al. |
| 9,072,219 B2 | 7/2015 | Da Rocha et al. |
| 9,079,303 B2 | 7/2015 | Abramson et al. |
| 9,093,868 B2 | 7/2015 | Baxter |
| 9,104,204 B2 | 8/2015 | Jones et al. |
| 9,104,206 B2 | 8/2015 | Biber et al. |
| 9,110,471 B2 | 8/2015 | Pack et al. |
| 9,113,595 B2 | 8/2015 | Roth et al. |
| 9,119,341 B2 | 9/2015 | Jägenstedt |
| 9,137,943 B2 | 9/2015 | Einecke et al. |
| 9,144,193 B2 | 9/2015 | Paden |
| 9,182,763 B2 | 11/2015 | Park et al. |
| 9,186,800 B2 | 11/2015 | Shin et al. |
| 9,188,980 B2 | 11/2015 | Anderson |
| 9,188,983 B2 | 11/2015 | Stout et al. |
| 9,195,256 B2 | 11/2015 | Robbins et al. |
| D745,897 S | 12/2015 | Mehra et al. |
| 9,213,934 B1 | 12/2015 | Versteeg et al. |
| 9,215,957 B2 | 12/2015 | Cohen et al. |
| 9,223,312 B2 | 12/2015 | Goel et al. |
| 9,232,692 B2 | 1/2016 | Björn et al. |
| 9,235,214 B2 | 1/2016 | Anderson |
| 9,236,637 B2 | 1/2016 | Anderson |
| 9,241,441 B2 | 1/2016 | Björn et al. |
| D748,568 S | 2/2016 | Helin et al. |
| 9,258,942 B2 | 2/2016 | Biber et al. |
| 9,268,331 B2 | 2/2016 | Abramson et al. |
| 9,276,419 B2 | 3/2016 | Borinato et al. |
| 9,278,690 B2 | 3/2016 | Smith |
| 9,301,444 B2 | 4/2016 | Campbell et al. |
| D757,637 S | 5/2016 | Horowitz |
| 9,327,407 B2 | 5/2016 | Jones et al. |
| 9,335,767 B2 | 5/2016 | Jang et al. |
| 9,338,130 B2 | 5/2016 | Von Huben et al. |
| 9,348,897 B2 | 5/2016 | Shoham et al. |
| 9,349,187 B2 | 5/2016 | Schepelmann et al. |
| D758,455 S | 6/2016 | Maibach et al. |
| D759,577 S | 6/2016 | Wang et al. |
| 9,357,699 B2 | 6/2016 | Elonsson |
| 9,363,945 B2 | 6/2016 | Jägenstedt et al. |
| 9,375,842 B2 | 6/2016 | Shamlian et al. |
| 9,376,027 B2 | 6/2016 | Harris |
| D760,806 S | 7/2016 | Cmich et al. |
| 9,380,742 B2 | 7/2016 | Biber et al. |
| 9,405,294 B2 | 8/2016 | Jägenstedt et al. |
| 9,412,515 B2 | 8/2016 | Hyde et al. |
| 9,419,453 B2 | 8/2016 | Andersson et al. |
| 9,420,741 B2 | 8/2016 | Balutis et al. |
| 9,421,879 B2 | 8/2016 | Pastoor et al. |
| 9,426,946 B2 | 8/2016 | Fisher |
| 9,429,950 B2 | 8/2016 | Sjöholm |
| 9,436,185 B2 | 9/2016 | Schnittman |
| 9,439,348 B2 | 9/2016 | Biber et al. |
| 9,439,367 B2 | 9/2016 | Abhyanker |
| 9,440,350 B2 | 9/2016 | Mou et al. |
| 9,440,354 B2 | 9/2016 | Gutmann et al. |
| 9,446,521 B2 | 9/2016 | Casey et al. |
| 9,452,525 B2 | 9/2016 | Ziegler et al. |
| 9,452,685 B2 | 9/2016 | Hyde et al. |
| D769,180 S | 10/2016 | Wang et al. |
| 9,456,545 B2 | 10/2016 | Biber |
| 9,457,677 B2 | 10/2016 | Hyde et al. |
| 9,463,704 B2 | 10/2016 | Hyde et al. |
| 9,471,063 B2 | 10/2016 | Ouyang |
| 9,480,201 B2 | 11/2016 | Maruyama et al. |
| 9,483,055 B2 | 11/2016 | Johnson et al. |
| 9,491,904 B2 | 11/2016 | Jägenstedt et al. |
| 9,497,901 B2 | 11/2016 | Willgert |
| 9,505,140 B1 | 11/2016 | Fay et al. |
| 9,510,505 B2 | 12/2016 | Halloran et al. |
| 9,516,806 B2 | 12/2016 | Yamauchi et al. |
| D776,169 S | 1/2017 | Cmich et al. |
| 9,532,688 B1 | 1/2017 | Ebrahimi Afrouzi et al. |
| 9,538,702 B2 | 1/2017 | Balutis et al. |
| 9,543,680 B2 | 1/2017 | Elonsson |
| 9,545,032 B2 | 1/2017 | Baer et al. |
| 9,550,294 B2 | 1/2017 | Cohen et al. |
| 9,554,508 B2 | 1/2017 | Balutis et al. |
| 9,559,461 B1 | 1/2017 | Diehr |
| 9,560,800 B2 | 2/2017 | Reichen et al. |
| 9,563,204 B2 | 2/2017 | Willgert |
| 9,573,275 B2 | 2/2017 | Reigo et al. |
| D781,349 S | 3/2017 | Cmich |
| D781,926 S | 3/2017 | Al-hashimi et al. |
| 9,586,563 B2 | 3/2017 | Kanai et al. |
| 9,590,862 B2 | 3/2017 | Larocca |
| 9,606,541 B2 | 3/2017 | Abramson |
| 9,622,399 B2 | 4/2017 | Kremmer et al. |
| 9,623,557 B2 | 4/2017 | Gutmann et al. |
| 9,630,319 B2 | 4/2017 | Vicenti |
| 9,632,489 B2 | 4/2017 | Biber et al. |
| 9,699,964 B2 | 7/2017 | Roth et al. |
| 9,701,020 B1 | 7/2017 | Ebrahimi Afrouzi |
| 9,711,767 B2 | 7/2017 | Juenger et al. |
| 9,713,302 B2 | 7/2017 | Sandin et al. |
| 9,713,303 B2 | 7/2017 | Jägenstedt et al. |
| D794,089 S | 8/2017 | Maibach et al. |
| 9,717,175 B2 | 8/2017 | Fay, II et al. |
| 9,720,417 B2 | 8/2017 | Reigo et al. |
| 9,723,782 B2 | 8/2017 | Roth et al. |
| 9,736,981 B2 | 8/2017 | Roth et al. |
| 9,740,210 B2 | 8/2017 | Sjöholm |
| D796,555 S | 9/2017 | Landberg et al. |
| D797,530 S | 9/2017 | Cmich |
| 9,750,183 B2 | 9/2017 | Haun |
| 9,766,627 B2 | 9/2017 | Jägenstedt et al. |
| D799,555 S | 10/2017 | Cmich |
| 9,785,148 B2 | 10/2017 | Yun |
| 9,788,481 B2 | 10/2017 | Das et al. |
| 9,788,483 B2 | 10/2017 | Roth et al. |
| 9,791,860 B2 | 10/2017 | Phillips et al. |
| 9,804,604 B2 | 10/2017 | Mattsson et al. |
| 9,807,925 B2 | 11/2017 | Johnson |
| 9,807,930 B1 | 11/2017 | Lydon et al. |
| 9,817,398 B2 | 11/2017 | Yamamura et al. |
| 9,820,433 B2 | 11/2017 | Borinato |
| 9,826,678 B2 | 11/2017 | Balutis et al. |
| 9,829,891 B2 | 11/2017 | Smith et al. |
| 9,841,768 B2 | 12/2017 | Hiramatsu et al. |
| 9,844,876 B2 | 12/2017 | Chung et al. |
| 9,848,529 B2 | 12/2017 | Franzius et al. |
| 9,848,532 B2 | 12/2017 | Keski-Luopa et al. |
| 9,851,718 B2 | 12/2017 | Booher |
| 9,853,468 B2 | 12/2017 | Ireland |

(56) References Cited

U.S. PATENT DOCUMENTS

| | | |
|---|---|---|
| D807,281 S | 1/2018 | Irwin et al. |
| D807,811 S | 1/2018 | Wang et al. |
| 9,854,737 B2 | 1/2018 | Yamauchi et al. |
| 9,854,956 B2 | 1/2018 | Song et al. |
| 9,857,025 B2 | 1/2018 | Gottinger et al. |
| 9,861,035 B2 | 1/2018 | Kruckeberg et al. |
| 9,872,437 B2 | 1/2018 | Markusson et al. |
| 9,874,876 B2 | 1/2018 | Shimamura |
| 9,876,370 B2 | 1/2018 | Yamamura et al. |
| D810,664 S | 2/2018 | Sgreccia et al. |
| D810,665 S | 2/2018 | Sgreccia et al. |
| 9,884,423 B2 | 2/2018 | Cohen et al. |
| 9,894,836 B2 | 2/2018 | Garton |
| 9,895,808 B2 | 2/2018 | Stout et al. |
| 9,901,028 B2 | 2/2018 | Hans |
| 9,903,947 B2 | 2/2018 | Das et al. |
| 9,924,632 B2 | 3/2018 | Chenevert et al. |
| 9,924,847 B2 | 3/2018 | Gottinger et al. |
| 9,931,007 B2 | 4/2018 | Morin et al. |
| 9,931,008 B2 | 4/2018 | Yoo et al. |
| 9,931,750 B2 | 4/2018 | Cohen et al. |
| 9,936,635 B2 | 4/2018 | Gottinger et al. |
| 9,968,024 B2 | 5/2018 | Haneda et al. |
| 9,972,098 B1 | 5/2018 | Ebrahimi Afrouzi et al. |
| 9,983,586 B2 | 5/2018 | Borinato |
| 10,011,180 B2 | 7/2018 | Hyde et al. |
| 10,021,830 B2 | 7/2018 | Doughty |
| 10,024,964 B2 | 7/2018 | Pierce et al. |
| 10,029,368 B2 | 7/2018 | Wolowelsky et al. |
| 10,031,527 B2 | 7/2018 | Björn |
| 10,034,421 B2 | 7/2018 | Doughty et al. |
| 10,035,270 B2 | 7/2018 | Fay et al. |
| 10,037,038 B2 | 7/2018 | Sandin et al. |
| 10,046,130 B2 | 8/2018 | Molden et al. |
| 10,054,924 B2 | 8/2018 | Willgert |
| 10,057,813 B1 | 8/2018 | Likar et al. |
| 10,067,232 B2 | 9/2018 | Halloran et al. |
| 10,070,764 B2 | 9/2018 | Schnittman et al. |
| 10,071,475 B2 | 9/2018 | Lin et al. |
| 10,078,336 B2 | 9/2018 | Reigo et al. |
| 10,080,326 B2 | 9/2018 | Yamamura et al. |
| D830,418 S | 10/2018 | Näslund et al. |
| 10,091,930 B2 | 10/2018 | Balutis et al. |
| 10,093,194 B2 | 10/2018 | Hyde et al. |
| 10,093,259 B2 | 10/2018 | Pan |
| 10,098,277 B2 | 10/2018 | Ouyang |
| 10,104,835 B2 | 10/2018 | Köhler et al. |
| 10,105,838 B2 | 10/2018 | Mou et al. |
| 10,108,198 B2 | 10/2018 | Björn et al. |
| D834,185 S | 11/2018 | Molden et al. |
| D834,504 S | 11/2018 | Ropars |
| D834,505 S | 11/2018 | Wang et al. |
| 10,117,379 B2 | 11/2018 | Guiet et al. |
| 10,123,479 B2 | 11/2018 | Ladd, Jr. et al. |
| 10,124,494 B2 | 11/2018 | Outa et al. |
| 10,131,057 B2 | 11/2018 | Patel et al. |
| 10,136,576 B2 | 11/2018 | Reigo |
| 10,149,430 B2 | 12/2018 | Bergström et al. |
| 10,152,062 B2 | 12/2018 | Schnittman |
| 10,157,334 B2 | 12/2018 | Schepelmann et al. |
| 10,159,180 B2 | 12/2018 | Balutis et al. |
| 10,162,359 B2 | 12/2018 | Johnson et al. |
| D837,150 S | 1/2019 | Näslund et al. |
| 10,165,725 B2 | 1/2019 | Sugumaran et al. |
| 10,172,282 B2 | 1/2019 | Svensson et al. |
| 10,178,826 B2 | 1/2019 | Jägenstedt et al. |
| 10,183,400 B2 | 1/2019 | Trigui et al. |
| 10,183,701 B2 | 1/2019 | Ebrahimi Afrouzi et al. |
| 10,185,325 B2 | 1/2019 | Reigo et al. |
| 10,201,261 B2 | 2/2019 | Tanaka et al. |
| 10,207,557 B2 | 2/2019 | Björn et al. |
| 10,212,880 B2 | 2/2019 | Cmich et al. |
| 10,238,026 B2 | 3/2019 | Köhler et al. |
| D845,877 S | 4/2019 | Geng et al. |
| 10,244,678 B2 | 4/2019 | Lydon et al. |
| 10,246,907 B2 | 4/2019 | Shen |
| 10,257,976 B2 | 4/2019 | Ladd, Jr. et al. |
| 10,259,498 B2 | 4/2019 | Jägenstedt et al. |
| 10,268,206 B2 | 4/2019 | Yamamura |
| 10,274,954 B2 | 4/2019 | Balutis et al. |
| D848,488 S | 5/2019 | Cmich |
| 10,281,912 B2 | 5/2019 | Hollister |
| 10,281,922 B2 | 5/2019 | Smith et al. |
| 10,299,431 B2 | 5/2019 | Ladd, Jr. et al. |
| 10,299,652 B2 | 5/2019 | Gilbert, Jr. et al. |
| D852,232 S | 6/2019 | Eidson et al. |
| 10,310,510 B2 | 6/2019 | Mannefred et al. |
| 10,315,306 B2 | 6/2019 | Abramson |
| 10,321,625 B2 | 6/2019 | Einecke et al. |
| 10,327,384 B2 | 6/2019 | Johansson et al. |
| D853,447 S | 7/2019 | Mehra et al. |
| D853,448 S | 7/2019 | Mehra et al. |
| D853,449 S | 7/2019 | Mehra et al. |
| 10,338,602 B2 | 7/2019 | Grufman et al. |
| 10,343,280 B1 | 7/2019 | Ebrahimi Afrouzi |
| 10,346,995 B1 | 7/2019 | Ebrahimi Afrouzi |
| 10,353,399 B2 | 7/2019 | Ebrahimi Afrouzi |
| 10,362,730 B2 | 7/2019 | Ladd, Jr. et al. |
| 10,365,661 B2 | 7/2019 | Jägenstedt et al. |
| 10,369,705 B2 | 8/2019 | Trigui et al. |
| 10,372,140 B2 | 8/2019 | Sun et al. |
| 10,375,880 B2 | 8/2019 | Morin et al. |
| 10,377,035 B2 | 8/2019 | He et al. |
| 10,379,172 B2 | 8/2019 | Kleiner et al. |
| 10,384,346 B2 | 8/2019 | Hickman et al. |
| 10,386,844 B2 | 8/2019 | Wilcox et al. |
| 10,390,483 B2 | 8/2019 | Balutis et al. |
| D858,424 S | 9/2019 | Chattopadhyay |
| 10,405,488 B2 | 9/2019 | Kamfors et al. |
| 10,425,488 B2 | 9/2019 | Larsén et al. |
| D864,256 S | 10/2019 | Eidson et al. |
| 10,426,083 B2 | 10/2019 | Doughty |
| 10,440,879 B2 | 10/2019 | Björn et al. |
| 10,442,083 B2 | 10/2019 | Wolowelsky et al. |
| 10,444,756 B2 | 10/2019 | Kamfors et al. |
| 10,444,757 B2 | 10/2019 | Dong et al. |
| 10,444,760 B2 | 10/2019 | Grufman et al. |
| 10,448,565 B2 | 10/2019 | Mannefred et al. |
| 10,454,287 B2 | 10/2019 | Yamamura et al. |
| 10,456,924 B2 | 10/2019 | Outa et al. |
| 10,459,452 B2 | 10/2019 | Eagling et al. |
| 10,462,961 B2 | 11/2019 | Tjernberg et al. |
| 10,463,215 B2 | 11/2019 | Morin et al. |
| 10,464,206 B2 | 11/2019 | Frisby et al. |
| 10,466,710 B2 | 11/2019 | Biber et al. |
| 10,485,164 B2 | 11/2019 | Letsky |
| 10,488,865 B2 | 11/2019 | Afrouzi et al. |
| 10,496,262 B1 | 12/2019 | Ebrahimi Afrouzi et al. |
| 10,500,722 B2 | 12/2019 | Vicenti |
| 10,514,701 B2 | 12/2019 | Windorfer |
| 10,517,211 B2 | 12/2019 | Öhrlund et al. |
| 10,518,651 B2 | 12/2019 | Svensson et al. |
| 10,520,113 B1 | 12/2019 | Thompson |
| 10,542,667 B2 | 1/2020 | Song et al. |
| 10,542,670 B2 | 1/2020 | Cmich et al. |
| 10,549,646 B2 | 2/2020 | Reynolds et al. |
| 10,551,844 B2 | 2/2020 | Biber et al. |
| 10,552,770 B2 | 2/2020 | Brough et al. |
| 10,555,456 B2 | 2/2020 | Borinato |
| 10,555,457 B2 | 2/2020 | Song et al. |
| 10,561,063 B2 | 2/2020 | Hasegawa et al. |
| 10,568,258 B2 | 2/2020 | Wahlgren |
| 10,571,905 B2 | 2/2020 | Yamamura |
| 10,571,928 B2 | 2/2020 | Sun et al. |
| 10,575,465 B2 | 3/2020 | Ran et al. |
| 10,575,696 B2 | 3/2020 | O'Brien et al. |
| 10,583,562 B2 | 3/2020 | Stout et al. |
| 10,588,255 B2 | 3/2020 | Song et al. |
| 10,589,418 B2 | 3/2020 | Gordon-Carroll et al. |
| 10,589,432 B2 | 3/2020 | Al Nahwi et al. |
| 10,589,433 B2 | 3/2020 | Al Nahwi et al. |
| 10,592,998 B2 | 3/2020 | Eijdenberg et al. |
| 10,594,117 B2 | 3/2020 | Song et al. |
| 10,595,459 B2 | 3/2020 | Aposhian et al. |

(56) References Cited

U.S. PATENT DOCUMENTS

| | | |
|---|---|---|
| 10,595,692 B2 | 3/2020 | Morin et al. |
| 10,598,793 B2 | 3/2020 | Öhrlund et al. |
| 10,599,154 B2 | 3/2020 | Dean et al. |
| 10,606,275 B2 | 3/2020 | Dean et al. |
| 10,606,279 B2 | 3/2020 | Grufman et al. |
| D880,532 S | 4/2020 | Gunnarsson et al. |
| D881,252 S | 4/2020 | Vestberg et al. |
| D882,640 S | 4/2020 | Estey |
| 10,609,862 B2 | 4/2020 | Wu et al. |
| 10,611,028 B1 | 4/2020 | Zhou et al. |
| 10,612,929 B2 | 4/2020 | Afrouzi et al. |
| 10,613,541 B1 | 4/2020 | Ebrahimi Afrouzi et al. |
| 10,621,537 B2 | 4/2020 | Ben-Alexander |
| D884,762 S | 5/2020 | Gunnarsson et al. |
| D884,763 S | 5/2020 | Gunnarsson et al. |
| 10,643,377 B2 | 5/2020 | Grufman et al. |
| 10,646,997 B2 | 5/2020 | Reigo et al. |
| 10,649,466 B2 | 5/2020 | Holmström et al. |
| 10,651,594 B1 | 5/2020 | Tsai et al. |
| 10,653,057 B2 | 5/2020 | Choi et al. |
| 10,653,058 B2 | 5/2020 | Yamanaka et al. |
| 10,653,282 B2 | 5/2020 | Song et al. |
| 10,656,652 B2 | 5/2020 | Dean et al. |
| D887,464 S | 6/2020 | Gunnarsson et al. |
| D887,465 S | 6/2020 | Gunnarsson et al. |
| D887,466 S | 6/2020 | Gunnarsson et al. |
| 10,670,406 B2 | 6/2020 | Eguchi et al. |
| 10,673,630 B2 | 6/2020 | Pakkan et al. |
| 10,674,659 B2 | 6/2020 | Ladd, Jr. et al. |
| 10,674,660 B2 | 6/2020 | Matsuzawa et al. |
| 10,681,863 B2 | 6/2020 | Hans et al. |
| 10,681,864 B2 | 6/2020 | Matt et al. |
| 10,691,000 B2 | 6/2020 | Du et al. |
| 10,698,417 B2 | 6/2020 | Churavy et al. |
| D889,517 S | 7/2020 | Prybor et al. |
| 10,716,258 B2 | 7/2020 | Pellenc et al. |
| 10,721,860 B2 | 7/2020 | Liljedahl |
| D892,187 S | 8/2020 | Maggard |
| 10,737,369 B2 | 8/2020 | Steinhauser et al. |
| 10,737,395 B2 | 8/2020 | Wolff et al. |
| 10,738,495 B2 | 8/2020 | Durvasula et al. |
| 10,739,769 B2 | 8/2020 | Dean et al. |
| 10,747,413 B2 | 8/2020 | Schneider et al. |
| 10,750,667 B2 | 8/2020 | Yamauchi et al. |
| 10,750,918 B2 | 8/2020 | Jung et al. |
| D896,737 S | 9/2020 | Phely |
| 10,758,100 B2 | 9/2020 | Cohen et al. |
| 10,765,284 B2 | 9/2020 | Song et al. |
| 10,766,147 B2 | 9/2020 | Trigui et al. |
| 10,777,000 B2 | 9/2020 | Grufman et al. |
| 10,782,705 B2 | 9/2020 | Reigo et al. |
| 10,785,907 B2 | 9/2020 | Doughty et al. |
| 10,788,832 B2 | 9/2020 | Nykamp |
| 10,791,684 B2 | 10/2020 | He et al. |
| 10,795,377 B2 | 10/2020 | Afrouzi et al. |
| 10,806,075 B2 | 10/2020 | Grufman et al. |
| 10,809,071 B2 | 10/2020 | Afrouzi et al. |
| 10,809,740 B2 | 10/2020 | Reinert et al. |
| 10,814,495 B2 | 10/2020 | Patel et al. |
| 10,820,493 B2 | 11/2020 | Ritzer et al. |
| 10,824,163 B2 | 11/2020 | Einecke et al. |
| 10,842,074 B2 | 11/2020 | Jägenstedt et al. |
| 10,843,734 B1 | 11/2020 | Ebrahimi Afrouzi et al. |
| 10,843,735 B1 | 11/2020 | Ebrahimi Afrouzi et al. |
| 10,845,481 B2 | 11/2020 | Pierce et al. |
| 10,845,804 B2 | 11/2020 | Holgersson et al. |
| D906,373 S | 12/2020 | Morin et al. |
| 10,849,267 B2 | 12/2020 | Strandberg et al. |
| 10,849,270 B2 | 12/2020 | Johansson et al. |
| 10,850,400 B2 | 12/2020 | Park |
| 10,852,735 B2 | 12/2020 | Tan et al. |
| 10,852,738 B2 | 12/2020 | Mannefred et al. |
| 10,856,467 B2 | 12/2020 | Maggard |
| 10,858,041 B2 | 12/2020 | Jägenstedt et al. |
| 10,869,432 B2 | 12/2020 | Wykman et al. |
| 10,873,194 B2 | 12/2020 | Lydon et al. |
| 10,874,045 B2 | 12/2020 | Balutis et al. |
| 10,874,049 B2 | 12/2020 | Ladd, Jr. et al. |
| 10,874,051 B2 | 12/2020 | Kasai et al. |
| 10,874,278 B2 | 12/2020 | Matt et al. |
| D908,597 S | 1/2021 | Meng et al. |
| D908,598 S | 1/2021 | Meng et al. |
| 10,882,187 B2 | 1/2021 | Li et al. |
| 10,888,046 B2 | 1/2021 | Gorenflo et al. |
| 10,890,921 B2 | 1/2021 | Gillett |
| 10,895,876 B2 | 1/2021 | Arenz et al. |
| 10,899,171 B2 | 1/2021 | Cmich |
| 10,912,253 B2 | 2/2021 | Einecke et al. |
| 10,928,833 B2 | 2/2021 | Reigo |
| 10,932,409 B2 | 3/2021 | Ingvalson et al. |
| 10,935,383 B1 | 3/2021 | Ebrahimi Afrouzi et al. |
| 10,939,611 B2 | 3/2021 | Liljedahl |
| 10,952,578 B2 | 3/2021 | Gill et al. |
| 10,959,371 B2 | 3/2021 | Zhou et al. |
| 10,966,368 B2 | 4/2021 | Desai et al. |
| 10,967,752 B2 | 4/2021 | Liu et al. |
| 10,973,168 B2 | 4/2021 | Hans et al. |
| 10,986,775 B2 | 4/2021 | Matt et al. |
| 10,986,971 B1 | 4/2021 | Ebrahimi Afrouzi |
| 10,993,598 B2 | 5/2021 | Park et al. |
| 11,003,192 B2 | 5/2021 | Dalfra et al. |
| 11,009,869 B2 | 5/2021 | Moroi et al. |
| 11,013,655 B1 | 5/2021 | Ebrahimi Afrouzi et al. |
| 11,014,460 B2 | 5/2021 | Schnittman et al. |
| 11,016,481 B2 | 5/2021 | Gustavsson et al. |
| D922,444 S | 6/2021 | Morin et al. |
| 11,019,975 B2 | 6/2021 | Jang et al. |
| 11,020,857 B2 | 6/2021 | Xiong et al. |
| 11,039,582 B2 | 6/2021 | Gilliam et al. |
| 11,039,583 B2 | 6/2021 | Gilliam et al. |
| 11,044,844 B2 | 6/2021 | Keski-luopa et al. |
| 11,048,268 B2 | 6/2021 | Ouyang |
| 11,051,449 B2 | 7/2021 | Bergh et al. |
| 11,051,671 B2 | 7/2021 | Jang et al. |
| 11,052,535 B2 | 7/2021 | Parks, II et al. |
| 11,052,540 B2 | 7/2021 | Stout et al. |
| 11,054,822 B2 | 7/2021 | Özmen |
| 11,054,836 B2 | 7/2021 | Wang et al. |
| 11,058,053 B2 | 7/2021 | Patel et al. |
| 11,064,652 B2 | 7/2021 | Matt et al. |
| 11,065,762 B2 | 7/2021 | Sakai et al. |
| 11,069,082 B1 | 7/2021 | Ebrahimi Afrouzi et al. |
| 11,071,429 B2 | 7/2021 | Jang et al. |
| 11,072,250 B2 | 7/2021 | Gilbert, Jr. et al. |
| 11,072,255 B2 | 7/2021 | Svensson et al. |
| 11,075,910 B2 | 7/2021 | Dean et al. |
| 11,076,529 B2 | 8/2021 | Chen et al. |
| 11,079,755 B2 | 8/2021 | Schlacks, IV et al. |
| 11,084,172 B2 | 8/2021 | Casey et al. |
| 11,089,732 B2 | 8/2021 | Jägenstedt et al. |
| 11,097,428 B2 | 8/2021 | Al Nahwi et al. |
| 11,099,572 B2 | 8/2021 | Cestonaro et al. |
| 11,104,006 B2 | 8/2021 | Fay et al. |
| 11,105,109 B2 | 8/2021 | Durvasula et al. |
| 11,106,215 B2 | 8/2021 | Dalfra |
| 11,109,528 B2 | 9/2021 | Strang |
| 11,109,731 B2 | 9/2021 | Jang et al. |
| 11,112,505 B2 | 9/2021 | Öhrlund et al. |
| 11,112,532 B2 | 9/2021 | Jägenstedt et al. |
| 11,115,798 B2 | 9/2021 | Beaulieu et al. |
| 11,117,264 B2 | 9/2021 | Tsai et al. |
| 11,119,496 B1 | 9/2021 | Ebrahimi Afrouzi et al. |
| 11,126,193 B2 | 9/2021 | Mannefred et al. |
| 11,134,609 B2 | 10/2021 | Willgert et al. |
| 11,140,815 B2 | 10/2021 | Matt et al. |
| 11,140,819 B2 | 10/2021 | Chen et al. |
| 11,141,034 B2 | 10/2021 | Jang et al. |
| 11,154,006 B2 | 10/2021 | Liljedahl |
| 11,154,442 B1 | 10/2021 | Dean et al. |
| 11,157,015 B2 | 10/2021 | Schnittman |
| D937,181 S | 11/2021 | Guidry |
| 11,161,235 B2 | 11/2021 | He et al. |
| 11,161,381 B2 | 11/2021 | Svensson et al. |
| 11,161,422 B2 | 11/2021 | Andriolo et al. |

(56) References Cited

U.S. PATENT DOCUMENTS

| | | | |
|---|---|---|---|
| 11,161,578 B2 | 11/2021 | Wu et al. |
| 11,163,292 B2 | 11/2021 | Adler et al. |
| 11,166,411 B2 | 11/2021 | Fuse et al. |
| 11,169,527 B2 | 11/2021 | Dalfra |
| 11,169,530 B1 | 11/2021 | Ärlig et al. |
| 11,171,497 B2 | 11/2021 | Jiao et al. |
| 11,173,594 B2 | 11/2021 | Kim |
| 11,175,374 B2 | 11/2021 | Kameyama et al. |
| 11,191,403 B2 | 12/2021 | Gill et al. |
| 11,197,414 B2 | 12/2021 | Zeiler et al. |
| 11,199,853 B1 | 12/2021 | Afrouzi et al. |
| 11,202,547 B2 | 12/2021 | Jang et al. |
| 11,215,461 B1 | 1/2022 | Ebrahimi Afrouzi et al. |
| 11,221,628 B2 | 1/2022 | Holgersson et al. |
| 11,225,228 B2 | 1/2022 | Liu et al. |
| 11,229,154 B2 | 1/2022 | Hershbarger |
| 11,231,708 B2 | 1/2022 | Hyakusawa |
| D943,638 S | 2/2022 | Rauch et al. |
| 11,235,451 B2 | 2/2022 | Bombulie |
| 11,235,472 B2 | 2/2022 | Al Nahwi et al. |
| 11,253,126 B2 | 2/2022 | Jang et al. |
| 11,260,765 B2 | 3/2022 | Namiki et al. |
| 11,269,349 B2 | 3/2022 | Shao et al. |
| 11,274,929 B1* | 3/2022 | Afrouzi ............... G06T 7/30 |
| 11,278,176 B2 | 3/2022 | Huang et al. |
| 11,278,177 B2 | 3/2022 | Lin et al. |
| 11,284,766 B2 | 3/2022 | Jang et al. |
| 11,287,821 B2 | 3/2022 | Borinato |
| 11,287,832 B2 | 3/2022 | Ebrahimi Afrouzi |
| 11,291,343 B2 | 4/2022 | Jang et al. |
| 11,292,136 B2 | 4/2022 | Wolff et al. |
| 11,298,831 B2 | 4/2022 | Tsai et al. |
| 11,300,975 B2 | 4/2022 | Dalfra et al. |
| 11,320,828 B1 | 5/2022 | Ebrahimi Afrouzi et al. |
| 11,325,590 B2 | 5/2022 | Han et al. |
| 11,340,079 B1 | 5/2022 | Ebrahimi Afrouzi et al. |
| 11,347,230 B2 | 5/2022 | Wang et al. |
| 11,351,670 B2 | 6/2022 | Wolowelsky et al. |
| 11,357,166 B2 | 6/2022 | Hahn et al. |
| 11,357,167 B2 | 6/2022 | Aposhian et al. |
| 11,378,979 B2 | 7/2022 | Zhou et al. |
| 11,380,320 B2 | 7/2022 | Duncan |
| 11,393,114 B1 | 7/2022 | Ebrahimi Afrouzi et al. |
| 11,415,998 B2 | 8/2022 | Strandberg |
| 11,464,164 B2 | 10/2022 | Cmich et al. |
| 11,596,117 B2 | 3/2023 | Koehler et al. |
| 11,614,744 B2 | 3/2023 | Ran et al. |
| 11,654,574 B2 | 5/2023 | Zhang et al. |
| 11,662,723 B2 | 5/2023 | Schlacks, IV et al. |
| 2002/0005237 A1 | 1/2002 | Musat et al. |
| 2003/0144774 A1 | 7/2003 | Trissel et al. |
| 2003/0218046 A1 | 11/2003 | Peter, Jr. |
| 2003/0236590 A1 | 12/2003 | Park et al. |
| 2004/0000823 A1 | 1/2004 | Patridge |
| 2004/0158358 A1 | 8/2004 | Anezaki et al. |
| 2004/0187457 A1 | 9/2004 | Colens |
| 2004/0190376 A1 | 9/2004 | Hulden et al. |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0236468 A1 | 11/2004 | Taylor et al. |
| 2004/0244138 A1 | 12/2004 | Taylor et al. |
| 2005/0010331 A1 | 1/2005 | Taylor et al. |
| 2005/0028346 A1 | 2/2005 | Mangone, Jr. |
| 2005/0034437 A1 | 2/2005 | McMurtry et al. |
| 2005/0039428 A1 | 2/2005 | McMurtry et al. |
| 2005/0042059 A1 | 2/2005 | Bremer |
| 2005/0060975 A1 | 3/2005 | McClymonds |
| 2005/0171637 A1 | 8/2005 | Tani et al. |
| 2005/0171644 A1 | 8/2005 | Tani |
| 2005/0273967 A1 | 12/2005 | Taylor et al. |
| 2006/0010844 A1 | 1/2006 | Angott |
| 2006/0020369 A1 | 1/2006 | Taylor et al. |
| 2006/0020370 A1 | 1/2006 | Abramson |
| 2006/0191096 A1 | 8/2006 | Sudo et al. |
| 2006/0212191 A1 | 9/2006 | Saeki |
| 2006/0217854 A1 | 9/2006 | Takenaka et al. |
| 2006/0219838 A1 | 10/2006 | Audet |
| 2007/0100496 A1 | 5/2007 | Forell |
| 2007/0119137 A1 | 5/2007 | Brandon |
| 2007/0142972 A1 | 6/2007 | Abramson et al. |
| 2007/0143949 A1 | 6/2007 | Chiu |
| 2007/0145943 A1 | 6/2007 | Sudo |
| 2007/0150109 A1 | 6/2007 | Peless et al. |
| 2007/0234698 A1 | 10/2007 | Silbernagel et al. |
| 2007/0276541 A1 | 11/2007 | Sawasaki |
| 2008/0143065 A1 | 6/2008 | Defazio et al. |
| 2008/0163117 A1 | 7/2008 | Machtelinck et al. |
| 2008/0167753 A1 | 7/2008 | Peless et al. |
| 2008/0281470 A1 | 11/2008 | Gilbert, Jr. et al. |
| 2008/0294288 A1 | 11/2008 | Yamauchi |
| 2009/0112679 A1 | 4/2009 | Machtelinck |
| 2009/0157259 A1 | 6/2009 | Han et al. |
| 2009/0182464 A1 | 7/2009 | Myeong et al. |
| 2009/0276277 A1 | 11/2009 | Vansteenkiste et al. |
| 2009/0313038 A1 | 12/2009 | Machtelinck |
| 2010/0057286 A1 | 3/2010 | Kerchner |
| 2010/0063652 A1 | 3/2010 | Anderson |
| 2010/0066587 A1 | 3/2010 | Yamauchi et al. |
| 2010/0299016 A1 | 11/2010 | Benzler et al. |
| 2011/0046784 A1 | 2/2011 | Anderson |
| 2011/0046836 A1 | 2/2011 | Anderson |
| 2011/0112713 A1 | 5/2011 | Teng et al. |
| 2011/0153172 A1 | 6/2011 | Anderson |
| 2011/0153338 A1 | 6/2011 | Anderson |
| 2011/0202307 A1 | 8/2011 | Petereit et al. |
| 2011/0208357 A1 | 8/2011 | Yamauchi |
| 2011/0295423 A1 | 12/2011 | Anderson |
| 2012/0012635 A1 | 1/2012 | Jaffe et al. |
| 2012/0029752 A1 | 2/2012 | Johnson et al. |
| 2012/0101679 A1 | 4/2012 | Anderson et al. |
| 2012/0143429 A1 | 6/2012 | Anderson |
| 2012/0215380 A1 | 8/2012 | Fouillade et al. |
| 2012/0226381 A1 | 9/2012 | Abramson et al. |
| 2012/0253581 A1 | 10/2012 | Anderson |
| 2012/0265346 A1 | 10/2012 | Gilbert, Jr. et al. |
| 2012/0303160 A1 | 11/2012 | Ziegler et al. |
| 2013/0000677 A1 | 1/2013 | Sumonthee |
| 2013/0031787 A1 | 2/2013 | Kamiya et al. |
| 2013/0031788 A1 | 2/2013 | Ohno |
| 2013/0098402 A1 | 4/2013 | Yoon et al. |
| 2013/0167495 A1 | 7/2013 | Borinato |
| 2013/0214498 A1 | 8/2013 | Defazio et al. |
| 2014/0000231 A1 | 1/2014 | Bernini |
| 2014/0126952 A1 | 5/2014 | Fay, II |
| 2014/0163733 A1 | 6/2014 | Sadowski et al. |
| 2014/0197222 A1 | 7/2014 | Howe |
| 2014/0203776 A1 | 7/2014 | Ireland et al. |
| 2014/0204510 A1 | 7/2014 | Ireland |
| 2014/0330496 A1 | 11/2014 | Crouse et al. |
| 2015/0012164 A1 | 1/2015 | Yu et al. |
| 2015/0045992 A1 | 2/2015 | Ashby et al. |
| 2015/0120057 A1 | 4/2015 | Wong et al. |
| 2015/0128547 A1 | 5/2015 | Einecke et al. |
| 2015/0163993 A1 | 6/2015 | Pettersson |
| 2015/0181806 A1 | 7/2015 | Lim et al. |
| 2015/0270729 A1 | 9/2015 | Isobe |
| 2015/0301532 A1 | 10/2015 | Norris et al. |
| 2015/0379785 A1 | 12/2015 | Brown, Jr. et al. |
| 2016/0014957 A1 | 1/2016 | Johansson et al. |
| 2016/0075032 A1 | 3/2016 | Goel et al. |
| 2016/0100523 A1 | 4/2016 | Anderson |
| 2016/0128275 A1 | 5/2016 | Johnson |
| 2016/0146611 A1 | 5/2016 | Matthews |
| 2016/0157275 A1 | 6/2016 | Matthews |
| 2016/0174140 A1 | 6/2016 | Wu et al. |
| 2016/0179095 A1 | 6/2016 | Sarid et al. |
| 2016/0187885 A1 | 6/2016 | Pack et al. |
| 2016/0198644 A1 | 7/2016 | Lameli et al. |
| 2016/0311076 A1 | 10/2016 | Matsumoto et al. |
| 2016/0316619 A1 | 11/2016 | Johanek et al. |
| 2016/0338262 A1 | 11/2016 | Liu et al. |
| 2016/0354931 A1 | 12/2016 | Jones et al. |
| 2016/0360695 A1 | 12/2016 | Klackensjö |

(56) References Cited

U.S. PATENT DOCUMENTS

| | | |
|---|---|---|
| 2016/0378111 A1 | 12/2016 | Lenser et al. |
| 2017/0046663 A1 | 2/2017 | Wong et al. |
| 2017/0088010 A1 | 3/2017 | Tonks et al. |
| 2017/0269595 A1 | 9/2017 | Chen |
| 2017/0303466 A1 | 10/2017 | Grufman et al. |
| 2017/0308092 A1 | 10/2017 | Altinger et al. |
| 2017/0325648 A1 | 11/2017 | Huang |
| 2017/0351260 A1 | 12/2017 | Willgert et al. |
| 2017/0361468 A1 | 12/2017 | Cheuvront et al. |
| 2018/0103583 A1 | 4/2018 | Stridh |
| 2018/0120852 A1 | 5/2018 | Cho |
| 2018/0184585 A1 | 7/2018 | Song et al. |
| 2018/0184591 A1 | 7/2018 | Song et al. |
| 2018/0232134 A1 | 8/2018 | Ebrahimi Afrouzi et al. |
| 2018/0246516 A1 | 8/2018 | Franzius et al. |
| 2018/0263182 A1 | 9/2018 | Albinger et al. |
| 2018/0267552 A1 | 9/2018 | Artes et al. |
| 2018/0317368 A1 | 11/2018 | Du et al. |
| 2018/0344116 A1 | 12/2018 | Schriesheim et al. |
| 2018/0348787 A1 | 12/2018 | Sandin et al. |
| 2019/0041869 A1 | 2/2019 | Shao et al. |
| 2019/0049593 A1 | 2/2019 | He et al. |
| 2019/0049968 A1 | 2/2019 | Dean et al. |
| 2019/0049984 A1 | 2/2019 | Wong et al. |
| 2019/0053423 A1 | 2/2019 | Guiet et al. |
| 2019/0069330 A1 | 2/2019 | Ebrahimi Afrouzi et al. |
| 2019/0113931 A1 | 4/2019 | Zha et al. |
| 2019/0118877 A1 | 4/2019 | Ran et al. |
| 2019/0141886 A1 | 5/2019 | Liu et al. |
| 2019/0141888 A1 | 5/2019 | Balutis et al. |
| 2019/0166487 A1 | 5/2019 | Russ et al. |
| 2019/0176321 A1 | 6/2019 | Afrouzi et al. |
| 2019/0187714 A1 | 6/2019 | He et al. |
| 2019/0227574 A1 | 7/2019 | Du et al. |
| 2019/0239428 A1 | 8/2019 | Levin et al. |
| 2019/0246862 A1 | 8/2019 | Gilbert, Jr. et al. |
| 2019/0248007 A1 | 8/2019 | Duffy et al. |
| 2019/0250604 A1 | 8/2019 | Balutis et al. |
| 2019/0265724 A1 | 8/2019 | Sheng et al. |
| 2019/0270124 A1 | 9/2019 | Jang et al. |
| 2019/0275666 A1 | 9/2019 | Abramson |
| 2019/0278269 A1 | 9/2019 | He et al. |
| 2019/0297869 A1 | 10/2019 | Michaels et al. |
| 2019/0299398 A1 | 10/2019 | Svensson |
| 2019/0313576 A1 | 10/2019 | Haneda et al. |
| 2019/0320580 A1 | 10/2019 | Haneda et al. |
| 2019/0339719 A1 | 11/2019 | Wang et al. |
| 2019/0343040 A1 | 11/2019 | Testolin et al. |
| 2019/0346848 A1 | 11/2019 | Zhou et al. |
| 2019/0357430 A1 | 11/2019 | Kraft |
| 2019/0357431 A1 | 11/2019 | Kamfors et al. |
| 2019/0369620 A1 | 12/2019 | Zhou et al. |
| 2019/0369629 A1 | 12/2019 | Dalfra |
| 2019/0369640 A1 | 12/2019 | He et al. |
| 2019/0378360 A1 | 12/2019 | Bergenholm et al. |
| 2019/0380266 A1 | 12/2019 | Liljedahl |
| 2019/0383887 A1 | 12/2019 | Kleiner et al. |
| 2019/0384306 A1 | 12/2019 | Jang et al. |
| 2019/0391589 A1 | 12/2019 | Komorida et al. |
| 2020/0000023 A1 | 1/2020 | Chung |
| 2020/0019156 A1 | 1/2020 | Drew et al. |
| 2020/0022553 A1 | 1/2020 | Gill et al. |
| 2020/0033386 A1 | 1/2020 | Abramson |
| 2020/0037498 A1 | 2/2020 | Ko et al. |
| 2020/0039079 A1 | 2/2020 | Brouwers et al. |
| 2020/0042011 A1 | 2/2020 | Ärlig et al. |
| 2020/0050208 A1 | 2/2020 | Frick et al. |
| 2020/0073403 A1 | 3/2020 | Abramson et al. |
| 2020/0093058 A1 | 3/2020 | Ritzer et al. |
| 2020/0100425 A1 | 4/2020 | Li |
| 2020/0108499 A1 | 4/2020 | Vicenti |
| 2020/0120863 A1 | 4/2020 | Liu et al. |
| 2020/0128750 A1 | 4/2020 | Svensson et al. |
| 2020/0129029 A1 | 4/2020 | Kim et al. |
| 2020/0139536 A1 | 5/2020 | Frisby et al. |
| 2020/0146211 A1 | 5/2020 | Wahlgren |
| 2020/0154637 A1 | 5/2020 | Doughty |
| 2020/0170180 A1 | 6/2020 | Kong et al. |
| 2020/0172166 A1 | 6/2020 | Chang et al. |
| 2020/0173784 A1 | 6/2020 | Chang |
| 2020/0193071 A1 | 6/2020 | Yu et al. |
| 2020/0196523 A1 | 6/2020 | Ran et al. |
| 2020/0198488 A1 | 6/2020 | Liljedahl |
| 2020/0201328 A1 | 6/2020 | Abramson |
| 2020/0201347 A1 | 6/2020 | Dalfra et al. |
| 2020/0206896 A1 | 7/2020 | Wong et al. |
| 2020/0221633 A1 | 7/2020 | Einecke et al. |
| 2020/0229344 A1 | 7/2020 | Du et al. |
| 2020/0233658 A1 | 7/2020 | Yang et al. |
| 2020/0236846 A1 | 7/2020 | Choi et al. |
| 2020/0237169 A1 | 7/2020 | Song et al. |
| 2020/0239090 A1 | 7/2020 | Kong et al. |
| 2020/0245550 A1 | 8/2020 | Smith et al. |
| 2020/0253116 A1 | 8/2020 | Ladd, Jr. et al. |
| 2020/0256369 A1 | 8/2020 | Gao |
| 2020/0260638 A1 | 8/2020 | Rotole |
| 2020/0267903 A1 | 8/2020 | Gao et al. |
| 2020/0278680 A1 | 9/2020 | Schulz et al. |
| 2020/0278683 A1 | 9/2020 | Dean et al. |
| 2020/0281114 A1 | 9/2020 | Jägenstedt et al. |
| 2020/0281430 A1 | 9/2020 | Morin et al. |
| 2020/0285963 A1 | 9/2020 | Velkey et al. |
| 2020/0287397 A1 | 9/2020 | Jiao et al. |
| 2020/0297180 A1 | 9/2020 | Kang et al. |
| 2020/0315087 A1 | 10/2020 | Svensson et al. |
| 2020/0323191 A1 | 10/2020 | Duncan et al. |
| 2020/0323408 A1 | 10/2020 | Cohen et al. |
| 2020/0326725 A1 | 10/2020 | Churavy et al. |
| 2020/0337201 A1 | 10/2020 | Siekmann |
| 2020/0352082 A1 | 11/2020 | Maeder et al. |
| 2020/0352091 A1 | 11/2020 | Ambros et al. |
| 2020/0356093 A1 | 11/2020 | Shimamura et al. |
| 2020/0362536 A1 | 11/2020 | Shimamura et al. |
| 2020/0363810 A1 | 11/2020 | Arras et al. |
| 2020/0366481 A1 | 11/2020 | Pakkan et al. |
| 2020/0367429 A1 | 11/2020 | Yuan |
| 2020/0369080 A1 | 11/2020 | Cmich |
| 2020/0375096 A1 | 12/2020 | Coleman |
| 2020/0375097 A1 | 12/2020 | Coleman |
| 2020/0375098 A1 | 12/2020 | Muro et al. |
| 2020/0383265 A1 | 12/2020 | Holgersson |
| 2020/0393844 A1 | 12/2020 | Ritzer et al. |
| 2020/0396916 A1 | 12/2020 | He et al. |
| 2020/0401146 A1 | 12/2020 | Strandberg |
| 2021/0000005 A1 | 1/2021 | Robinson |
| 2021/0000008 A1 | 1/2021 | Svensson et al. |
| 2021/0003405 A1 | 1/2021 | Choi |
| 2021/0004895 A1 | 1/2021 | Kuriyagawa et al. |
| 2021/0016453 A1 | 1/2021 | Patel et al. |
| 2021/0018927 A1 | 1/2021 | Ackerman et al. |
| 2021/0029873 A1 | 2/2021 | Yamauchi et al. |
| 2021/0029874 A1 | 2/2021 | Robertsson |
| 2021/0031367 A1 | 2/2021 | Mirzaei et al. |
| 2021/0037703 A1 | 2/2021 | Holgersson |
| 2021/0041871 A1 | 2/2021 | Lai et al. |
| 2021/0048831 A1 | 2/2021 | Yun et al. |
| 2021/0059112 A1 | 3/2021 | Kim |
| 2021/0064036 A1 | 3/2021 | Muro et al. |
| 2021/0064050 A1 | 3/2021 | Pickett et al. |
| 2021/0070356 A1 | 3/2021 | Lyzen et al. |
| 2021/0072764 A1 | 3/2021 | Kean |
| 2021/0076562 A1 | 3/2021 | Doughty et al. |
| 2021/0076563 A1 | 3/2021 | Andriolo et al. |
| 2021/0076892 A1 | 3/2021 | Schriesheim et al. |
| 2021/0083492 A1 | 3/2021 | Towner et al. |
| 2021/0083493 A1 | 3/2021 | Towner et al. |
| 2021/0083494 A1 | 3/2021 | Towner et al. |
| 2021/0084815 A1 | 3/2021 | Li et al. |
| 2021/0089034 A1 | 3/2021 | Hjelmaker |
| 2021/0092912 A1 | 4/2021 | Wykman et al. |
| 2021/0094346 A1 | 4/2021 | Cmich |
| 2021/0100160 A1 | 4/2021 | Kang et al. |
| 2021/0100161 A1 | 4/2021 | Balutis et al. |
| 2021/0107363 A1 | 4/2021 | Han et al. |

(56) References Cited

U.S. PATENT DOCUMENTS

| | | |
|---|---|---|
| 2021/0114810 A1 | 4/2021 | Matsuoka et al. |
| 2021/0116933 A1 | 4/2021 | Ouyang |
| 2021/0125366 A1 | 4/2021 | Hasberg et al. |
| 2021/0127569 A1 | 5/2021 | Gruhler et al. |
| 2021/0132604 A1 | 5/2021 | Gillett |
| 2021/0132624 A1 | 5/2021 | Andriolo et al. |
| 2021/0132625 A1 | 5/2021 | Gillett |
| 2021/0132626 A1 | 5/2021 | Gillett |
| 2021/0153428 A1 | 5/2021 | Mittmann et al. |
| 2021/0153710 A1 | 5/2021 | Mosebach et al. |
| 2021/0157331 A1 | 5/2021 | He |
| 2021/0161065 A1 | 6/2021 | Holgersson |
| 2021/0165109 A1 | 6/2021 | Yang et al. |
| 2021/0165411 A1 | 6/2021 | Andriolo et al. |
| 2021/0168999 A1 | 6/2021 | Xu |
| 2021/0176915 A1 | 6/2021 | Vines et al. |
| 2021/0179137 A1 | 6/2021 | Gillett |
| 2021/0185911 A1 | 6/2021 | Agerhall |
| 2021/0191764 A1 | 6/2021 | Dalfra |
| 2021/0200226 A1 | 7/2021 | Wang et al. |
| 2021/0200228 A1 | 7/2021 | Grufman et al. |
| 2021/0204473 A1 | 7/2021 | Andriolo et al. |
| 2021/0206367 A1 | 7/2021 | Liu et al. |
| 2021/0216070 A1 | 7/2021 | Vankampen et al. |
| 2021/0219488 A1 | 7/2021 | Zhao et al. |
| 2021/0221246 A1 | 7/2021 | Liu et al. |
| 2021/0223787 A1 | 7/2021 | Pellisari |
| 2021/0227744 A1 | 7/2021 | Zhou et al. |
| 2021/0228043 A1 | 7/2021 | Jang et al. |
| 2021/0230622 A1 | 7/2021 | Crow et al. |
| 2021/0235616 A1 | 8/2021 | Stark et al. |
| 2021/0255638 A1 | 8/2021 | Ma et al. |
| 2021/0259497 A1 | 8/2021 | Park et al. |
| 2021/0263131 A1 | 8/2021 | Dalfra |
| 2021/0263529 A1 | 8/2021 | Takahashi et al. |
| 2021/0270338 A1 | 9/2021 | Ederfors |
| 2021/0272438 A1 | 9/2021 | Askenmalm |
| 2021/0274705 A1 | 9/2021 | Mårtensson et al. |
| 2021/0282322 A1 | 9/2021 | Yoon et al. |
| 2021/0289695 A1 | 9/2021 | Grufman et al. |
| 2021/0294348 A1 | 9/2021 | Lan et al. |
| 2021/0298232 A1 | 9/2021 | Wolf et al. |
| 2021/0302999 A1 | 9/2021 | Yokoyama et al. |
| 2021/0311484 A1 | 10/2021 | Lee et al. |
| 2021/0315155 A1 | 10/2021 | Lee et al. |
| 2021/0321854 A1 | 10/2021 | Zhang et al. |
| 2021/0325872 A1 | 10/2021 | Schlacks, IV et al. |
| 2021/0325874 A1 | 10/2021 | Schlacks, IV et al. |
| 2021/0325875 A1 | 10/2021 | Schlacks, IV et al. |
| 2021/0325876 A1 | 10/2021 | Schlacks, IV et al. |
| 2021/0325877 A1 | 10/2021 | Schlacks, IV et al. |
| 2021/0325878 A1 | 10/2021 | Schlacks, IV et al. |
| 2021/0328991 A1 | 10/2021 | Dean et al. |
| 2021/0329841 A1 | 10/2021 | Cuong et al. |
| 2021/0331594 A1 | 10/2021 | Svensson et al. |
| 2021/0337726 A1 | 11/2021 | Keski-Luopa et al. |
| 2021/0344299 A1 | 11/2021 | Layne et al. |
| 2021/0345544 A1 | 11/2021 | Han et al. |
| 2021/0345545 A1 | 11/2021 | Zhao et al. |
| 2021/0347204 A1 | 11/2021 | Cmich |
| 2021/0352841 A1 | 11/2021 | Edfors et al. |
| 2021/0352842 A1 | 11/2021 | Pu et al. |
| 2021/0352843 A1 | 11/2021 | Zhao et al. |
| 2021/0360853 A1 | 11/2021 | Herrera |
| 2021/0365044 A1 | 11/2021 | Xue et al. |
| 2021/0382476 A1 | 12/2021 | Morrison et al. |
| 2022/0009363 A1 | 1/2022 | Gilbert, Jr. et al. |
| 2022/0022371 A1 | 1/2022 | Askenmalm et al. |
| 2022/0022386 A1 | 1/2022 | Danling |
| 2022/0029477 A1 | 1/2022 | He et al. |
| 2022/0030766 A1 | 2/2022 | Johansson |
| 2022/0039313 A1 | 2/2022 | Morrison et al. |
| 2022/0061212 A1 | 3/2022 | Zeiler et al. |
| 2022/0066456 A1 | 3/2022 | Ebrahimi Afrouzi et al. |
| 2022/0071086 A1 | 3/2022 | Levin et al. |
| 2022/0071465 A1 | 3/2022 | Kim et al. |
| 2022/0083075 A1 | 3/2022 | Heiss et al. |
| 2022/0091257 A1 | 3/2022 | Almers et al. |
| 2022/0100197 A1 | 3/2022 | Chao |
| 2022/0124973 A1 | 4/2022 | Juel |
| 2022/0129000 A1 | 4/2022 | Ingvalson et al. |
| 2022/0142438 A1 | 5/2022 | Chen et al. |
| 2022/0147059 A1* | 5/2022 | Borne-Pons .......... G05D 1/6985 |
| 2022/0151143 A1 | 5/2022 | Liljedahl et al. |
| 2022/0151147 A1 | 5/2022 | Chen et al. |
| 2022/0167552 A1 | 6/2022 | Frick et al. |
| 2022/0167553 A1 | 6/2022 | Rogö et al. |
| 2022/0174868 A1 | 6/2022 | Flygare |
| 2022/0180282 A1 | 6/2022 | Powell et al. |
| 2022/0183223 A1 | 6/2022 | Svensson et al. |
| 2022/0183226 A1 | 6/2022 | Paolo Andriolo |
| 2022/0217902 A1 | 7/2022 | Chen et al. |
| 2022/0217904 A1 | 7/2022 | Svensson et al. |
| 2022/0240444 A1 | 8/2022 | Wang et al. |
| 2022/0261006 A1 | 8/2022 | Zaslavsky et al. |
| 2022/0272897 A1 | 9/2022 | Jiao et al. |
| 2022/0295696 A1 | 9/2022 | Holgersson et al. |
| 2022/0295709 A1 | 9/2022 | Wisse et al. |
| 2022/0322603 A1 | 10/2022 | Inaba et al. |
| 2022/0322908 A1 | 10/2022 | Cha et al. |
| 2022/0324112 A1 | 10/2022 | Wolowelsky et al. |
| 2022/0326709 A1 | 10/2022 | Andriolo |
| 2022/0334244 A1 | 10/2022 | Li et al. |
| 2022/0342425 A1 | 10/2022 | Glimberg et al. |
| 2022/0354050 A1 | 11/2022 | Du et al. |
| 2022/0396969 A1 | 12/2022 | Arvidsson et al. |
| 2023/0008134 A1 | 1/2023 | Olofsson et al. |
| 2023/0008169 A1 | 1/2023 | Cuong et al. |
| 2023/0009964 A1 | 1/2023 | Jonsson et al. |
| 2023/0010420 A1 | 1/2023 | Glimberg et al. |
| 2023/0015812 A1 | 1/2023 | Wikestad et al. |
| 2023/0017821 A1 | 1/2023 | Ma et al. |
| 2023/0034100 A1 | 2/2023 | Holgersson et al. |
| 2023/0042864 A1 | 2/2023 | Danling et al. |
| 2023/0051150 A1 | 2/2023 | Pu et al. |
| 2023/0059610 A1 | 2/2023 | Mei et al. |
| 2023/0071262 A1 | 3/2023 | Lundkvist et al. |
| 2023/0074101 A1 | 3/2023 | Mårtensson et al. |
| 2023/0081732 A1 | 3/2023 | Abramson |
| 2023/0085538 A1 | 3/2023 | Lundkvist et al. |
| 2023/0092131 A1 | 3/2023 | Lao et al. |
| 2023/0117845 A1 | 4/2023 | Holgersson et al. |
| 2023/0119277 A1 | 4/2023 | Leijonberger |
| 2023/0138339 A1 | 5/2023 | Wikestad |
| 2023/0145580 A1 | 5/2023 | Hong et al. |
| 2023/0152817 A1 | 5/2023 | Huang et al. |
| 2023/0161357 A1 | 5/2023 | Liljedahl et al. |
| 2023/0176000 A1 | 6/2023 | Abbott et al. |
| 2023/0176225 A1 | 6/2023 | Mårtensson et al. |
| 2023/0185309 A1 | 6/2023 | Glimberg et al. |
| 2023/0189705 A1 | 6/2023 | Svensson et al. |

FOREIGN PATENT DOCUMENTS

| | | |
|---|---|---|
| AU | 2011239328 A1 | 11/2011 |
| AU | 2012101338 A4 | 11/2012 |
| AU | 2014201952 A1 | 4/2014 |
| AU | 2015230722 A1 | 10/2015 |
| CA | 1079076 A | 6/1980 |
| CN | 2382585 Y | 6/2000 |
| CN | 2693167 Y | 4/2005 |
| CN | 3512456 | 3/2006 |
| CN | 3599999 | 1/2007 |
| CN | 3626101 | 3/2007 |
| CN | 101185088 A | 5/2008 |
| CN | 300775531 | 5/2008 |
| CN | 201127182 Y | 10/2008 |
| CN | 101313319 A | 11/2008 |
| CN | 201226676 Y | 4/2009 |
| CN | 201226677 Y | 4/2009 |
| CN | 100485567 C | 5/2009 |
| CN | 100498602 C | 6/2009 |
| CN | 201260303 Y | 6/2009 |
| CN | 301144405 | 2/2010 |

(56) References Cited

FOREIGN PATENT DOCUMENTS

| | | |
|---|---|---|
| CN | 301276003 | 6/2010 |
| CN | 301290512 | 7/2010 |
| CN | 201557392 U | 8/2010 |
| CN | 301328063 | 8/2010 |
| CN | 101292244 B | 12/2010 |
| CN | 301444971 | 1/2011 |
| CN | 101982037 A | 3/2011 |
| CN | 201797741 U | 4/2011 |
| CN | 301506267 | 4/2011 |
| CN | 201846616 U | 6/2011 |
| CN | 301573109 | 6/2011 |
| CN | 301611305 | 7/2011 |
| CN | 301653707 | 8/2011 |
| CN | 301660006 | 8/2011 |
| CN | 301742022 | 11/2011 |
| CN | 202077380 U | 12/2011 |
| CN | 102523841 A | 7/2012 |
| CN | 302020661 | 8/2012 |
| CN | 102687620 A | 9/2012 |
| CN | 102687625 A | 9/2012 |
| CN | 302080704 | 9/2012 |
| CN | 102771246 A | 11/2012 |
| CN | 102771259 A | 11/2012 |
| CN | 302218376 | 12/2012 |
| CN | 102880175 A | 1/2013 |
| CN | 302299693 | 1/2013 |
| CN | 302350176 | 3/2013 |
| CN | 302456271 | 6/2013 |
| CN | 302483861 | 6/2013 |
| CN | 103294056 A | 9/2013 |
| CN | 103324191 A | 9/2013 |
| CN | 103324192 A | 9/2013 |
| CN | 203233683 U | 10/2013 |
| CN | 302629702 | 11/2013 |
| CN | 103473497 A | 12/2013 |
| CN | 302702748 | 1/2014 |
| CN | 103578164 A | 2/2014 |
| CN | 103676947 A | 3/2014 |
| CN | 203575087 U | 5/2014 |
| CN | 103858584 A | 6/2014 |
| CN | 203691948 U | 7/2014 |
| CN | 203735069 U | 7/2014 |
| CN | 302881351 | 7/2014 |
| CN | 104007765 A | 8/2014 |
| CN | 104025796 A | 9/2014 |
| CN | 203840762 U | 9/2014 |
| CN | 302943247 | 9/2014 |
| CN | 302943249 | 9/2014 |
| CN | 104094727 A | 10/2014 |
| CN | 104111460 A | 10/2014 |
| CN | 104111651 A | 10/2014 |
| CN | 104111652 A | 10/2014 |
| CN | 104111653 A | 10/2014 |
| CN | 203851480 U | 10/2014 |
| CN | 104160830 A | 11/2014 |
| CN | 302993652 | 11/2014 |
| CN | 204014494 U | 12/2014 |
| CN | 204047176 U | 12/2014 |
| CN | 303058887 | 12/2014 |
| CN | 303075143 | 1/2015 |
| CN | 104360684 A | 2/2015 |
| CN | 204143255 U | 2/2015 |
| CN | 104571102 A | 4/2015 |
| CN | 104686050 A | 6/2015 |
| CN | 104704979 A | 6/2015 |
| CN | 104704980 A | 6/2015 |
| CN | 204362599 U | 6/2015 |
| CN | 303232131 | 6/2015 |
| CN | 104737699 A | 7/2015 |
| CN | 104750104 A | 7/2015 |
| CN | 104782314 A | 7/2015 |
| CN | 104793614 A | 7/2015 |
| CN | 104793617 A | 7/2015 |
| CN | 204443108 U | 7/2015 |
| CN | 204462853 U | 7/2015 |
| CN | 204495362 U | 7/2015 |
| CN | 204515530 U | 7/2015 |
| CN | 204539960 U | 8/2015 |
| CN | 303318601 | 8/2015 |
| CN | 104904403 A | 9/2015 |
| CN | 104904404 A | 9/2015 |
| CN | 204613789 U | 9/2015 |
| CN | 204649212 U | 9/2015 |
| CN | 303408640 | 10/2015 |
| CN | 105082080 A | 11/2015 |
| CN | 105096177 A | 11/2015 |
| CN | 303452341 | 11/2015 |
| CN | 303452355 | 11/2015 |
| CN | 105163037 A | 12/2015 |
| CN | 204810982 U | 12/2015 |
| CN | 204858702 U | 12/2015 |
| CN | 204925588 U | 12/2015 |
| CN | 303478376 | 12/2015 |
| CN | 303519781 | 12/2015 |
| CN | 105230225 A | 1/2016 |
| CN | 103621244 B | 2/2016 |
| CN | 105353758 A | 2/2016 |
| CN | 303579400 | 2/2016 |
| CN | 105432212 A | 3/2016 |
| CN | 105512689 A | 4/2016 |
| CN | 303654613 | 4/2016 |
| CN | 105557175 A | 5/2016 |
| CN | 105573308 A | 5/2016 |
| CN | 105573311 A | 5/2016 |
| CN | 303670522 | 5/2016 |
| CN | 105660039 A | 6/2016 |
| CN | 105684630 A | 6/2016 |
| CN | 105700521 A | 6/2016 |
| CN | 205335882 U | 6/2016 |
| CN | 205336853 U | 6/2016 |
| CN | 205431101 U | 6/2016 |
| CN | 303690781 | 6/2016 |
| CN | 105759813 A | 7/2016 |
| CN | 205489586 U | 8/2016 |
| CN | 303778782 | 8/2016 |
| CN | 303862286 | 9/2016 |
| CN | 103283404 B | 10/2016 |
| CN | 105988469 A | 10/2016 |
| CN | 105988470 A | 10/2016 |
| CN | 106020207 A | 10/2016 |
| CN | 303888354 | 10/2016 |
| CN | 303888360 | 10/2016 |
| CN | 106142023 A | 11/2016 |
| CN | 205694315 U | 11/2016 |
| CN | 303933081 | 11/2016 |
| CN | 103941600 B | 12/2016 |
| CN | 106171248 A | 12/2016 |
| CN | 205812811 U | 12/2016 |
| CN | 205829192 U | 12/2016 |
| CN | 205830138 U | 12/2016 |
| CN | 303969591 | 12/2016 |
| CN | 106258166 A | 1/2017 |
| CN | 106325280 A | 1/2017 |
| CN | 106355609 A | 1/2017 |
| CN | 304004639 | 1/2017 |
| CN | 106393094 A | 2/2017 |
| CN | 106406301 A | 2/2017 |
| CN | 304055132 | 2/2017 |
| CN | 304055134 | 2/2017 |
| CN | 304055136 | 2/2017 |
| CN | 106489412 A | 3/2017 |
| CN | 205993268 U | 3/2017 |
| CN | 103576681 B | 4/2017 |
| CN | 206115269 U | 4/2017 |
| CN | 304095129 | 4/2017 |
| CN | 106647727 A | 5/2017 |
| CN | 106708033 A | 5/2017 |
| CN | 206196372 U | 5/2017 |
| CN | 304129527 | 5/2017 |
| CN | 304129534 | 5/2017 |
| CN | 106852225 A | 6/2017 |
| CN | 106877420 A | 6/2017 |
| CN | 206274765 U | 6/2017 |
| CN | 206278169 U | 6/2017 |

(56) References Cited

FOREIGN PATENT DOCUMENTS

| | | |
|---|---|---|
| CN | 304175254 | 6/2017 |
| CN | 304208974 | 7/2017 |
| CN | 107024910 A | 8/2017 |
| CN | 304227934 | 8/2017 |
| CN | 304241160 | 8/2017 |
| CN | 206472500 U | 9/2017 |
| CN | 304283754 | 9/2017 |
| CN | 206547328 U | 10/2017 |
| CN | 206547363 U | 10/2017 |
| CN | 206611777 U | 11/2017 |
| CN | 206611791 U | 11/2017 |
| CN | 206611812 U | 11/2017 |
| CN | 206619022 U | 11/2017 |
| CN | 107463166 A | 12/2017 |
| CN | 107463168 A | 12/2017 |
| CN | 107505939 A | 12/2017 |
| CN | 107515603 A | 12/2017 |
| CN | 107516226 A | 12/2017 |
| CN | 107517642 A | 12/2017 |
| CN | 206686605 U | 12/2017 |
| CN | 206808075 U | 12/2017 |
| CN | 107544483 A | 1/2018 |
| CN | 107600209 A | 1/2018 |
| CN | 107624368 A | 1/2018 |
| CN | 207037461 U | 2/2018 |
| CN | 107800200 A | 3/2018 |
| CN | 207075257 U | 3/2018 |
| CN | 304529661 | 3/2018 |
| CN | 304544247 | 3/2018 |
| CN | 107888751 A | 4/2018 |
| CN | 107913034 A | 4/2018 |
| CN | 107960191 A | 4/2018 |
| CN | 207201326 U | 4/2018 |
| CN | 304565875 | 4/2018 |
| CN | 108055906 A | 5/2018 |
| CN | 108064539 A | 5/2018 |
| CN | 108073179 A | 5/2018 |
| CN | 108156957 A | 6/2018 |
| CN | 108205313 A | 6/2018 |
| CN | 207496811 U | 6/2018 |
| CN | 108323326 A | 7/2018 |
| CN | 108337987 A | 7/2018 |
| CN | 108345297 A | 7/2018 |
| CN | 108345298 A | 7/2018 |
| CN | 207639110 U | 7/2018 |
| CN | 207651536 U | 7/2018 |
| CN | 207692389 U | 8/2018 |
| CN | 304767946 | 8/2018 |
| CN | 304794944 | 8/2018 |
| CN | 207851614 U | 9/2018 |
| CN | 304806495 | 9/2018 |
| CN | 304811825 | 9/2018 |
| CN | 108664014 A | 10/2018 |
| CN | 108693873 A | 10/2018 |
| CN | 207965652 U | 10/2018 |
| CN | 108919814 A | 11/2018 |
| CN | 208159284 U | 11/2018 |
| CN | 108957512 A | 12/2018 |
| CN | 109062225 A | 12/2018 |
| CN | 109075284 A | 12/2018 |
| CN | 208175354 U | 12/2018 |
| CN | 208285831 U | 12/2018 |
| CN | 304926953 | 12/2018 |
| CN | 304926955 | 12/2018 |
| CN | 109213123 A | 1/2019 |
| CN | 208387297 U | 1/2019 |
| CN | 304980236 | 1/2019 |
| CN | 305010344 | 1/2019 |
| CN | 305010365 | 1/2019 |
| CN | 305017366 | 1/2019 |
| CN | 105875063 B | 2/2019 |
| CN | 208480301 U | 2/2019 |
| CN | 208521989 U | 2/2019 |
| CN | 305027640 | 2/2019 |
| CN | 109542092 A | 3/2019 |
| CN | 208638993 U | 3/2019 |
| CN | 109566065 A | 4/2019 |
| CN | 109601114 A | 4/2019 |
| CN | 109658937 A | 4/2019 |
| CN | 109682368 A | 4/2019 |
| CN | 109682371 A | 4/2019 |
| CN | 109683604 A | 4/2019 |
| CN | 109696888 A | 4/2019 |
| CN | 208739598 U | 4/2019 |
| CN | 208752461 U | 4/2019 |
| CN | 109757189 A | 5/2019 |
| CN | 106982585 B | 6/2019 |
| CN | 109892096 A | 6/2019 |
| CN | 209002355 U | 6/2019 |
| CN | 209002393 U | 6/2019 |
| CN | 305196413 | 6/2019 |
| CN | 305225230 | 6/2019 |
| CN | 305227797 | 6/2019 |
| CN | 305227798 | 6/2019 |
| CN | 305227800 | 6/2019 |
| CN | 305503785 | 6/2019 |
| CN | 109960253 A | 7/2019 |
| CN | 109962512 A | 7/2019 |
| CN | 109983907 A | 7/2019 |
| CN | 109983908 A | 7/2019 |
| CN | 110018686 A | 7/2019 |
| CN | 209170907 U | 7/2019 |
| CN | 305261165 | 7/2019 |
| CN | 305261166 | 7/2019 |
| CN | 305265564 | 7/2019 |
| CN | 209265268 U | 8/2019 |
| CN | 209299766 U | 8/2019 |
| CN | 106155056 B | 9/2019 |
| CN | 110221594 A | 9/2019 |
| CN | 110268858 A | 9/2019 |
| CN | 209409782 U | 9/2019 |
| CN | 305355791 | 9/2019 |
| CN | 305357008 | 9/2019 |
| CN | 110347144 A | 10/2019 |
| CN | 110366368 A | 10/2019 |
| CN | 305407445 | 10/2019 |
| CN | 110447372 A | 11/2019 |
| CN | 209676901 U | 11/2019 |
| CN | 305447400 | 11/2019 |
| CN | 305452583 | 11/2019 |
| CN | 110584551 A | 12/2019 |
| CN | 110622680 A | 12/2019 |
| CN | 209861609 U | 12/2019 |
| CN | 305523640 | 12/2019 |
| CN | 209955654 U | 1/2020 |
| CN | 209964645 U | 1/2020 |
| CN | 305574602 | 1/2020 |
| CN | 110764495 A | 2/2020 |
| CN | 110850858 A | 2/2020 |
| CN | 110850860 A | 2/2020 |
| CN | 110852133 A | 2/2020 |
| CN | 210016305 U | 2/2020 |
| CN | 210116329 U | 2/2020 |
| CN | 305596393 | 2/2020 |
| CN | 105988472 B | 3/2020 |
| CN | 107493797 B | 3/2020 |
| CN | 110881903 A | 3/2020 |
| CN | 110895411 A | 3/2020 |
| CN | 110915409 A | 3/2020 |
| CN | 110928280 A | 3/2020 |
| CN | 110928285 A | 3/2020 |
| CN | 107643751 B | 4/2020 |
| CN | 111034450 A | 4/2020 |
| CN | 111045423 A | 4/2020 |
| CN | 305716236 | 4/2020 |
| CN | 107643750 B | 5/2020 |
| CN | 108142070 B | 5/2020 |
| CN | 111123910 A | 5/2020 |
| CN | 111165158 A | 5/2020 |
| CN | 210444878 U | 5/2020 |
| CN | 210580043 U | 5/2020 |
| CN | 305750432 | 5/2020 |
| CN | 305757781 | 5/2020 |
| CN | 305789888 | 5/2020 |

(56) References Cited

FOREIGN PATENT DOCUMENTS

| | | | | |
|---|---|---|---|---|
| CN | 111226569 | A | | 6/2020 |
| CN | 210782124 | U | | 6/2020 |
| CN | 210808273 | U | | 6/2020 |
| CN | 210821640 | U | | 6/2020 |
| CN | 210839520 | U | | 6/2020 |
| CN | 305827495 | | | 6/2020 |
| CN | 305827496 | | | 6/2020 |
| CN | 305827503 | | | 6/2020 |
| CN | 305860595 | | | 6/2020 |
| CN | 305860598 | | | 6/2020 |
| CN | 305869411 | | | 6/2020 |
| CN | 106717462 | B | | 7/2020 |
| CN | 108811699 | B | | 7/2020 |
| CN | 210900401 | U | | 7/2020 |
| CN | 210987056 | U | | 7/2020 |
| CN | 211015146 | U | | 7/2020 |
| CN | 305946746 | | | 7/2020 |
| CN | 305946760 | | | 7/2020 |
| CN | 111487982 | A | | 8/2020 |
| CN | 111512766 | A | | 8/2020 |
| CN | 211212948 | U | | 8/2020 |
| CN | 305989577 | | | 8/2020 |
| CN | 306019404 | | | 8/2020 |
| CN | 105988471 | B | | 9/2020 |
| CN | 111685651 | A | | 9/2020 |
| CN | 211531846 | U | | 9/2020 |
| CN | 211580673 | U | | 9/2020 |
| CN | 107637255 | B | | 10/2020 |
| CN | 110754204 | B | | 10/2020 |
| CN | 111742692 | A | | 10/2020 |
| CN | 111766589 | A | | 10/2020 |
| CN | 111769942 | A | * | 10/2020 ............ H04L 9/0838 |
| CN | 111819988 | A | | 10/2020 |
| CN | 211721118 | U | | 10/2020 |
| CN | 211721119 | U | | 10/2020 |
| CN | 211741921 | U | | 10/2020 |
| CN | 211741924 | U | | 10/2020 |
| CN | 306085189 | | | 10/2020 |
| CN | 306128197 | | | 10/2020 |
| CN | 306140210 | | | 10/2020 |
| CN | 306174630 | | | 11/2020 |
| CN | 112009175 | A | | 12/2020 |
| CN | 112087303 | A | | 12/2020 |
| CN | 112119742 | A | | 12/2020 |
| CN | 112120620 | A | | 12/2020 |
| CN | 112134314 | A | | 12/2020 |
| CN | 112147992 | A | | 12/2020 |
| CN | 212061111 | U | | 12/2020 |
| CN | 212116218 | U | | 12/2020 |
| CN | 212116223 | U | | 12/2020 |
| CN | 306223128 | | | 12/2020 |
| CN | 306236075 | | | 12/2020 |
| CN | 306236808 | | | 12/2020 |
| CN | 112230636 | A | | 1/2021 |
| CN | 112230637 | A | | 1/2021 |
| CN | 112230644 | A | | 1/2021 |
| CN | 112235760 | A | | 1/2021 |
| CN | 112259866 | A | | 1/2021 |
| CN | 112261631 | A | | 1/2021 |
| CN | 212304892 | U | | 1/2021 |
| CN | 212305863 | U | | 1/2021 |
| CN | 306278588 | | | 1/2021 |
| CN | 306303188 | | | 1/2021 |
| CN | 106909140 | B | | 2/2021 |
| CN | 109247117 | B | | 2/2021 |
| CN | 109683556 | B | | 2/2021 |
| CN | 112306049 | A | | 2/2021 |
| CN | 112385401 | A | | 2/2021 |
| CN | 112400453 | A | | 2/2021 |
| CN | 212499740 | U | | 2/2021 |
| CN | 212515710 | U | | 2/2021 |
| CN | 212520009 | U | | 2/2021 |
| CN | 212539202 | U | | 2/2021 |
| CN | 212572469 | U | | 2/2021 |
| CN | 212621511 | U | | 2/2021 |
| CN | 306328112 | | | 2/2021 |
| CN | 112435422 | A | | 3/2021 |
| CN | 112438114 | A | | 3/2021 |
| CN | 112445221 | A | | 3/2021 |
| CN | 112449864 | A | | 3/2021 |
| CN | 112492956 | A | | 3/2021 |
| CN | 112514637 | A | | 3/2021 |
| CN | 112567959 | A | | 3/2021 |
| CN | 112567961 | A | | 3/2021 |
| CN | 212696648 | U | | 3/2021 |
| CN | 212696668 | U | | 3/2021 |
| CN | 306358736 | | | 3/2021 |
| CN | 112602441 | A | | 4/2021 |
| CN | 112720451 | A | | 4/2021 |
| CN | 112731935 | A | | 4/2021 |
| CN | 212876733 | U | | 4/2021 |
| CN | 212906002 | U | | 4/2021 |
| CN | 212933333 | U | | 4/2021 |
| CN | 212970834 | U | | 4/2021 |
| CN | 213075541 | U | | 4/2021 |
| CN | 213091901 | U | | 4/2021 |
| CN | 112740889 | A | | 5/2021 |
| CN | 112764419 | A | | 5/2021 |
| CN | 112769424 | A | | 5/2021 |
| CN | 112773264 | A | | 5/2021 |
| CN | 112799395 | A | | 5/2021 |
| CN | 112799399 | A | | 5/2021 |
| CN | 112823584 | A | | 5/2021 |
| CN | 112824993 | A | | 5/2021 |
| CN | 112826376 | A | | 5/2021 |
| CN | 112840828 | A | | 5/2021 |
| CN | 112859828 | A | | 5/2021 |
| CN | 213187216 | U | | 5/2021 |
| CN | 213210764 | U | | 5/2021 |
| CN | 213214364 | U | | 5/2021 |
| CN | 213240579 | U | | 5/2021 |
| CN | 306511371 | | | 5/2021 |
| CN | 306530808 | | | 5/2021 |
| CN | 306569554 | | | 5/2021 |
| CN | 306569555 | | | 5/2021 |
| CN | 306569560 | | | 5/2021 |
| CN | 107976995 | B | | 6/2021 |
| CN | 110122045 | B | | 6/2021 |
| CN | 112947399 | A | | 6/2021 |
| CN | 112970414 | A | | 6/2021 |
| CN | 113039919 | A | | 6/2021 |
| CN | 213306269 | U | | 6/2021 |
| CN | 306604261 | | | 6/2021 |
| CN | 113064419 | A | | 7/2021 |
| CN | 113156928 | A | | 7/2021 |
| CN | 113156929 | A | | 7/2021 |
| CN | 213814000 | U | | 7/2021 |
| CN | 306670241 | | | 7/2021 |
| CN | 306680105 | | | 7/2021 |
| CN | 306694791 | | | 7/2021 |
| CN | 106300578 | B | | 8/2021 |
| CN | 108781704 | B | | 8/2021 |
| CN | 113311830 | A | | 8/2021 |
| CN | 213850492 | U | | 8/2021 |
| CN | 213921292 | U | | 8/2021 |
| CN | 306745285 | | | 8/2021 |
| CN | 306753239 | | | 8/2021 |
| CN | 306768440 | | | 8/2021 |
| CN | 113366964 | A | | 9/2021 |
| CN | 113439526 | A | | 9/2021 |
| CN | 113448259 | A | | 9/2021 |
| CN | 214126036 | U | | 9/2021 |
| CN | 214151499 | U | | 9/2021 |
| CN | 214178073 | U | | 9/2021 |
| CN | 214240309 | U | | 9/2021 |
| CN | 306824139 | | | 9/2021 |
| CN | 306839148 | | | 9/2021 |
| CN | 306846782 | | | 9/2021 |
| CN | 113455167 | A | | 10/2021 |
| CN | 113552873 | A | | 10/2021 |
| CN | 113552874 | A | | 10/2021 |
| CN | 214508006 | U | | 10/2021 |
| CN | 306880401 | | | 10/2021 |
| CN | 113721749 | A | | 11/2021 |

(56) References Cited

FOREIGN PATENT DOCUMENTS

| | | |
|---|---|---|
| CN | 214852822 U | 11/2021 |
| CN | 113759377 A | 12/2021 |
| CN | 113759886 A | 12/2021 |
| CN | 113771556 A | 12/2021 |
| CN | 113778084 A | 12/2021 |
| CN | 113805573 A | 12/2021 |
| CN | 113812251 A | 12/2021 |
| CN | 215011658 U | 12/2021 |
| CN | 215041875 U | 12/2021 |
| CN | 215073955 U | 12/2021 |
| CN | 215122126 U | 12/2021 |
| CN | 215223139 U | 12/2021 |
| CN | 215223140 U | 12/2021 |
| CN | 215244172 U | 12/2021 |
| CN | 215269503 U | 12/2021 |
| CN | 215321765 U | 12/2021 |
| CN | 307001745 | 12/2021 |
| CN | 307035324 | 12/2021 |
| CN | 113892332 A | 1/2022 |
| CN | 113970918 A | 1/2022 |
| CN | 307047963 | 1/2022 |
| CN | 307047966 | 1/2022 |
| CN | 114089423 A | 2/2022 |
| CN | 215774282 U | 2/2022 |
| CN | 215813854 U | 2/2022 |
| CN | 215911524 U | 2/2022 |
| CN | 307125064 | 2/2022 |
| CN | 114097400 A | 3/2022 |
| CN | 307168522 | 3/2022 |
| CN | 307168531 | 3/2022 |
| CN | 307168534 | 3/2022 |
| CN | 307168536 | 3/2022 |
| CN | 307202311 | 3/2022 |
| CN | 216153511 U | 4/2022 |
| CN | 216253986 U | 4/2022 |
| CN | 307222105 | 4/2022 |
| CN | 307243485 | 4/2022 |
| CN | 307265564 | 4/2022 |
| CN | 307265565 | 4/2022 |
| CN | 307278021 | 4/2022 |
| CN | 307278029 | 4/2022 |
| CN | 307301254 | 4/2022 |
| CN | 216507708 U | 5/2022 |
| CN | 216610752 U | 5/2022 |
| CN | 307325242 | 5/2022 |
| CN | 307337031 | 5/2022 |
| CN | 307347754 | 5/2022 |
| CN | 307347757 | 5/2022 |
| CN | 307369096 | 5/2022 |
| CN | 307369129 | 5/2022 |
| CN | 307376792 | 5/2022 |
| CN | 302974154 | 10/2022 |
| CN | 115666221 A | 1/2023 |
| DE | 7345220 U | 6/1974 |
| DE | 7345211 U | 11/1974 |
| DE | 2437756 A1 | 3/1975 |
| DE | 2448130 A1 | 4/1976 |
| DE | 7609000 U1 | 9/1977 |
| DE | 2612381 A1 | 10/1977 |
| DE | 19521067 A1 | 12/1996 |
| DE | 19644057 A1 | 5/1998 |
| DE | 29823263 U1 | 4/1999 |
| DE | 19933340 A1 | 1/2001 |
| DE | 20308046 U1 | 7/2003 |
| DE | 10302908 A1 | 8/2004 |
| DE | 102006038553 A1 | 2/2008 |
| DE | 102007053310 A1 | 6/2009 |
| DE | 102007060056 A1 | 6/2009 |
| DE | 102008011947 A1 | 9/2009 |
| DE | 202010007832 U1 | 8/2010 |
| DE | 402010004757-0001 | 12/2010 |
| DE | 102009027557 A1 | 1/2011 |
| DE | 202012011298 U1 | 1/2013 |
| DE | 202012009375 U1 | 4/2013 |
| DE | 102013202075 A1 | 8/2014 |
| DE | 102013203549 A1 | 9/2014 |
| DE | 102013203705 A1 | 9/2014 |
| DE | 202014005547 U1 | 9/2014 |
| DE | 202014102390 U1 | 9/2014 |
| DE | 102014211712 A1 | 2/2015 |
| DE | 102014112587 A1 | 3/2015 |
| DE | 102014208434 A1 | 11/2015 |
| DE | 102014210277 A1 | 12/2015 |
| DE | 102014212399 A1 | 12/2015 |
| DE | 102016205336 A1 | 10/2017 |
| DE | 102016219270 A1 | 4/2018 |
| DE | 102016222659 A1 | 5/2018 |
| DE | 202018100833 U1 | 5/2018 |
| DE | 202018100835 U1 | 5/2018 |
| DE | 202018100836 U1 | 5/2018 |
| DE | 102018206803 A1 | 11/2019 |
| DE | 202015009764 U1 | 1/2020 |
| DE | 102017204865 A1 | 11/2020 |
| DE | 102019206856 A1 | 11/2020 |
| DE | 102019214995 A1 | 4/2021 |
| DE | 102019215913 A1 | 4/2021 |
| DE | 102021100122 A1 | 7/2021 |
| DE | 102020202740 A1 | 9/2021 |
| EP | 1364571 A2 | 11/2003 |
| EP | 1709859 A1 | 10/2006 |
| EP | 2006708 A1 | 12/2008 |
| EP | 2026161 A1 | 2/2009 |
| EP | 2163352 A2 | 3/2010 |
| EP | 2248409 A1 | 11/2010 |
| EP | 2269433 A1 | 1/2011 |
| EP | 2286653 A2 | 2/2011 |
| EP | 2296072 A2 | 3/2012 |
| EP | 2425700 A2 | 3/2012 |
| EP | 2586283 A1 | 5/2013 |
| EP | 2687077 A2 | 1/2014 |
| EP | 2693072 A1 | 2/2014 |
| EP | 2798937 A1 | 11/2014 |
| EP | 2823936 A2 | 1/2015 |
| EP | 2851760 A1 | 3/2015 |
| EP | 2875712 A1 | 5/2015 |
| EP | 2717110 B1 | 8/2015 |
| EP | 2959764 A1 | 12/2015 |
| EP | 2960741 A2 | 12/2015 |
| EP | 2960742 A1 | 12/2015 |
| EP | 2783561 B1 | 3/2016 |
| EP | 2692220 B1 | 4/2016 |
| EP | 3047719 A1 | 7/2016 |
| EP | 3118016 A1 | 1/2017 |
| EP | 3165075 A1 | 5/2017 |
| EP | 3167699 A1 | 5/2017 |
| EP | 3167700 A1 | 5/2017 |
| EP | 3222132 A2 | 9/2017 |
| EP | 2883437 B1 | 3/2018 |
| EP | 3316067 A1 | 5/2018 |
| EP | 2743789 B1 | 6/2018 |
| EP | 3330824 A1 | 6/2018 |
| EP | 3366102 A1 | 8/2018 |
| EP | 3381258 A1 | 10/2018 |
| EP | 3479682 A1 | 5/2019 |
| EP | 2960100 B1 | 8/2019 |
| EP | 3520593 A1 | 8/2019 |
| EP | 3528213 A1 | 8/2019 |
| EP | 3534183 A1 | 9/2019 |
| EP | 3597090 A1 | 1/2020 |
| EP | 3660618 A1 | 6/2020 |
| EP | 3725146 A1 | 10/2020 |
| EP | 3753387 A1 | 12/2020 |
| EP | 3791708 A1 | 3/2021 |
| EP | 3831544 A1 | 6/2021 |
| EP | 3837944 A1 | 6/2021 |
| EP | 3837945 A1 | 6/2021 |
| EP | 3837946 A1 | 6/2021 |
| EP | 3861911 A2 | 8/2021 |
| ES | 199267 U | 7/1975 |
| ES | 451339 A1 | 12/1977 |
| FR | 2771141 A1 | 5/1999 |
| FR | 3114537 A1 | 4/2022 |
| GB | 1288108 A | 3/1971 |
| GB | 1371959 A | 10/1974 |

(56) References Cited

FOREIGN PATENT DOCUMENTS

| | | | |
|---|---|---|---|
| GB | 1451896 A | 10/1976 |
| GB | 1452308 A | 10/1976 |
| GB | 1489373 A | 10/1977 |
| GB | 1526519 A | 9/1978 |
| GB | 1557379 A | 12/1979 |
| GB | 2287170 A | 9/1995 |
| GB | 2295304 A | 5/1996 |
| GB | 2305840 A | 4/1997 |
| GB | 2419430 A | 4/2006 |
| GB | 2432922 A | 6/2007 |
| GB | 2433791 A | 7/2007 |
| GB | 90017056580001 | 5/2010 |
| GB | 2500168 A | 9/2013 |
| GB | 90024715400001 | 8/2014 |
| GB | 2513960 A | 11/2014 |
| GB | 2515556 A | 12/2014 |
| GB | 2516370 A | 1/2015 |
| GB | 90027012680001 | 5/2015 |
| GB | 90027378900001 | 10/2015 |
| GB | 90041329260001 | 9/2017 |
| GB | 90029638920001 | 3/2018 |
| GB | 90056318840001 | 9/2018 |
| GB | 2563347 A | 12/2018 |
| GB | 90040756950001 | 6/2019 |
| GB | 90073918420006 | 1/2020 |
| GB | 90080413210001 | 8/2020 |
| GB | 2581956 A | 9/2020 |
| GB | 90081876860001 | 10/2020 |
| GB | 6195686 | 5/2022 |
| JP | 2006251883 A | 9/2006 |
| JP | 2006268497 A | 10/2006 |
| JP | 2011020615 A | 2/2011 |
| JP | 2015149963 A | 8/2015 |
| KR | 20130044130 A | 5/2013 |
| KR | 20150125305 A | 11/2015 |
| SE | 538774 C2 | 11/2016 |
| SE | 540834 C2 | 11/2018 |
| SE | 542098 C2 | 2/2020 |
| SE | 543019 C2 | 9/2020 |
| SE | 543247 C2 | 10/2020 |
| SE | 2150377 A1 | 3/2021 |
| SE | 1951390 A1 | 6/2021 |
| SE | 2150080 A1 | 6/2021 |
| SE | 2050216 A1 | 8/2021 |
| SE | 543941 C2 | 9/2021 |
| SE | 543943 C2 | 9/2021 |
| SE | 2150193 A1 | 10/2021 |
| SE | 2150394 A1 | 10/2021 |
| WO | WO9106435 A1 | 5/1991 |
| WO | WO9749528 A1 | 12/1997 |
| WO | WO0060921 A1 | 10/2000 |
| WO | WO0074466 A1 | 12/2000 |
| WO | WO03040846 A1 | 5/2003 |
| WO | WO03103375 A1 | 12/2003 |
| WO | WO2005002320 A1 | 1/2005 |
| WO | WO2006094887 A2 | 9/2006 |
| WO | WO2006094889 A1 | 9/2006 |
| WO | WO2006102740 A1 | 10/2006 |
| WO | WO2007091967 A1 | 8/2007 |
| WO | WO2007140930 A1 | 12/2007 |
| WO | WO2008015479 A2 | 2/2008 |
| WO | WO2008060689 A2 | 5/2008 |
| WO | WO2008068494 A1 | 6/2008 |
| WO | WO2008095715 A2 | 8/2008 |
| WO | WO2008144135 A1 | 11/2008 |
| WO | WO2009036644 A1 | 3/2009 |
| WO | WO2009071379 A1 | 6/2009 |
| WO | WO2009077239 A1 | 6/2009 |
| WO | WO2009083319 A1 | 7/2009 |
| WO | WO2010077198 A1 | 7/2010 |
| WO | WO2010130479 A2 | 11/2010 |
| WO | WO2011115536 A1 | 9/2011 |
| WO | WO2012047176 A1 | 4/2012 |
| WO | WO2013010475 A1 | 1/2013 |
| WO | WO2013011252 A1 | 1/2013 |
| WO | WO2013025135 A1 | 2/2013 |
| WO | WO2013064301 A1 | 5/2013 |
| WO | WO2013081516 A1 | 6/2013 |
| WO | WO2013083311 A1 | 6/2013 |
| WO | WO2013102417 A1 | 7/2013 |
| WO | WO2013107266 A1 | 7/2013 |
| WO | WO2013107374 A1 | 7/2013 |
| WO | WO2013125992 A1 | 8/2013 |
| WO | WO2013185622 A1 | 12/2013 |
| WO | WO2014007694 A1 | 1/2014 |
| WO | WO2014056443 A1 | 4/2014 |
| WO | WO2014071860 A1 | 5/2014 |
| WO | WO2014079363 A1 | 5/2014 |
| WO | WO2014079632 A1 | 5/2014 |
| WO | WO2014086267 A1 | 6/2014 |
| WO | WO2014173290 A1 | 10/2014 |
| WO | WO2015010277 A1 | 1/2015 |
| WO | WO2015053488 A1 | 4/2015 |
| WO | WO2015144998 A1 | 10/2015 |
| WO | WO2015154822 A1 | 10/2015 |
| WO | WO2015161829 A1 | 10/2015 |
| WO | WO2015169343 A1 | 11/2015 |
| WO | WO2015172831 A1 | 11/2015 |
| WO | WO2015182514 A1 | 12/2015 |
| WO | WO2015192903 A1 | 12/2015 |
| WO | WO2016038512 A1 | 3/2016 |
| WO | WO2016097891 A1 | 6/2016 |
| WO | WO2016097892 A1 | 6/2016 |
| WO | WO2016097897 A1 | 6/2016 |
| WO | WO2016103070 A1 | 6/2016 |
| WO | WO2016108104 A1 | 7/2016 |
| WO | WO2016109721 A1 | 7/2016 |
| WO | WO2016119751 A1 | 8/2016 |
| WO | WO2016127923 A1 | 8/2016 |
| WO | WO2016131399 A1 | 8/2016 |
| WO | WO2016184398 A1 | 11/2016 |
| WO | WO2017101882 A1 | 6/2017 |
| WO | WO2017123137 A1 | 7/2017 |
| WO | WO2017129551 A1 | 8/2017 |
| WO | WO2017133625 A1 | 8/2017 |
| WO | WO2017148438 A1 | 9/2017 |
| WO | WO2017167207 A1 | 10/2017 |
| WO | WO2017181995 A1 | 10/2017 |
| WO | WO2017186372 A1 | 11/2017 |
| WO | WO2017190784 A1 | 11/2017 |
| WO | WO2017198222 A1 | 11/2017 |
| WO | WO2017206950 A1 | 12/2017 |
| WO | WO2017211308 A1 | 12/2017 |
| WO | WO2018001340 A1 | 1/2018 |
| WO | WO2018010650 A1 | 1/2018 |
| WO | WO2018028624 A1 | 2/2018 |
| WO | WO2018057250 A1 | 3/2018 |
| WO | WO2018057452 A2 | 3/2018 |
| WO | WO2018057589 A1 | 3/2018 |
| WO | WO2018059323 A1 | 4/2018 |
| WO | WO2018103178 A1 | 6/2018 |
| WO | WO2018117190 A1 | 6/2018 |
| WO | WO2018125222 A1 | 7/2018 |
| WO | WO2018127209 A1 | 7/2018 |
| WO | WO2018146518 A1 | 8/2018 |
| WO | WO2018153599 A1 | 8/2018 |
| WO | WO2018174777 A1 | 9/2018 |
| WO | WO2018185376 A1 | 10/2018 |
| WO | WO2018199829 A1 | 11/2018 |
| WO | WO2019034382 A1 | 2/2019 |
| WO | WO2019063012 A1 | 4/2019 |
| WO | WO2019080935 A1 | 5/2019 |
| WO | WO2019096052 A1 | 5/2019 |
| WO | WO2019096463 A1 | 5/2019 |
| WO | WO2019109982 A1 | 6/2019 |
| WO | WO2019110013 A1 | 6/2019 |
| WO | WO2019144916 A1 | 8/2019 |
| WO | WO2019157841 A1 | 8/2019 |
| WO | WO2019158090 A1 | 8/2019 |
| WO | WO2019158452 A1 | 8/2019 |
| WO | WO2019168069 A1 | 9/2019 |
| WO | WO2019170142 A1 | 9/2019 |
| WO | WO2019206274 A1 | 10/2019 |
| WO | WO2019238099 A1 | 12/2019 |

(56) References Cited

FOREIGN PATENT DOCUMENTS

| | | |
|---|---|---|
| WO | WO2020020652 A1 | 1/2020 |
| WO | WO2020063811 A1 | 4/2020 |
| WO | WO2020064087 A1 | 4/2020 |
| WO | WO2020093970 A1 | 5/2020 |
| WO | WO2020093992 A1 | 5/2020 |
| WO | WO2020098666 A1 | 5/2020 |
| WO | WO2020098670 A1 | 5/2020 |
| WO | WO2020103696 A1 | 5/2020 |
| WO | WO2020104242 A1 | 5/2020 |
| WO | WO2020107007 A1 | 5/2020 |
| WO | WO2020107772 A1 | 6/2020 |
| WO | WO2020108267 A1 | 6/2020 |
| WO | WO2020108550 A1 | 6/2020 |
| WO | WO2020114415 A1 | 6/2020 |
| WO | WO2020125450 A1 | 6/2020 |
| WO | WO2020134667 A1 | 7/2020 |
| WO | WO2020148138 A1 | 7/2020 |
| WO | WO2020155853 A1 | 8/2020 |
| WO | WO2020156519 A1 | 8/2020 |
| WO | WO2020156684 A1 | 8/2020 |
| WO | WO2020156851 A1 | 8/2020 |
| WO | WO2020161021 A1 | 8/2020 |
| WO | WO2020170933 A1 | 8/2020 |
| WO | WO2020193513 A1 | 10/2020 |
| WO | WO2020199055 A1 | 10/2020 |
| WO | WO2020218960 A1 | 10/2020 |
| WO | WO2020256619 A1 | 12/2020 |
| WO | WO2020259586 A1 | 12/2020 |
| WO | WODM212022 | 12/2020 |
| WO | WO2021013173 A1 | 1/2021 |
| WO | WO2021023227 A1 | 2/2021 |
| WO | WO2021031418 A1 | 2/2021 |
| WO | WO2021031423 A1 | 2/2021 |
| WO | WO2021031451 A1 | 2/2021 |
| WO | WO2021036033 A1 | 3/2021 |
| WO | WO2021036077 A1 | 3/2021 |
| WO | WO2021047063 A1 | 3/2021 |
| WO | WO2021047068 A1 | 3/2021 |
| WO | WO2021047602 A1 | 3/2021 |
| WO | WO2021068370 A1 | 4/2021 |
| WO | WO2021068928 A1 | 4/2021 |
| WO | WO2021078220 A1 | 4/2021 |
| WO | WO2021082817 A1 | 5/2021 |
| WO | WO2021088551 A1 | 5/2021 |
| WO | WO2021088553 A1 | 5/2021 |
| WO | WO2021088558 A1 | 5/2021 |
| WO | WO2021093474 A1 | 5/2021 |
| WO | WO2021093526 A1 | 5/2021 |
| WO | WO2021093851 A1 | 5/2021 |
| WO | WO2021098382 A1 | 5/2021 |
| WO | WO2021103803 A1 | 6/2021 |
| WO | WO2021103804 A1 | 6/2021 |
| WO | WO2021110414 A1 | 6/2021 |
| WO | WO2021114988 A1 | 6/2021 |
| WO | WO2021115364 A1 | 6/2021 |
| WO | WO2021136234 A1 | 7/2021 |
| WO | WO2021139389 A1 | 7/2021 |
| WO | WO2021139683 A1 | 7/2021 |
| WO | WO2021139685 A1 | 7/2021 |
| WO | WO2021139809 A1 | 7/2021 |
| WO | WO2021147494 A1 | 7/2021 |
| WO | WO2021147792 A1 | 7/2021 |
| WO | WO2021164738 A1 | 8/2021 |
| WO | WO2021175331 A1 | 9/2021 |
| WO | WO2021180123 A1 | 9/2021 |
| WO | WO2021190627 A1 | 9/2021 |
| WO | WO2021208308 A1 | 10/2021 |
| WO | WO2021215980 A1 | 10/2021 |
| WO | WODM217452 | 10/2021 |
| WO | WO2021225494 A1 | 11/2021 |
| WO | WO2021230791 A1 | 11/2021 |
| WO | WO2021233205 A1 | 11/2021 |
| WO | WO-2021239836 A1 * 12/2021 ........... A01D 34/008 |
| WO | WO2022042362 A1 | 3/2022 |

OTHER PUBLICATIONS

US 8,275,482 B2, 09/2012, Casey et al. (withdrawn)
US 10,675,758 B2, 06/2020, Cohen et al. (withdrawn)
US 10,798,874 B2, 10/2020, Balutis et al. (withdrawn)
US 10,952,370 B2, 03/2021, Matt et al. (withdrawn)
Extended European Search Report for Application No. 23186317.6 dated Jan. 15, 2024 (5 pages).

* cited by examiner

GENERATION OF A CRYPTOGRAPHY KEY FOR A ROBOTIC GARDEN TOOL

RELATED APPLICATIONS

This application claims priority to U.S. Provisional Application No. 63/393,352, filed on Jul. 29, 2022, the entire contents of which are hereby incorporated by reference.

FIELD

Embodiments described herein relate to generating a cryptography key included in a cryptography key pair used to authenticate communication between a robotic garden tool and a server.

SUMMARY

One embodiment includes a communication system that may include an external device and a robotic garden tool. The external device may include an external device memory, and an external device network interface configured to allow the external device to communicate with other devices. The external device may further include an external device electronic processor coupled to the external device memory and to the external device network interface. The external device electronic processor may be configured to generate a first key pair including a first private key for a robotic garden tool and a first public key for a server device. The external device electronic processor may be further configured to transmit, via the external device network interface, the first private key to the robotic garden tool. The external device electronic processor may be further configured to transmit, via the external device network interface, the first public key to the server device. The robotic garden tool may include a housing, and a set of wheels coupled to the housing and configured to rotate to propel the robotic garden tool on an operating surface in an operating area. The robotic garden tool may also include at least one wheel motor coupled to one or more wheels of the set of wheels. The at least one wheel motor may be configured to drive rotation of the one or more wheels. The robotic garden tool may also include a robotic garden tool memory, and a robotic garden tool network interface configured to allow the robotic garden tool to communicate with other devices. The robotic garden tool may also include a robotic garden tool electronic processor coupled to the robotic garden tool memory and to the robotic garden tool network interface. The robotic garden tool electronic processor may be configured to receive, via the robotic garden tool network interface, the first private key from the external device. The robotic garden tool electronic processor may be further configured to store the first private key in the robotic garden tool memory. The robotic garden tool electronic processor may be configured to receive, via the robotic garden tool network interface, an encrypted first instruction from the server device. The encrypted first instruction may have been encrypted by the server device using the first public key. The robotic garden tool electronic processor may be configured to decrypt the encrypted first instruction using the first private key to generate a decrypted first instruction. The robotic garden tool electronic processor may be configured to control operation of the robotic garden tool in accordance with the decrypted first instruction.

In addition to any combination of features described above, the communication system may include the server device. The server device may include a server device memory, and a server device network interface configured to allow the server device to communicate with other devices. The server device may include a server device electronic processor coupled to the server device memory and the server device network interface. The server device electronic processor may be configured to receive, via the server device network interface and from the external device, the first public key and an identity of the robotic garden tool with which the first public key is associated. The server device electronic processor may be configured store the first public key and the identity of the robotic garden tool with which the first public key is associated in the server device memory. The server device electronic processor may be configured generate a first instruction to be transmitted to the robotic garden tool. The server device electronic processor may be configured encrypt the first instruction using the first public key to generate the encrypted first instruction. The server device electronic processor may be configured transmit, via the server device network interface, the encrypted first instruction to the robotic garden tool.

In addition to any combination of features described above, the server device electronic processor may be configured to generate the first instruction in response to receiving, via the server device network interface, a request to generate the first instruction from the external device or another external device. The request to generate the first instruction may be provided to the server device in response to a user input received on the external device or the another external device.

In addition to any combination of features described above, the first instruction may include at least one selected from the group consisting of a command to start operation of the robotic garden tool, a command to stop operation of the robotic garden tool, scheduling information regarding operation of the robotic garden tool, and combinations thereof.

In addition to any combination of features described above, the external device electronic processor may be further configured to generate a certificate associated with the first public key, and transmit the certificate to the server device for storage by the server device. The robotic garden tool electronic processor may configured to receive the certificate from the server device along with the first public key and the encrypted first instruction, and authenticate the certificate before decrypting the encrypted first instruction.

In addition to any combination of features described above, the external device electronic processor may be configured to generate the first key pair and distribute the first key pair in response to one of service of the server device being changed to another server device, an expiration of a previously generated public key, a user input indicating that a new key pair should be generated for the robotic garden tool, or receiving an over-the-air (OTA) update from the server device.

In addition to any combination of features described above, the external device electronic processor may be further configured to generate a second key pair including a second private key for the server device and a second public key for the robotic garden tool. The external device electronic processor may transmit, via the external device network interface, the second private key to the server device, and transmit, via the external device network interface, the second public key to the robotic garden tool. The server device may include a server device memory, and a server device network interface configured to allow the server device to communicate with other devices. The server device may include a server device electronic processor coupled to the server device memory and the server device network interface. The server device electronic processor may be configured to receive, via the server device network interface, the second private key from the external device. The server device electronic processor may be configured to store the second private key in the server device memory. The server device electronic processor may be configured to receive, via the server device network interface, an encrypted first message from the robotic garden tool. The encrypted first message may have been encrypted by the robotic garden tool using the second public key. The server device electronic processor may be configured to decrypt the encrypted first message using the second private key to generate a decrypted first message. The server device electronic processor may be configured to at least one selected from the group consisting of (i) store information included in the first decrypted message in the server device memory, (ii) provide a notification to the external device or another external device based on the information included in the first decrypted message, and both (i) and (ii).

In addition to any combination of features described above, the robotic garden tool electronic processor may be configured to receive, via the robotic garden tool network interface and from the external device, the second public key. The robotic garden tool electronic processor may be configured to store the second public key in the robotic garden tool memory. The robotic garden tool electronic processor may be configured to generate a first message to be transmitted to the server device. The robotic garden tool electronic processor may be configured to encrypt the first message using the second public key to generate the encrypted first message. The robotic garden tool electronic processor may be configured to transmit, via the robotic garden tool network interface, the encrypted first message to the server device.

In addition to any combination of features described above, the robotic garden tool electronic processor may be configured to generate the first message in response to at least one selected from the group consisting of detecting an error of a component of the robotic garden tool, detecting a status change of the robotic garden tool, a predetermined period of time elapsing, and combinations thereof.

In addition to any combination of features described above, the first message includes at least one selected from the group consisting of error information of the robotic garden tool, a status of the robotic garden tool, a location of the robotic garden tool, and combinations thereof.

In addition to any combination of features described above, the external device electronic processor may be further configured to generate a certificate associated with the second public key. The external device electronic processor may be configured to transmit the certificate to the robotic garden tool for storage in the robotic garden tool memory. The server device electronic processor may be configured to receive the certificate from the robotic garden tool along with the second public key and the encrypted first message, and authenticate the certificate before decrypting the encrypted first message.

In addition to any combination of features described above, the external device electronic processor may be configured to generate the second key pair and distribute the second key pair in response to one of service of the server device being changed to another server device, an expiration of a previously generated public key, a user input indicating that a new key pair should be generated for the robotic garden tool, or receiving an over-the-air (OTA) update from the server device.

Another embodiment includes a communication system that may include a server device and a robotic garden tool. The server device may include a server device memory, and a server device network interface configured to allow the server device to communicate with other devices. The server device may further include a server device electronic processor coupled to the server device memory and the server device network interface. The server device electronic processor may be configured to generate a first key pair including a first private key for a robotic garden tool and a first public key for the server device. The server device electronic processor may be further configured to store the first public key in the server device memory. The server device electronic processor may be further configured to transmit, via the server device network interface, the first private key for storage in the robotic garden tool. The robotic garden tool may include a housing, and a set of wheels coupled to the housing and configured to rotate to propel the robotic garden tool on an operating surface in an operating area. The robotic garden tool may further include at least one wheel motor coupled to one or more wheels of the set of wheels. The at least one wheel motor may be configured to drive rotation of the one or more wheels. The robotic garden tool may include a robotic garden tool memory, and a robotic garden tool network interface configured to allow the robotic garden tool to communicate with other devices. The robotic garden tool may further include a robotic garden tool electronic processor coupled to the robotic garden tool memory and to the robotic garden tool network interface. The robotic garden tool electronic processor may be configured to receive, via the robotic garden tool network interface, the first private key. The robotic garden tool electronic processor may be further configured to store the first private key in the robotic garden tool memory. The robotic garden tool electronic processor may be further configured to receive, via the robotic garden tool network interface, an encrypted first instruction from the server device. The encrypted first instruction may have been encrypted by the server device using the first public key. The robotic garden tool electronic processor may be further configured to decrypt the encrypted first instruction using the first private key to generate a decrypted first instruction. The robotic garden tool electronic processor may be further configured to control operation of the robotic garden tool in accordance with the decrypted first instruction.

In addition to any combination of features described above, the server device may be configured to transmit the first private key to an external device, and the robotic garden tool may be configured to receive the first private key from the external device.

In addition to any combination of features described above, the server device electronic processor may be further configured to generate a certificate associated with the first public key. The server device electronic processor may be configured to store the certificate in the server device memory. The robotic garden tool electronic processor may be configured to receive the certificate from the server device along with the first public key and the encrypted first instruction, and authenticate the certificate before decrypting the encrypted first instruction.

In addition to any combination of features described above, the server device electronic processor may be configured to generate the first key pair and transmit the first private key for storage by the robotic garden tool in response to one of service of a previous server device being changed to the server device, an expiration of a previously generated public key, or a user input indicating that a new key pair should be generated for the robotic garden tool.

Another embodiment includes a communication system that may include a robotic garden tool and a server device. The robotic garden tool may include a housing, and a set of wheels coupled to the housing and configured to rotate to propel the robotic garden tool on an operating surface in an operating area. The robotic garden tool may further include at least one wheel motor coupled to one or more wheels of the set of wheels. The at least one wheel motor may be configured to drive rotation of the one or more wheels. The robotic garden tool may further include a robotic garden tool memory, and a robotic garden tool network interface configured to allow the robotic garden tool to communicate with other devices. The robotic garden tool may further include a robotic garden tool electronic processor coupled to the robotic garden tool memory and to the robotic garden tool network interface. The robotic garden tool electronic processor may be configured to generate a first key pair including a first private key for the robotic garden tool and a first public key for a server device. The robotic garden tool electronic processor may be further configured to store the first private key in the robotic garden tool device memory. The robotic garden tool electronic processor may be further configured to transmit, via the robotic garden tool network interface, the first public key for storage in the server device. The server device may include a server device memory, and a server device network interface configured to allow the server device to communicate with other devices. The server device may further include a server device electronic processor coupled to the server device memory and the server device network interface. The server device electronic processor may be configured to receive, via the server device network interface, the first public key. The server device electronic processor may be further configured to store the first public key in the server device memory. The robotic garden tool electronic processor may be further configured to receive, via the robotic garden tool network interface, an encrypted first instruction from the server device. The encrypted first instruction may have been encrypted by the server device using the first public key. The robotic garden tool electronic processor may be further configured to decrypt the encrypted first instruction using the first private key to generate a decrypted first instruction. The robotic garden tool electronic processor may be further configured to control operation of the robotic garden tool in accordance with the decrypted first instruction.

In addition to any combination of features described above, the robotic garden tool may be configured to transmit the first public key to an external device, and the server device may be configured to receive the first public key from the external device.

In addition to any combination of features described above, the robotic garden tool electronic processor may be configured to generate a certificate associated with the first public key, and transmit the certificate for storage by the server device. The robotic garden tool electronic processor may be configured to receive the certificate from the server device along with the first public key and the encrypted first instruction, and authenticate the certificate before decrypting the encrypted first instruction.

In addition to any combination of features described above, the robotic garden tool electronic processor may be configured to generate the first key pair and transmit the first public key for storage by the server device in response to one of service of a previous server device being changed to the server device, an expiration of a previously generated public key, a user input indicating that a new key pair should be generated for the robotic garden tool, or receiving an over-the-air (OTA) update from the server device.

Another embodiment includes a communication system that may include an external device. The external device may include an external device memory, an external device network interface configured to allow the external device to communicate with other devices, and an external device electronic processor coupled to the external device memory and to the external device network interface. The external device electronic processor may be configured to generate a first key pair including a first private key and a first public key. The external device electronic processor may be configured to transmit, via the external device network interface, the first private key to a first device that includes a robotic garden tool or a server device. The external device electronic processor may be configured to transmit, via the external device network interface, the first public key to a second device that includes the other of the robotic garden tool and the server device. The communication system may include the robotic garden tool. The robotic garden tool may include a housing, and a set of wheels coupled to the housing and configured to rotate to propel the robotic garden tool on an operating surface in an operating area. The robotic garden tool may include at least one wheel motor coupled to one or more wheels of the set of wheels. The at least one wheel motor may be configured to drive rotation of the one or more wheels. The robotic garden tool may include a robotic garden tool memory, a robotic garden tool network interface configured to allow the robotic garden tool to communicate with other devices, and a robotic garden tool electronic processor coupled to the robotic garden tool memory and to the robotic garden tool network interface. The robotic garden tool electronic processor may be configured to receive, via the robotic garden tool network interface, one of the first private key or the first public key from the external device. The robotic garden tool electronic processor may be configured to store one of the first private key or the first public key in the robotic garden tool memory. The robotic garden tool electronic processor may be configured to receive, via the robotic garden tool network interface, an encrypted first instruction from the server device. The encrypted first instruction may have been encrypted by the server device using the other of the one of the first private key or the first public key. The robotic garden tool electronic processor may be configured to decrypt the encrypted first instruction using the one of the first private key or the first public key to generate a decrypted first instruction. The robotic garden tool electronic processor may be configured to control operation of the robotic garden tool in accordance with the decrypted first instruction.

In addition to any combination of features described above, the first device may include the robotic garden tool, and the one of the first private key or the first public key may include the first private key.

In addition to any combination of features described above, the communication system may further comprise the server device. The server device may include a server device memory, a server device network interface configured to allow the server device to communicate with other devices, and a server device electronic processor coupled to the server device memory and the server device network interface. The server device electronic processor may be configured to receive, via the server device network interface and from the external device, the other of the one of the first private key or the first public key and an identity of the robotic garden tool with which the one of the first private key or the first public key is associated. The server device electronic processor may be configured to store the other of the one of the first private key or the first public key and the identity of the robotic garden tool with which the one of the first private key or the first public key is associated in the server device memory. The server device electronic processor may be configured to generate a first instruction to be transmitted to the robotic garden tool. The server device electronic processor may be configured to encrypt the first instruction using the other of the one of the first private key or the first public key to generate the encrypted first instruction. The server device electronic processor may be configured to transmit, via the server device network interface, the encrypted first instruction to the robotic garden tool.

In addition to any combination of features described above, the first device may include the robotic garden tool, and the one of the first private key or the first public key includes the first private key.

Another embodiment includes a communication system that may include a server device. The server device may include a server device memory, a server device network interface configured to allow the server device to communicate with other devices, and a server device electronic processor coupled to the server device memory and the server device network interface. The server device electronic processor may be configured to generate a first key pair including a first private key and a first public key. The server device electronic processor may be configured to store one of the first private key or the first public key in the server device memory. The server device electronic processor may be configured to transmit, via the server device network interface, the other of the first private key or the first public key for storage in a robotic garden tool. The communication system may also include the robotic garden tool. The robotic garden tool may include a housing, and a set of wheels coupled to the housing and configured to rotate to propel the robotic garden tool on an operating surface in an operating area. The robotic garden tool also may include at least one wheel motor coupled to one or more wheels of the set of wheels. The at least one wheel motor may be configured to drive rotation of the one or more wheels. The robotic garden tool may also include a robotic garden tool memory, a robotic garden tool network interface configured to allow the robotic garden tool to communicate with other devices, and a robotic garden tool electronic processor coupled to the robotic garden tool memory and to the robotic garden tool network interface. The robotic garden tool electronic processor may be configured to receive, via the robotic garden tool network interface, the other of the first private key or the first public key. The robotic garden tool electronic processor may be configured to store the other of the first private key or the first public key in the robotic garden tool memory. The robotic garden tool electronic processor may be configured to receive, via the robotic garden tool network interface, an encrypted first instruction from the server device. The encrypted first instruction may have been encrypted by the server device using the one of the first private key or the first public key. The robotic garden tool electronic processor may be configured to decrypt the encrypted first instruction using the other of the first private key or the first public key to generate a decrypted first instruction. The robotic garden tool electronic processor may be configured to control operation of the robotic garden tool in accordance with the decrypted first instruction.

In addition to any combination of features described above, the one of the first private key or the first public key includes the first public key.

Another embodiment includes a communication system that may include a robotic garden tool. The robotic garden tool may include a housing, and a set of wheels coupled to the housing and configured to rotate to propel the robotic garden tool on an operating surface in an operating area. The robotic garden tool may include at least one wheel motor coupled to one or more wheels of the set of wheels. The at least one wheel motor may be configured to drive rotation of the one or more wheels. The robotic garden tool may also include a robotic garden tool memory, a robotic garden tool network interface configured to allow the robotic garden tool to communicate with other devices, and a robotic garden tool electronic processor coupled to the robotic garden tool memory and to the robotic garden tool network interface. The robotic garden tool electronic processor may be configured to generate a first key pair including a first private key and a first public key. The robotic garden tool electronic processor may be configured to store one of the first private key or the first public key in the robotic garden tool device memory. The robotic garden tool electronic processor may be configured to transmit, via the robotic garden tool network interface, the other of the first private key or the first public key for storage in a server device. The communication system may also include the server device. The server device may include a server device memory, a server device network interface configured to allow the server device to communicate with other devices, and a server device electronic processor coupled to the server device memory and the server device network interface. The server device electronic processor may be configured to receive, via the server device network interface, the other of the first private key or the first public key. The server device electronic processor may be configured to store the other of the first private key or the first public key in the server device memory. The robotic garden tool electronic processor may be further configured to receive, via the robotic garden tool network interface, an encrypted first instruction from the server device. The encrypted first instruction may have been encrypted by the server device using the other of the first private key or the first public key. The robotic garden tool electronic processor may be further configured to decrypt the encrypted first instruction using the one of the first private key or the first public key to generate a decrypted first instruction. The robotic garden tool electronic processor may be further configured to control operation of the robotic garden tool in accordance with the decrypted first instruction.

In addition to any combination of features described above, the one of the first private key or the first public key includes the first private key.

Other aspects, features, and embodiments will become apparent by consideration of the detailed description and accompanying drawings.

DETAILED DESCRIPTION

Figure 1A:
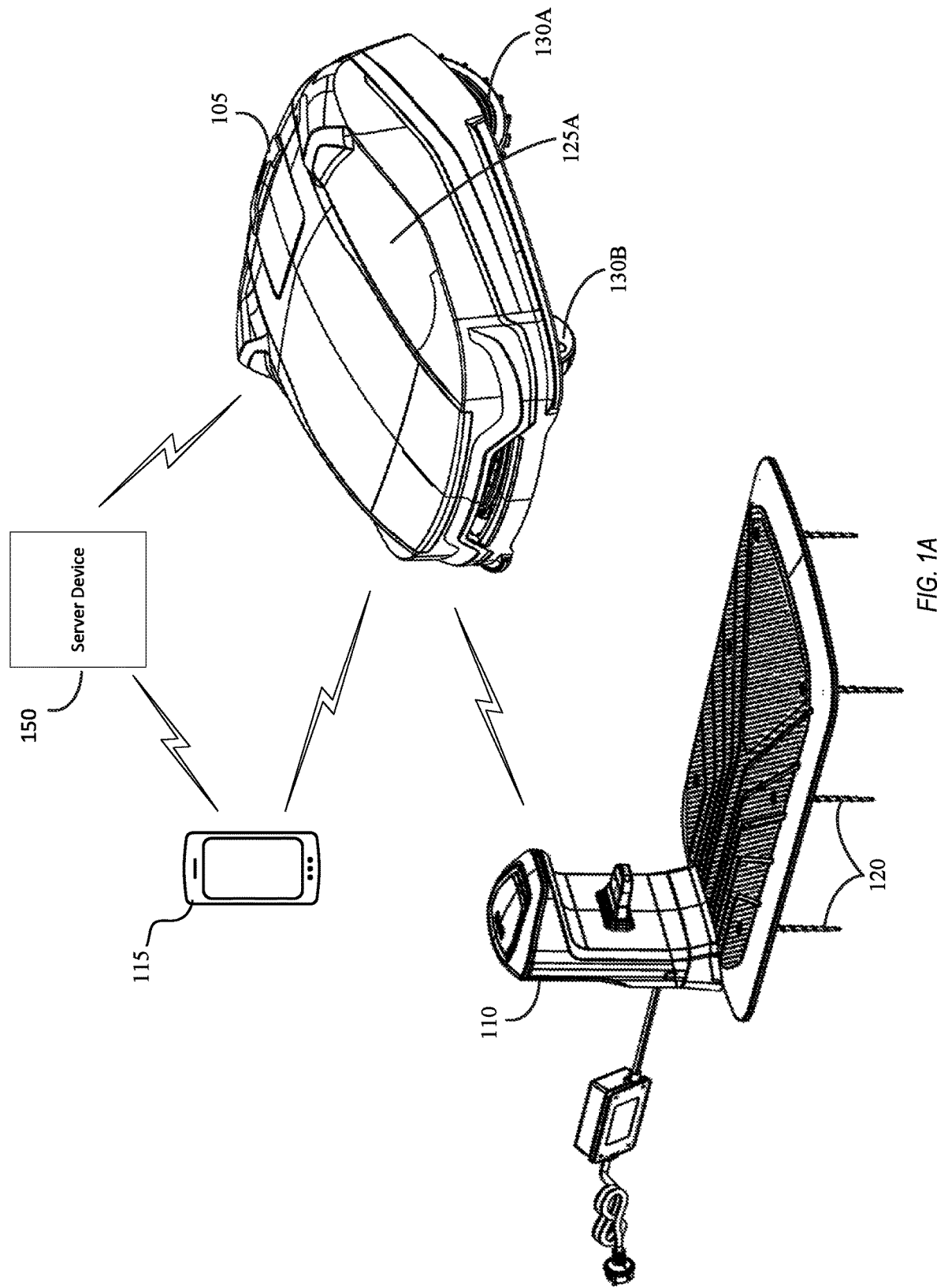
FIG. 1A illustrates a communication system including a robotic garden tool according to some example embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor," "central processing unit," and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Throughout this application, the term "approximately" may be used to describe the dimensions of various components. In some situations, the term "approximately" means that the described dimension is within 1% of the stated value, within 5% of the stated value, within 10% of the stated value, or the like. When the term "and/or" is used in this application, it is intended to include any combination of the listed components. For example, if a component includes A and/or B, the component may include solely A, solely B, or A and B.

FIG. 1A illustrates a communication system 100 that may include a robotic garden tool 105 (e.g., a robotic lawn mower 105 that may also be referred to as a robotic mower 105), a docking station 110 for the robotic mower 105, an external device 115, and a server device 150 according to some example embodiments. The robotic garden tool 105 is primarily described as being a robotic lawn mower 105. However, in other embodiments, the robotic garden tool 105 may include a tool for sweeping debris, vacuuming debris, clearing debris, collecting debris, moving debris, etc. Debris may include plants (such as grass, leaves, flowers, stems, weeds, twigs, branches, etc., and clippings thereof), dust, dirt, jobsite debris, snow, and/or the like. For example, other implementations of the robotic garden tool 105 may include a vacuum cleaner, a trimmer, a string trimmer, a hedge trimmer, a sweeper, a cutter, a plow, a blower, a snow blower, etc. In yet other embodiments, the robotic garden tool 105 may include a device for distributing a substance. For example, the robotic garden tool 105 may distribute fertilizer, paint (e.g., spray paint), chalk, or another substance on a lawn or other surface.

In some embodiments, a lawn may include any type of property that includes grass, a crop, some other material to be trimmed, cleared, gathered, etc., and/or that includes some material to receive treatment from the robotic garden tool 105 (e.g., fertilizer to treat grass in the lawn). In some embodiments, a lawn may include paved portions of a property (e.g., a driveway), for example, when the robotic garden tool 105 is used for snow plowing/removal or when the robotic garden tool 105 is used to paint a paved surface.

In some embodiments, the docking station 110 may be installed in a worksite using stakes 120. The robotic garden tool 105 may be configured to mow a yard and dock at the docking station 110 in order to charge a battery pack 245 of the robotic garden tool 105 (see FIG. 2). In some embodiments, the docking station 110 is configured to make an electrical connection with a power supply (e.g., via a cord and plug connected to a wall outlet that is connected to a power grid) in order to provide charging current to the robotic garden tool 105 when the robotic garden tool 105 is electrically coupled with the docking station 110. In some embodiments, the battery pack 245 is a removable, rechargeable battery pack configured to be charged at a charging device/charger while a second removable, rechargeable battery pack is used with the robotic garden tool 105.

As indicated in FIG. 1A, in some embodiments, the robotic garden tool 105 is configured to bidirectionally wirelessly communicate with the external device 115, the docking station 110, and/or the server device 150. In some embodiments, the robotic garden tool 105 is configured to directly communicate with the external device 115 when the robotic garden tool 105 is within communication range of the external device 115 (e.g., via Bluetooth™, Bluetooth™ low energy (BLE), WiFi™, or the like). In some embodiments, the robotic garden tool 105 is additionally or alternatively configured to communicate with the external device 115 via an intermediary device such as a cellular communication tower/base station, another device in a cellular network, or the like (e.g., when the robotic garden tool 105 is outside of direct communication range with the external device 115). In some embodiments, the robotic garden tool 105 is configured to communicate similarly with the server device 150 (e.g., via message queuing telemetry transport (MQTT) protocol). The external device 115 may be, for example, a smart phone (as illustrated), a laptop computer, a desktop computer, a tablet computer, a personal digital assistant (PDA), a wireless communication router that allows another external device 115 that is located remotely from the robotic garden tool 105 to communicate with the robotic garden tool 105, or another electronic device capable of communicating with the robotic garden tool 105. The server device 150 may be, for example, a cloud computing repository, a database, a blockchain network, or any other type of network capable of receiving, transmitting, and storing data. For example, the server device 150 may be configured to bidirectionally communicate with the external device 115 that may be running an application (i.e., an APP) using for example, a representational state transfer application programming interface (REST API).

The external device 115 may also be configured to communicate with the robotic garden tool 105 to enable or disable certain features/operations of the robotic garden tool 105 in accordance with instructions received via a user input on a user interface of the external device 115 (e.g., a command to start operation of the robotic garden tool, a command to stop operation of the robotic garden tool, scheduling information regarding operation of the robotic garden tool, and/or the like). The external device 115 may also be configured to transmit the information to the server device 150 and/or receive information from the server device 150. For example, the external device 115 may receive (and display on a user interface) status information of the robotic garden tool 105 from the robotic garden tool 105 and/or the server device 150 In some embodiments, the communication between the external device 115 and the robotic garden tool 105 may be wireless or may be wired (e.g., via a Universal Serial Bus (USB) cord configured to connect to respective USB ports of the external device 115 and the robotic garden tool 105). The external device 115 is further configured to communicate with the server device 150, in a wired and/or wireless manner.

In some embodiments, the docking station 110 may also be configured to bidirectionally communicate with any one or a combination of the robotic garden tool 105, the external device 115, and the server device 150.

While FIG. 1A illustrates one robotic garden tool 105, one charging/docking station 110, one external device 115, and one server device 150, in some embodiments, the communication system 100 includes additional robotic garden tools 105, docking stations 110, external devices 115, and/or server devices 150. In some embodiments, a single external device 115 and/or a single server device 150 may be configured to communicate with multiple robotic garden tools 105. In some embodiments, a single robotic garden tool 105 may be configured to communicate with multiple external devices 115 (e.g., of the same user or of different users) and/or multiple server devices 150.

Figure 1B:
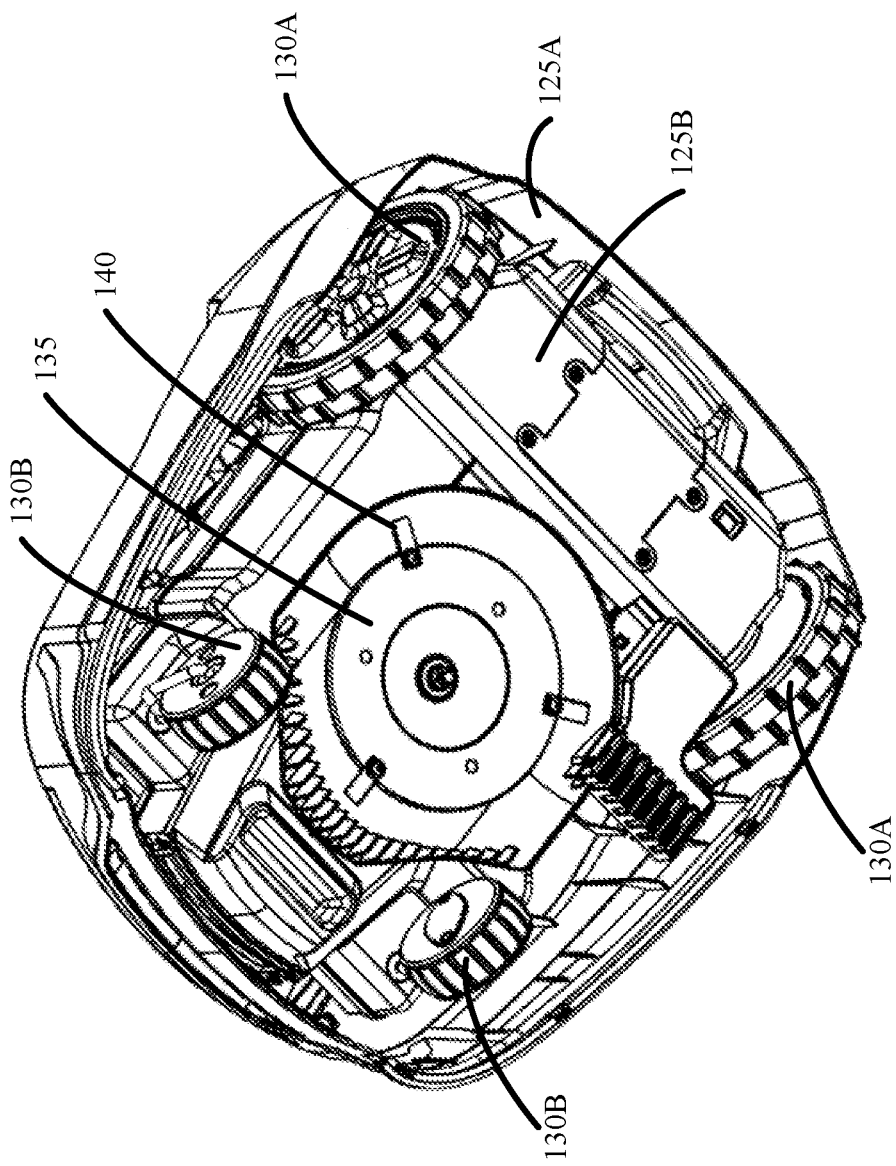
FIG. 1B illustrates a bottom perspective view of the robotic garden tool of FIG. 1A according to some example embodiments.

FIG. 1B illustrates a bottom perspective view of the robotic garden tool 105 according to some example embodiments. The robotic garden tool 105 may include a housing 125 that includes an outer housing 125A (i.e., outer housing shell) and an inner housing 125B. The outer housing 125A may be coupled to the inner housing 125B. The robotic garden tool 105 also may include wheels 130 (i.e., a set of wheels 130) coupled to the inner housing 125B and configured to rotate with respect to the housing 125 to propel the robotic garden tool 105 on an operating surface (e.g., a yard to be mowed). The wheels 130 may include motor-driven wheels 130A and non-motor-driven wheels 130B. In the embodiment shown in FIG. 1B, two rear wheels 130A are motor-driven wheels 130A while two front wheels 130B are non-motor-driven wheels 130B. In other embodiments, the robotic garden tool 105 may include a different wheel arrangement (e.g., a different number of total wheels, a different number of each type of wheel, different wheels being motor-driven or non-motor-driven, and/or the like). In some embodiments, the housing 125 may not include the outer housing 125A and the inner housing 125B. Rather, the housing 125 may include a single integrated body/housing to which the wheels 130 are attached.

In some embodiments, the robotic garden tool 105 includes a wheel motor 235 (see FIG. 2) coupled to one or more wheels 130 and configured to drive rotation of the one or more wheels 130. In some embodiments, the robotic garden tool 105 includes multiple wheel motors 235 where each wheel motor 235 is configured to drive rotation of a respective motor-driven wheel 130A (see FIG. 2).

In some embodiments, the robotic garden tool 105 includes a cutting blade assembly 135 coupled to the inner housing 125B and configured to rotate with respect to the housing 125 to cut grass on the operating surface. The cutting blade assembly 135 may include a rotating disc to which a plurality of cutting blades 140 configured to cut the grass are attached. In some embodiments, the robotic garden tool 105 includes a cutting blade assembly motor 240 (see FIG. 2) coupled to the inner housing 125B and to the cutting blade assembly 135. The cutting blade assembly motor 240 may be configured to drive rotation of the cutting blade assembly 135 to cut the grass on the operating surface.

In some embodiments, the robotic garden tool 105 and/or the docking station 110 include additional components and functionality than is shown and described herein.

Figure 2:
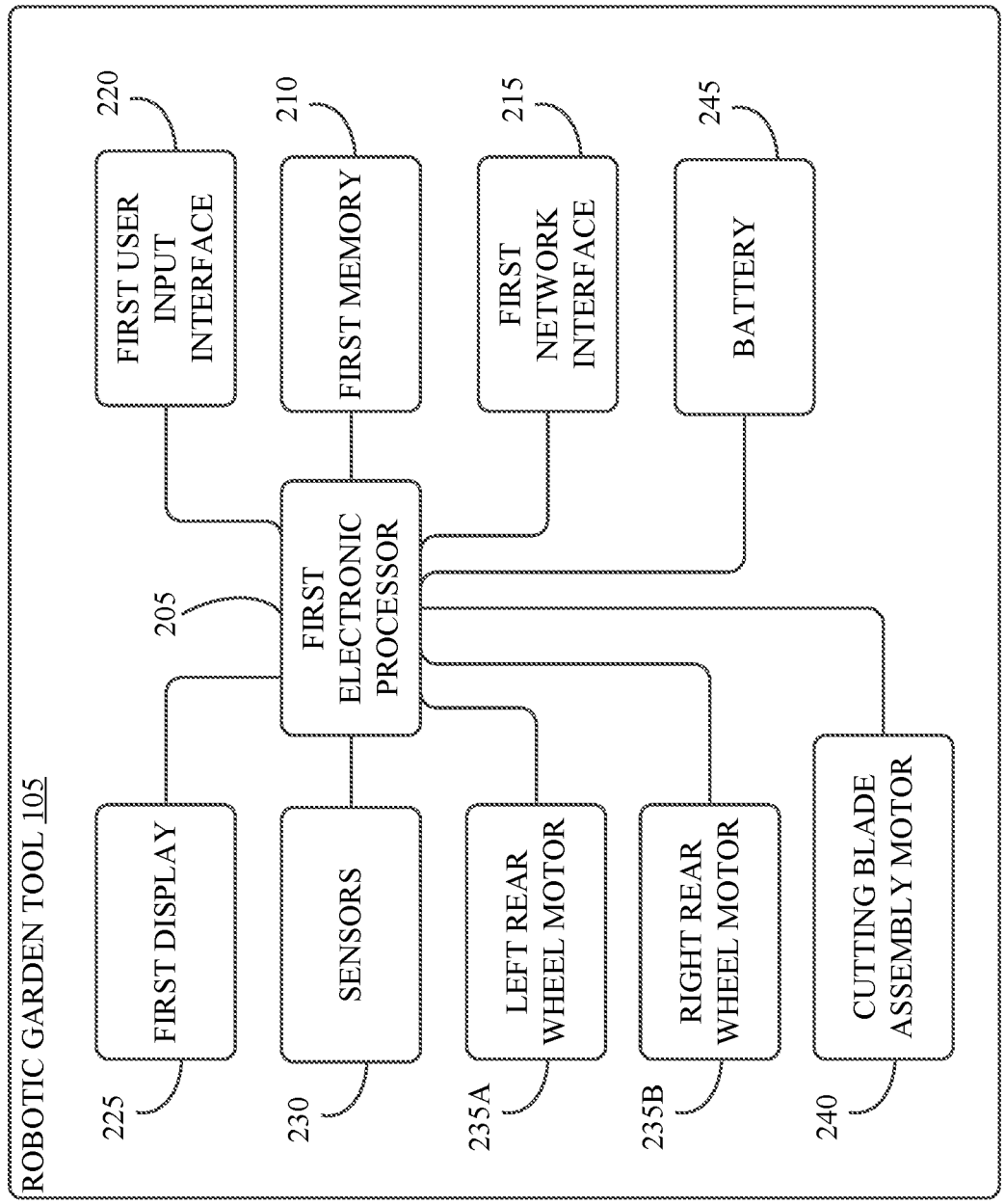
FIG. 2 is a block diagram of the robotic garden tool of FIGS. 1A and 1B according to some example embodiments.

FIG. 2 is a block diagram of the robotic garden tool 105 according to some example embodiments. In the embodiment illustrated, the robotic garden tool 105 includes a first electronic processor 205 (i.e., a robotic garden tool electronic processor 205) (for example, a microprocessor or other electronic device). The first electronic processor 205 includes input and output interfaces (not shown) and is electrically coupled to a first memory 210 (i.e., a robotic garden tool memory 210), a first network interface 215 (i.e., a robotic garden tool network interface 215), an optional first user input device 220, an optional display 225, one or more sensors 230, a left rear wheel motor 235A, a right rear wheel motor 235B, a cutting blade assembly motor 240, and a battery 245 (e.g., a battery pack 245). In some embodiments, the robotic garden tool 105 includes fewer or additional components in configurations different from that illustrated in FIG. 2. For example, the robotic garden tool 105 may not include the first user input device 220 and/or the first display 225. As another example, the robotic garden tool 105 may include a global positioning system (GPS) device, a height adjustment motor configured to adjust a height of the cutting blade assembly 135, and/or the like. As yet another example, the robotic garden tool 105 may include additional sensors or fewer sensors than the sensors 230 described herein. In some embodiments, the robotic garden tool 105 performs functionality other than the functionality described below.

The first memory 210 may include read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 is configured to send data to and receive data from other devices in the communication system 100 (e.g., the docking station 110, the external device 115, the server device 150, etc.). In some embodiments, the first network interface 215 includes one or more transceivers for wirelessly communicating with the external device 115 and/or the docking station 110 (e.g., a first radio frequency (RF) transceiver configured to communicate via Bluetooth™, Bluetooth™ low energy (BLE), WiFi™, or the like). The first network interface 215 may include an additional transceiver for wirelessly communicating with the server device 150 (and/or the external device 115 and/or the docking station 110) via, for example, cellular communication. In some embodiments, at least some of the transceivers and/or receivers of the robotic garden tool 105 may be combined or share some elements (e.g., an antenna and/or other hardware). Alternatively or additionally, the first network interface 215 may include a connector or port for receiving a wired connection to the external device 115, such as USB cable. In some embodiments, the robotic garden tool 105 may additionally or alternatively communicate with the docking station 110 when the robotic garden tool 105 is docked/coupled to the docking station 110 (e.g., via first terminals of the robotic garden tool 105 that are connected to second terminals of the docking station 110).

The first user input device 220 is configured to allow the first electronic processor 205 to receive a user input from a user to, for example, set/adjust an operational parameter of the robotic garden tool 105. The first display 225 is configured to display a user interface to the user. Similar to the user interface of the external device 115 described previously herein, the user interface displayed on the first display 225 may allow the user to access and interact with robotic garden tool information. In some embodiments, the first display 225 may also act as the first user input device 220. For example, a touch sensitive input interface may be incorporated into the first display 225 to allow the user to interact with content provided on the first display 225. The first display 225 may be a liquid crystal display (LCD) screen, an organic light emitting display (OLED) display screen, or an E-ink display. In some embodiments, the first display 225 may be configured to display a status of the robotic garden tool 105, an error condition of the robotic garden tool 105, an indication that a new cryptography key pair is recommended to be generated as explained in greater detail below, and/or the like). In some embodiments, the first display 225 includes future-developed display technologies.

In some embodiments, the first electronic processor 205 is in communication with a plurality of sensors 230 that may include electromagnetic field sensors, radio frequency sensors (e.g., radio frequency identification (RFID) interrogators/sensors), Hall sensors, current sensors, other magnetic sensors, and/or the like. In some embodiments, data from one or more Hall sensors may be used by the first electronic processor 205 to determine how fast one or more motors 235A, 235B, 240 of the robotic garden tool 105 is rotating.

In some embodiments, the battery pack 245 provides power to the first electronic processor 205 and to other components of the robotic garden tool 105 such as the motors 235A, 235B, 240 and the first display 225. In some embodiments, power may be supplied to other components besides the first electronic processor 205 through the first electronic processor 205 or directly to the other components. In some embodiments, when power is provided directly from the battery pack 245 to the other components, the first electronic processor 205 may control whether power is provided to one or more of the other components using, for example, a respective switch (e.g., a field-effect transistor) or a respective switching network including multiple switches. For example, the first electronic processor 205 may control whether current from the battery pack 245 is provided to a motor of the robotic garden tool 105. In some embodiments, the robotic garden tool 105 includes active and/or passive conditioning circuitry (e.g., voltage step-down controllers, voltage converters, rectifiers, filters, etc.) to regulate or control the power received by the components of the robotic garden tool 105 (e.g., the first electronic processor 205, the motors, 235A, 235B, 240, etc.) from the battery pack 245. In some embodiments, the battery pack 245 is a removable battery pack. In some embodiments, the battery pack 245 is configured to receive charging current from the docking station 110 when the robotic garden tool 105 is docked at the docking station 110 and electrically connected thereto.

Figure 3:
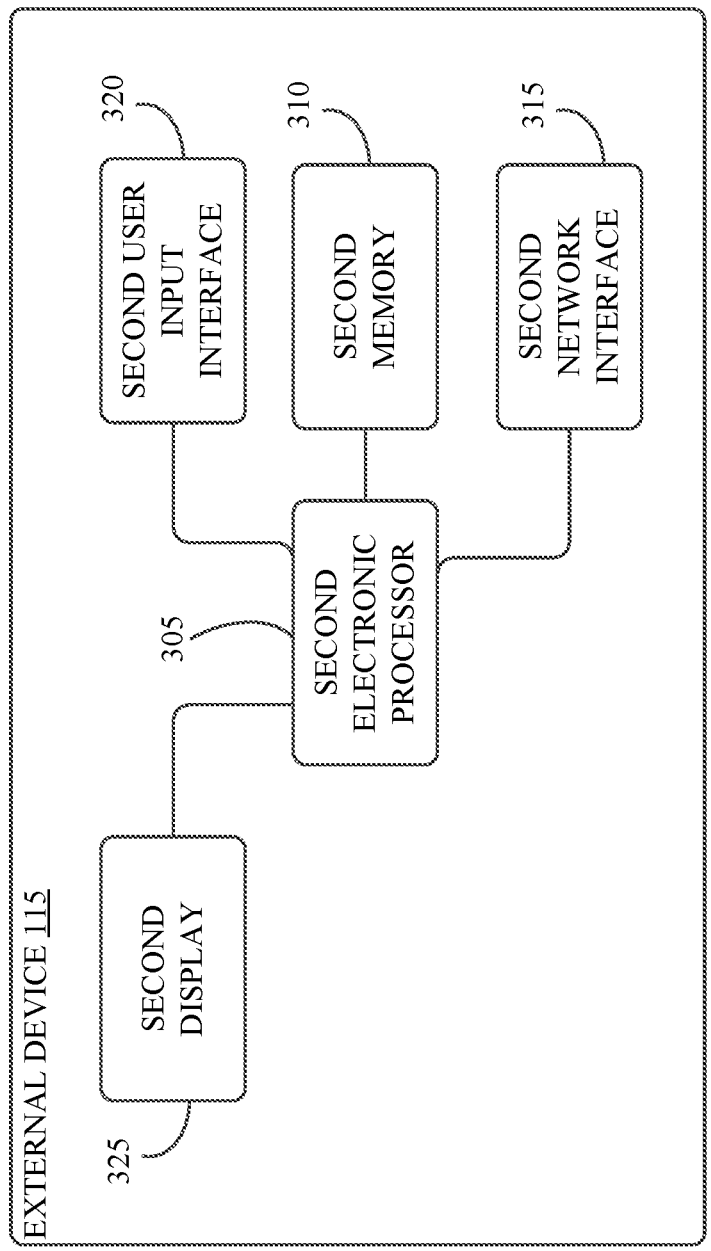
FIG. 3 is a block diagram of an external device of FIG. 1A according to some example embodiments.

FIG. 3 is a block diagram of the external device 115 according to some example embodiments. In the example shown, the external device 115 includes a second electronic processor 305 (i.e., an external device electronic processor 305) electrically connected to a second memory 310 (i.e., an external device memory 310), a second network interface 315 (i.e., an external device network interface 315), a second user input device 320, and a second display 325. These components are similar to the like-named components of the robotic garden tool 105 explained above with respect to FIG. 2 and function in a similar manner as described above. For example, the second display 325 may also function as an input device (e.g., when the second display 325 is a touch-screen). In some embodiments, the second electronic processor 305 sends data to and receives data from the robotic garden tool 105 and/or the server device 150 via the second network interface 315. In some embodiments, the second network interface 315 includes one or more transceivers for wirelessly communicating with the robotic garden tool 105 (e.g., a second RF transceiver configured to communicate via Bluetooth™, Bluetooth™ low energy (BLE), WiFi™, or the like). The second network interface 315 may include an additional transceiver for wirelessly communicating with the server device 150 via, for example, cellular communication. In some embodiments, at least some of the transceivers and/or receivers of the external device 115 may be combined or share some elements (e.g., an antenna and/or other hardware). In some embodiments, the external device 115 includes fewer or additional components in configurations different from that illustrated in FIG. 3. For example, the external device 115 may include a battery, a global positioning system (GPS) device, or the like. In some embodiments, the external device 115 performs functionality other than the functionality described below.

Figure 4:
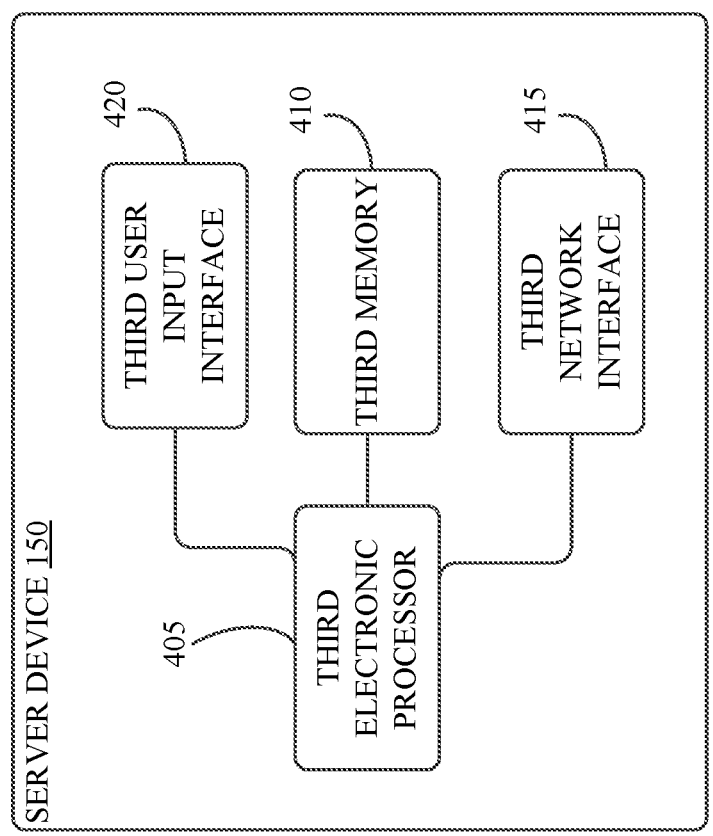
FIG. 4 is a block diagram of a server device of FIG. 1A according to some example embodiments.

FIG. 4 is a block diagram of the server device 150 according to some example embodiments. In the example shown, the server device 150 includes a third electronic processor 405 (i.e., a server device electronic processor 405) electrically connected to a third memory 410 (i.e., a server device memory 410), a third network interface 415 (i.e., a server device network interface 415), and a third user input device 420. These components are similar to the like-named components of the robotic garden tool 105 explained above with respect to FIG. 2 and function in a similar manner as described above. The server device 150 may be one of multiple server devices 150 in a network, connected to each other and/or to other devices (e.g., external devices 115 and robotic garden tools 105) via their respective third network interface 415.

In some embodiments, the robotic garden tool 105 travels within a virtual boundary of the operating area to execute a task (e.g., mowing a lawn). The virtual boundary may be defined by a boundary wire or may be programmed into the robotic garden tool 105, for example, by storing map data with location coordinates. The robotic garden tool 105 may travel randomly within the operating area defined by the virtual boundary. In some embodiments, the robotic garden tool 105 may travel in a predetermined pattern within the operating area defined by the virtual boundary (e.g., in adjacent rows or columns between sides of the virtual boundary) to more efficiently and evenly mow the lawn within the operating area. In such embodiments, the robotic garden tool 105 may determine and keep track of its current location within the operating area, for example using odometry, location tracking of itself, and/or the like. For example, the robotic garden tool 105 may use a speedometer to measure a mower speed such that the robotic garden tool 105 maintains a set speed. In another example, the robotic garden tool 105 may use an odometer to measure the travel distance in order to follow a predetermined travel path from a known starting location such as the docking station 110. In another example, the robotic garden tool 105 may use a position sensor, such as a GPS device, to follow the predetermined travel path by matching location coordinates of the robotic garden tool 105 with location coordinates along the predetermined travel path. The robotic garden tool 105 may include a compass device to determine cardinal direction. The robotic garden tool 105 may also be pre-programmed with a map of the lawn or may execute a "map mode" in order to generate a map of the lawn.

To allow for the communication between at least some of the devices in the communication system 100 of FIG. 1 that is described previously herein (e.g., the communication between the robotic garden tool 105 and the server device 105), cryptography may be used for data security purposes. For example, asymmetric/public key cryptography may be used to ensure that communications being received by various devices of the system 100 are from authentic/verified devices that are intended to communicate with each other.

Cryptography methods may include using key pairs that are stored on devices that are configured to communicate with each other. For example, a first key pair may include a private key for a certain device (e.g., the robotic garden tool 105) that is known only by the robotic garden tool 105 and is unknown to other devices in the communication system 100. The first key pair may also include a public key that may be known by other devices in the communication system 100 (e.g., one or more server devices 150). When the server device 150 desires to transmit information to the robotic garden tool 105, the server device 150 may encrypt the information using the public key associated with the robotic garden tool 105, and the robotic garden tool 105 may decrypt the encrypted information using its private key. Because only the robotic garden tool 105 knows its private key, the robotic garden tool 105 is the only device that can decrypt the encrypted information that was encrypted using its public key.

A similar situation may also exist with respect to communication from the robotic garden tool 105 to the server device 150. For example, a second key pair may include a private key for the server device 150 that is known only by the server device 150 and is unknown to other devices in the communication system 100. The second key pair may also include a public key that may be known by other devices in the communication system 100 (e.g., one or more robotic garden tools 105). When a robotic garden tool 105 desires to transmit information to the server device 150, the robotic garden tool 105 may encrypt the information using the public key associated with the server device 150, and the server device 150 may decrypt the encrypted information using its private key. Because only the server device 150 knows its private key, the server device 150 is the only device that can decrypt the encrypted information that was encrypted using its public key.

In some instances, a single key pair may be used for bidirectional communication between devices (e.g., the robotic garden tool 105 and the server device 150). For example, a private key of one device may be used for encrypting information transmitted by the device and decrypting information received from the other device while a public key of the other device may be similarly used for encrypting information transmitted by the other device and decrypting information received from the device. In some of such instances, a receiving device (e.g., the server device 150) may decrypt received information using its key (e.g., a private or public key) and based on the received information indicating that the received information was received from a particular transmitting device (e.g., the robotic garden tool 105). In other words, a private key may be used to encrypt and/or decrypt information, and a public key may be used to encrypt and/or decrypt information. In some instances, if a device (e.g., the server device 150) is configured to engage in encrypted communication with more than one other devices (e.g., robotic garden tools 105), the device may store a respective public/private key associated with each robotic garden tool 105.

In some situations, at least one or both of the private key of the robotic garden tool 105 and the public key of the server device 150 (and possibly an associated certificate) may be stored in the robotic garden tool memory 210 at a time of manufacturing of the robotic garden tool 105. In some instances, one or both of these keys is stored in firmware of the robotic garden tool 105 that may not be able to be updated or overwritten after manufacturing. During the lifetime of the robotic garden tool 105, a cloud service bound to the server device 150 associated with an original public key that was stored in the robotic garden tool 105 may be changed to a different cloud service that uses a different server device 150. However, the public key stored by the robotic garden tool 105 may not be able to be updated/overwritten to allow the robotic garden tool 105 to continue to communicate with the server device 105 and/or with a different server device 105. Additionally, in some instances, one or more of the keys (or certificates) stored in the robotic garden tool 105 have an expiration date. While this expiration date is designed to be longer than the lifetime of the robotic garden tool, it is nevertheless possible that one or more of the keys stored in the robotic garden tool 105 at the time of manufacturing expire during the lifetime of the robotic garden tool 105. Again however, these keys stored by the robotic garden tool 105 may not be able to updated/overwritten to allow the robotic garden tool 105 to continue to communicate with the server device 105 and/or with a different server device 105. Accordingly, there is a technological problem with the manner in which cryptography keys used for communication with other devices are stored in a robotic garden tool at a time of manufacturing.

To address this technological problem, the systems, methods, and devices described herein allow one or more cryptography keys stored on the robotic garden tool 105 to be generated and updated/overwritten by one or more devices of the communication system 100. For example, the external device 115 and/or the server device 150 may generate cryptographic keys and distribute such keys as appropriate to devices within the system 100 to allow for communication between the devices as described in greater detail below. As another example, the robotic garden tool 105 itself may generate and distribute cryptographic keys in some instances. The systems, methods, and devices described herein address the technological problem by allowing cryptographic keys used by the robotic garden tool 105 to be updated/overwritten to overcome the problematic situations described above (e.g., changing of cloud service provider, key expiration, etc.).

Figure 5:
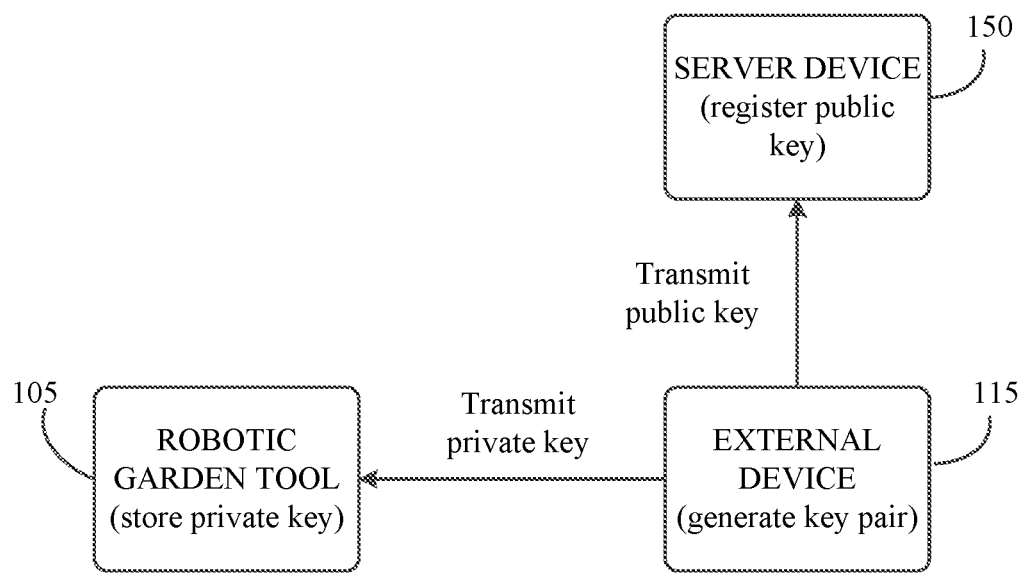
FIG. 5 illustrates a block diagram of some components of the communication system of FIG. 1 where one or more cryptography key pairs is generated by the external device of FIG. 3 according to some example embodiments.

FIG. 5 illustrates a block diagram of some components of the communication system 100 of FIG. 1 where one or more cryptography key pairs is generated by the external device 115 according to some example embodiments. As indicated in the example of FIG. 5, the external device electronic processor 305 may be configured to generate a first key pair including a first private key for the robotic garden tool 105 and a first public key for the server device 150. In some instances, the external device electronic processor 305 generates the first private key and the first public key using an algorithm such that the first private key and the first public key are mathematically related to each other. For example, the algorithm used to generate the first key pair may include a Rivest, Shamir, Adleman (RSA) encryption algorithm, an elliptical curve cryptography (ECC) encryption algorithm, or the like.

Once the first key pair is generated, the external device electronic processor 305 may transmit, via the external device network interface 315, the first private key to the robotic garden tool 105 as indicated in FIG. 5. The external device electronic processor 305 also may transmit, via the external device network interface 315, the first public key to the server device 150. In some instances, the external device 115 may receive a respective acknowledgement from each of the robotic garden tool 105 and the server device 150 in response to the respective key being received by each device 105, 150. In some instances, in response to receiving the acknowledgements of receipt of the keys from the robotic garden tool 105 and the server device 150, the external device electronic processor 305 may delete the generated key pair (or at least the first private key of the robotic garden tool 105) such that the keys are no longer known by the external device 115.

In some instances, the external device electronic processor 305 is configured to generate the first key pair and distribute the first key pair in response to one of service of a previous server device 150 being changed to the server device 150, an expiration of a previously generated public key that was stored on the robotic garden tool 105, a user input indicating that a new key pair should be generated for the robotic garden tool 105, or receiving an over-the-air (OTA) update from the server device 150. In some instances, one or both of the first display 225 of the robotic garden tool 105 and the second display 325 of the external device 115 may provide a notification that a new cryptography key pair has been generated in order to authenticate communication between the server device 150 and the robotic garden tool 105. In some instances, one of the displays 225, 325 may prompt the user for a user input to approve the generation of the new key pair before the new key pair is generated or before a new key(s) is stored on the robotic garden tool 105 (and/or before a previously stored key(s) is overwritten/deleted).

As indicated in FIG. 5, the server device electronic processor 405 may be configured to receive, via the server device network interface 415 and from the external device 115, the first public key and an identity (e.g., a serial/identification number) of the robotic garden tool 105 with which the first public key is associated. The server device electronic processor 405 may be configured to store/register the first public key and the identity of the robotic garden tool 105 with which the first public key is associated in the server device memory 410.

When the server device 150 desires to and/or is instructed to communicate to the robotic garden tool 105, the server device electronic processor 405 may generate a first instruction to be transmitted to the robotic garden tool 105. In some instances, the server device electronic processor 405 is configured to generate the first instruction in response to receiving, via the server device network interface 415, a request to generate the first instruction from the external device 115 or another external device 115. The request to generate the first instruction may be provided to the server device 150 in response to a user input received on the external device 115 or the another external device 115. For example, the external device 115 may receive a user input to start operation of the robotic garden tool 105, to stop operation of the robotic garden tool 105, to provide scheduling information regarding operation of the robotic garden tool 105, to change other operating features of the robotic garden tool 105 (e.g., blade height, blade speed, travel speed, etc.), and combinations thereof. In response to the user input, the external device 115 may communicate with the server device 150 to request that the server device 150 send the first instruction in accordance with the user input. Such communication from the external device 115 to the server device 150 may occur when the external device 115 is not within short-distance communication range of the robotic garden tool 105 (e.g., not within Bluetooth™ communication range). The first instruction may include at least one selected from the group consisting of a command to start operation of the robotic garden tool 105, a command to stop operation of the robotic garden tool 105, scheduling information regarding operation of the robotic garden tool 105, and the like, and combinations thereof.

In some instances, the first instruction is generated by the server device 150 in response to determining that the robotic garden tool 105 should receive a software or firmware update. In such instances, the first instruction may include the software or firmware update. In some instances, the first instruction may include new/updated cryptography key information as explained in greater detail below.

In some instances, after generating the first instruction to be transmitted to the robotic garden tool 105, the server device electronic processor 405 may encrypt the first instruction using the first public key to generate an encrypted first instruction. The server device electronic processor 405 may also transmit, via the server device network interface 415, the encrypted first instruction to the robotic garden tool 105.

As indicated in FIG. 5, the robotic garden tool electronic processor 205 may be configured to receive, via the robotic garden tool network interface 215, the first private key from the external device 115. The robotic garden tool electronic processor 205 may be configured to store the first private key in the robotic garden tool memory 210 to be used in the future when incoming communications are received from other devices (e.g., the server device 150) over certain communication protocols (e.g., cellular, and/or other long-range communication protocols). In some instances, short-range communication (e.g., Bluetooth™, etc.) between the robotic garden tool 105 and the external device 115 may not utilize asymmetric cryptography keys, for example, because other handshaking/authentication between the robotic garden tool 105 and the external device 115 may be performed according to the short-range communication range protocol.

In some instances, the robotic garden tool electronic processor 205 may later receive, via the robotic garden tool network interface 215, a communication such as the encrypted first instruction from the server device 105. As explained previously herein, the encrypted first instruction may have been encrypted by the server device 150 using the first public key. The robotic garden tool electronic processor 205 may be configured to decrypt the encrypted first instruction using the first private key to generate a decrypted first instruction (i.e., the first instruction previously generated by the server device 150). In some instances, because only the robotic garden tool 105 knows the first private key, the robotic garden tool 105 is the only device that can decrypt the encrypted information that was encrypted using the first public key.

The robotic garden tool electronic processor 205 may then control operation of the robotic garden tool 105 in accordance with the decrypted first instruction (i.e., the first instruction). For example, the robotic garden tool electronic processor 205 may start operation of the robotic garden tool 105 (e.g., control the robotic garden tool 105 to leave the docking station 110 to begin mowing a lawn), stop operation of the robotic garden tool 105 (e.g., control the robotic garden tool 105 to return to the docking station 110, disable a main cutting blade and/or a trim/edge cutting blade, and/or the like), update scheduling information regarding operation of the robotic garden tool 105, and combinations thereof. In some instances, the robotic garden tool electronic processor 205 may update its software and/or firmware in accordance with the first instruction.

While the above explanation of FIG. 5 refers to the first public key being transmitted to the server device 150, in some instances, the external device electronic processor 305 is further configured to generate a certificate associated with the first public key, and transmit the certificate to the server device 105 for storage by the server device 150. In some instances, the certificate includes the public key (i.e., the public key is stored within the certificate). In some instances, the external device 115 requests and receives the certificate from a certificate authority (CA).

In situations where a certificate is provided in conjunction with the public key, the certificate may be transmitted along with the first instruction to a destination device (e.g., the robotic garden tool 105). In some instances, the robotic garden tool electronic processor 205 is configured to receive the certificate from the server device 150 along with the first public key and the encrypted first instruction. In some instances, the robotic garden tool electronic processor 205 is configured to authenticate the certificate before decrypting the encrypted first instruction. For example, in response to authenticating the certificate, the robotic garden tool electronic processor 205 may decrypt the encrypted first instruction. On the other hand, in response to being unable to authenticate the certificate, the robotic garden tool electronic processor 205 may refrain from decrypting the encrypted first instruction. For example, the robotic garden tool electronic processor 205 being unable to authenticate the certificate may indicate that the received communication (i.e., the encrypted first instruction) may have been received from an unknown and/or untrusted device.

While FIG. 5 illustrates the generation of the first private key to be stored by the robotic garden tool 105 and the first public key to be stored/registered by the server device 150, in some instances, the external device electronic processor 305 may additionally or alternatively generate one or more additional key pairs (e.g., a second key pair including a second private key to be stored by the server device 150 and a second public key to be stored by the robotic garden tool 105). The external device electronic processor 305 may be configured to transmit, via the external device network interface 315, the second private key to the server device 150, and transmit, via the external device network interface 315, the second public key to the robotic garden tool 105. The second key pair operates similarly to the first key pair except in the opposite direction of communication (e.g., to allow the robotic garden tool 105 to communicate with the server device 150). Accordingly, the same explanation above with respect to the first key pair may apply to the second key pair. For example, the explanation regarding communication between devices 105, 150, regarding encryption/decryption, regarding possible generation of a certificate, regarding what causes the key pair to be generated, and/or regarding other features may also apply to the second key pair. Also as explained previously herein, a single key pair may be generated to allow for encrypted communication between the server device 150 and one robotic garden tool 105. In such instances, the private key may be stored on either device, and the public key may be stored on the other device where the private key is not stored.

Continuing the example involving the second key pair, in some instances, the robotic garden tool electronic processor 205 is configured to the receive, via the robotic garden tool network interface 215 and from the external device 115, the second public key associated with the server device 150. The robotic garden tool electronic processor 205 may be configured to store the second public key in the robotic garden tool memory 210, for example, to be used for future communications to the server device 150.

The robotic garden tool electronic processor 205 may be configured to generate a first message to be transmitted to the server device 150. In some instances, the robotic garden tool electronic processor 205 is configured to generate the first message in response to at least one selected from the group consisting of detecting an error of a component of the robotic garden tool 105 (e.g., one of the motors 235, 240; one of the sensors 230; and/or the like), detecting a status change of the robotic garden tool 105 (e.g., returning to the docking station 110 after a mowing operation, leaving the docking station 110 to engage in a mower operation, and/or the like), a predetermined period of time elapsing (i.e., periodically sending status updates of the robotic garden tool 105 including, for example, a battery charge level, a mowing progress, and/or the like), and combinations thereof. In some instances, the first message includes at least one selected from the group consisting of error information of the robotic garden tool 105, a status of the robotic garden tool 105 (e.g., an operating state in which the robotic garden tool 105 is currently operating, a battery charge level, a mowing progress, and/or the like), a location of the robotic garden tool 105, and combinations thereof.

In some instances, the robotic garden tool electronic processor 205 is configured to encrypt the first message using the second public key associated with the server device 150 to generate an encrypted first message. The robotic garden tool electronic processor 205 may then transmit, via the robotic garden tool network interface 215, the encrypted first message to the server device 150.

In some instances, the server device electronic processor 405 is configured to receive, via the server device network interface 415, the second private key from the external device 115. The server device electronic processor 405 also may be configured to store the second private key in the server device memory 410 to be used in the future when incoming communications are received from certain other devices (e.g., the robotic garden tool 105) over certain communication protocols.

The server device electronic processor 405 may later receive, via the server device network interface 415, the encrypted first message from the robotic garden tool 105. As previously indicated, the encrypted first message may have been encrypted by the robotic garden tool 105 using the second public key associated with the server device 150. The server device electronic processor 405 may be configured to decrypt the encrypted first message using the second private key to generate a decrypted first message (i.e., the first message). In some instances, because only the server device 150 knows the second private key, the server device 150 is the only device that can decrypt the encrypted first message that was encrypted using the second public key.

In some instances, the server device electronic processor 405 is configured to at least one selected from the group consisting of (i) store information included in the first decrypted message in the server device memory 410, (ii) provide a notification to the external device 115 or another external device 115 based on the information included in the first decrypted message, and both (i) and (ii). For example, the server device 105 may store status information of the robotic garden tool 105 in a usage history memory/database for future reference by a user or maintenance personnel. As another example, the server device 105 may transmit a notification to the external device 115 to attempt to make the user aware of the current status (e.g., a detected error) of the robotic garden tool 105.

Figure 6:
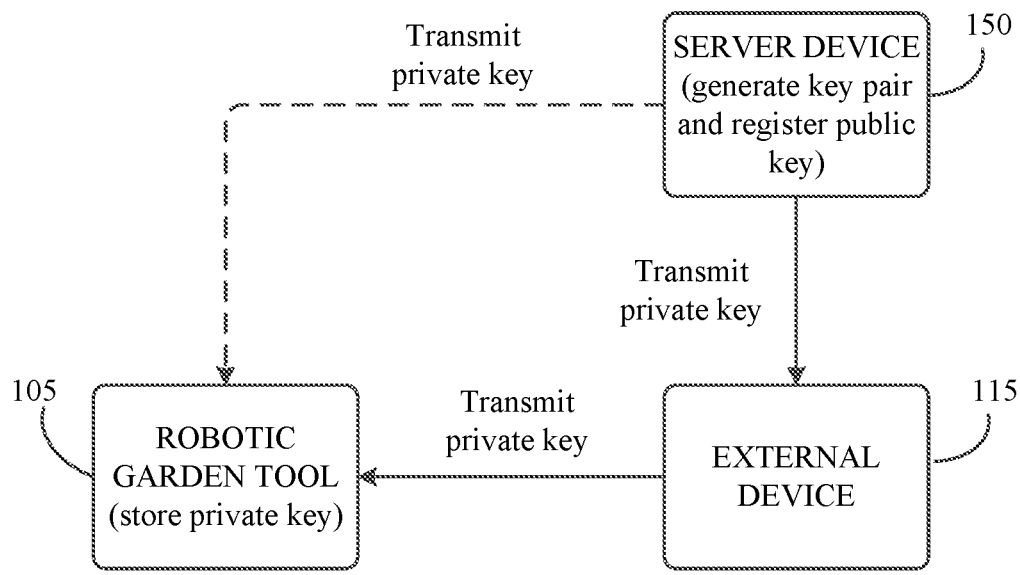
FIG. 6 illustrates another block diagram of the components of the communication system shown in FIG. 5 where one or more cryptography key pairs is generated by the server device of FIG. 4 according to some example embodiments.
Figure 7:
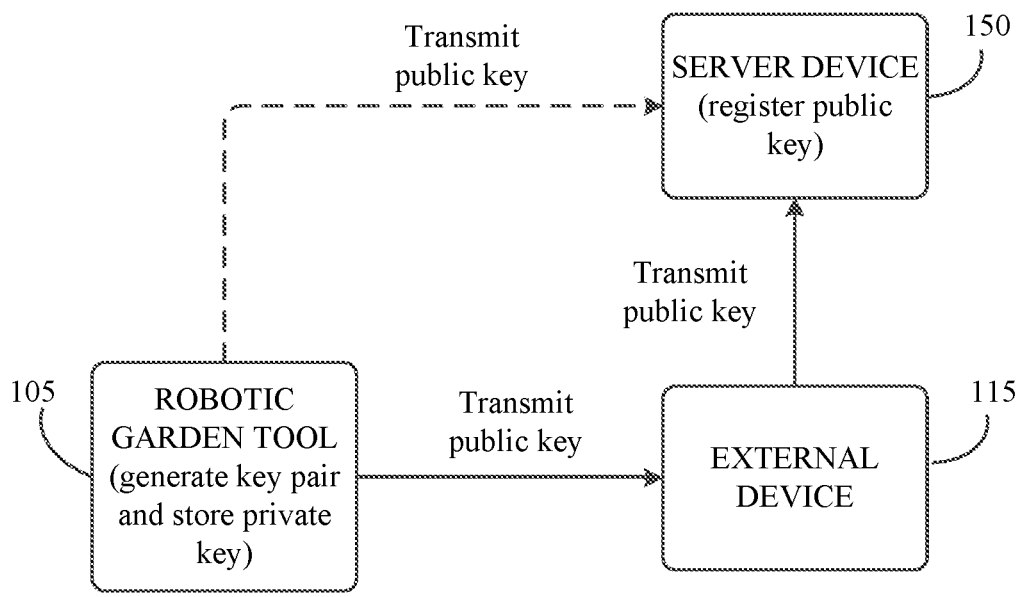
FIG. 7 illustrates another block diagram of the components of the communication system shown in FIG. 5 where one or more cryptography key pairs is generated by the robotic garden tool of FIG. 2 according to some example embodiments.

While FIG. 5 and its corresponding explanation above relate to the external device 115 generating one or more key pairs to be used by the robotic garden tool 105 and the server device 150 to engage in communication with each other, in other instances, other devices in the communication system 100 may generate and distribute one or more key pairs in addition to or as an alternative to the external device 115 doing so. FIGS. 6 and 7 illustrate such example implementations as explained in greater detail below.

FIG. 6 illustrates another block diagram of the components of the communication system 100 shown in FIG. 5 where one or more cryptography key pairs is/are generated by the server device 150 according to some example embodiments. The generation, distribution, and use of the key pairs in FIG. 6 may be generally similar to the generation, distribution, and use of the key pairs described previously herein with respect to FIG. 5. For example, the explanation regarding communication between devices 105, 150, regarding encryption/decryption, regarding possible generation of a certificate, regarding what causes the key pair to be generated, regarding the generation of multiple pairs of keys or a single pair of keys for each pair of devices configured to engage in encrypted communication, regarding controlling devices of the communication system 100 based on received instructions/messages, and/or regarding other features with respect to FIG. 5 may also apply to the example shown in FIG. 6 where the server device 150 generates one or more key pairs. Accordingly, for the sake of brevity, the example of FIG. 6 will be explained only briefly below.

In some instances, the server device electronic processor 405 is configured to generate a first key pair including a first private key for the robotic garden tool 105 and a first public key for the server device 150. The server device electronic processor 405 may be configured to store/register the first public key in the server device memory 410, and transmit, via the server device network interface 415, the first private key for storage in the robotic garden tool 105. In some instances, in response to receiving acknowledgement of receipt of the first private key from the robotic garden tool 105, the server device electronic processor 405 may delete the first private key of the robotic garden tool 105 such that the first private key of the robotic garden tool 105 is no longer known by the server device 150.

As indicated in FIG. 6, the server device 150 may be configured to transmit the first private key to the robotic garden tool 105 via the external device 115. For example, the server device 150 is configured to transmit the first private key to the external device 115 that is configured to forward the first private key to the robotic garden tool 105. Accordingly, the robotic garden tool 105 may be configured to receive the first private key from the external device 115 even though the first private key was generated by the server device 150. Also as indicated in FIG. 6, the server device 150 may additionally or alternatively be configured to transmit the first private key to the robotic garden tool 105 directly without the first private key being first transmitted to the external device 115.

In some instances, the robotic garden tool electronic processor 205 is configured to receive, via the robotic garden tool network interface 215, the first private key, and store the first private key in the robotic garden tool memory 210. The robotic garden tool electronic processor 205 may later receive, via the robotic garden tool network interface 215, an encrypted first instruction from the server device. The encrypted first instruction may have been encrypted by the server device 150 using the first public key associated with the robotic garden tool 105. The robotic garden tool electronic processor 205 may be configured to decrypt the encrypted first instruction using the first private key to generate a decrypted first instruction. The robotic garden tool electronic processor 205 may be configured to control operation of the robotic garden tool 105 in accordance with the decrypted first instruction.

While FIG. 6 illustrates the generation of the first private key to be stored by the robotic garden tool 105 and the first public key to be stored/registered by the server device 150, in some instances, one or more additional or alternative key pairs (e.g., a second key pair including a second private key to be stored by the server device 150 and a second public key to be stored by the robotic garden tool 105 as explained previously herein) may be generated. In some instances, as explained previously herein, a single key pair may be generated to allow for encrypted communication between the server device 150 and one robotic garden tool 105. In such instances, the private key may be stored on either device, and the public key may be stored on the other device where the private key is not stored.

FIG. 7 illustrates another block diagram of the components of the communication system 100 shown in FIG. 5 where one or more cryptography key pairs is/are generated by the robotic garden tool 105 according to some example embodiments. The generation, distribution, and use of the key pairs in FIG. 7 may be generally similar to the generation, distribution, and use of the key pairs described previously herein with respect to FIGS. 5 and 6. For example, the explanation regarding communication between devices 105, 150, regarding encryption/decryption, regarding possible generation of a certificate, regarding what causes the key pair to be generated, regarding the generation of multiple pairs of keys or a single pair of keys for each pair of devices configured to engage in encrypted communication, regarding controlling devices of the communication system 100 based on received instructions/messages, and/or regarding other features with respect to FIGS. 5 and 6 may also apply to the example shown in FIG. 7 where the server device 150 generates one or more key pairs. Accordingly, for the sake of brevity, the example of FIG. 7 will be explained only briefly below.

In some instances, the robotic garden tool electronic processor 205 is configured to generate a first key pair including a first private key for the robotic garden tool 105 and a first public key for the server device 150. The robotic garden tool electronic processor 205 may store the first private key in the robotic garden tool device memory 210, and transmit, via the robotic garden tool network interface 215, the first public key for storage in the server device 150.

As indicated in FIG. 7, the robotic garden tool 105 may be configured to transmit the first public key to the server device 150 via the external device 115. For example, the robotic garden tool 105 is configured to transmit the first public key to the external device 115 that is configured to forward the first public key to the server device 150. Accordingly, the server device 150 may be configured to receive the first public key from the external device 115 even though the first public key was generated by the robotic garden tool 105. Also as indicated in FIG. 6, the robotic garden tool 105 may additionally or alternatively be configured to transmit the first public key to the server device 150 directly without the first public key being first transmitted to the external device 115.

In some instances, the server device electronic processor 405 is configured to receive, via the server device network interface 415, the first public key, and store/register the first public key in the server device memory 410. In some instances, the robotic garden tool electronic processor 205 is further configured to receive, via the robotic garden tool network interface 215, an encrypted first instruction from the server device 105. The encrypted first instruction may have been encrypted by the server device 150 using the first public key. The robotic garden tool electronic processor 205 may be configured to decrypt the encrypted first instruction using the first private key to generate a decrypted first instruction, and control operation of the robotic garden tool 105 in accordance with the decrypted first instruction.

While FIG. 7 illustrates the generation of the first private key to be stored by the robotic garden tool 105 and the first public key to be stored/registered by the server device 150, in some instances, one or more additional or alternative key pairs (e.g., a second key pair including a second private key to be stored by the server device 150 and a second public key to be stored by the robotic garden tool 105 as explained previously herein) may be generated. In some instances, as explained previously herein, a single key pair may be generated to allow for encrypted communication between the server device 150 and one robotic garden tool 105. In such instances, the private key may be stored on either device, and the public key may be stored on the other device where the private key is not stored.

Some aspects of FIGS. 5-7 may be interchangeable in a given communication system 100. For example, one device (e.g., the external device 115) may generate key pairs at a first time and another device (e.g., a different external device 115 and/or the server device 150) may generate new/updated key pairs at a later time. FIGS. 5-7 are merely examples. In other instances, one or more cryptography key pairs may be generated by another device such as the docking station 110. For example, the docking station 110 may generate one or more key pairs and distribute a key(s) to the robotic garden tool 105 via wired or wireless communication. The docking station 110 may also distribute a key(s) to the server device 150 via direct communication with the server device 150 and/or via indirect communication with the server device 150 through the robotic garden tool 105 and/or the external device 115. In some instances, the docking station 110 is configured to store its own key information in a similar manner as described previously herein with respect to the robotic garden tool 105 to allow for encrypted unidirectional or bidirectional communication between the docking station 110 and the server device 150.

Accordingly, various implementations of the systems and methods described herein provide, among other things, techniques for cryptography key generation and distribution for communication between a robotic garden tool and a server device. Other features and advantages of the invention are set forth in the following claims.

In the foregoing specification, specific examples have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

What is claimed is:

1. A communication system comprising:
   an external device including
      an external device memory,
      an external device network interface configured to allow the external device to communicate with other devices, and
      an external device electronic processor coupled to the external device memory and to the external device network interface, the external device electronic processor configured to generate a first key pair including a first private key for a robotic garden tool and a first public key for a server device, transmit, via the external device network interface, the first private key to the robotic garden tool, and transmit, via the external device network interface, the first public key to the server device;

the server device including a server device memory;

a server device network interface configured to allow the server device to communicate with other devices; and a server device electronic processor coupled to the server device memory and the server device network interface, the server device electronic processor configured to receive, via the server device network interface and from the external device, the first public key and an identity of the robotic garden tool with which the first public key is associated, store the first public key and the identity of the robotic garden tool with which the first public key is associated in the server device memory, generate a first instruction to be transmitted to the robotic garden tool, encrypt the first instruction using the first public key to generate an encrypted first instruction, and transmit, via the server device network interface, the encrypted first instruction to the robotic garden tool; and the robotic garden tool including a housing, a set of wheels coupled to the housing and configured to rotate to propel the robotic garden tool on an operating surface in an operating area, at least one wheel motor coupled to one or more wheels of the set of wheels, the at least one wheel motor configured to drive rotation of the one or more wheels, and a robotic garden tool memory, a robotic garden tool network interface configured to allow the robotic garden tool to communicate with other devices, a robotic garden tool electronic processor coupled to the robotic garden tool memory and to the robotic garden tool network interface, the robotic garden tool electronic processor configured to receive, via the robotic garden tool network interface, the first private key from the external device, store the first private key in the robotic garden tool memory, receive, via the robotic garden tool network interface, the encrypted first instruction from the server device, wherein the encrypted first instruction was encrypted by the server device using the first public key, decrypt the encrypted first instruction using the first private key to generate a decrypted first instruction, and control operation of the robotic garden tool in accordance with the decrypted first instruction;

wherein the external device electronic processor is further configured to generate a certificate associated with the first public key; and transmit the certificate to the server device for storage by the server device;

wherein the robotic garden tool electronic processor is configured to receive the certificate from the server device along with the first public key and the encrypted first instruction, and authenticate the certificate before decrypting the encrypted first instruction.

2. The communication system of claim 1, wherein the server device electronic processor is configured to generate the first instruction in response to receiving, via the server device network interface, a request to generate the first instruction from the external device or another external device, wherein the request to generate the first instruction is provided to the server device in response to a user input received on the external device or the another external device.

3. The communication system of claim 1, wherein the first instruction includes at least one selected from the group consisting of a command to start operation of the robotic garden tool, a command to stop operation of the robotic garden tool, scheduling information regarding operation of the robotic garden tool, and combinations thereof.

4. The communication system of claim 1, wherein the external device electronic processor is configured to generate the first key pair and distribute the first key pair in response to one of service of the server device being changed to another server device, an expiration of a previously generated public key, a user input indicating that a new key pair should be generated for the robotic garden tool, or receiving an over-the-air (OTA) update from the server device.

5. The communication system of claim 1, wherein the external device electronic processor is further configured to:

generate a second key pair including a second private key for the server device and a second public key for the robotic garden tool, transmit, via the external device network interface, the second private key to the server device, and transmit, via the external device network interface, the second public key to the robotic garden tool;

wherein the server device electronic processor is configured to receive, via the server device network interface, the second private key from the external device, store the second private key in the server device memory, receive, via the server device network interface, an encrypted first message from the robotic garden tool, wherein the encrypted first message was encrypted by the robotic garden tool using the second public key, decrypt the encrypted first message using the second private key to generate a decrypted first message, and at least one selected from the group consisting of (i) store information included in the decrypted first message in the server device memory, (ii) provide a notification to the external device or another external device based on the information included in the decrypted first message, and both (i) and (ii).

6. The communication system of claim 5, wherein the robotic garden tool electronic processor is configured to:

receive, via the robotic garden tool network interface and from the external device, the second public key, store the second public key in the robotic garden tool memory, generate a first message to be transmitted to the server device,
encrypt the first message using the second public key to generate the encrypted first message, and
transmit, via the robotic garden tool network interface, the encrypted first message to the server device.

7. The communication system of claim 6, wherein the robotic garden tool electronic processor is configured to generate the first message in response to at least one selected from the group consisting of detecting an error of a component of the robotic garden tool, detecting a status change of the robotic garden tool, a predetermined period of time elapsing, and combinations thereof.

8. The communication system of claim 6, wherein the first message includes at least one selected from the group consisting of error information of the robotic garden tool, a status of the robotic garden tool, a location of the robotic garden tool, and combinations thereof.

9. The communication system of claim 5, wherein the external device electronic processor is further configured to:
generate a certificate associated with the second public key; and
transmit the certificate to the robotic garden tool for storage in the robotic garden tool memory;
wherein the server device electronic processor is configured to
receive the certificate from the robotic garden tool along with the second public key and the encrypted first message, and
authenticate the certificate before decrypting the encrypted first message.

10. The communication system of claim 5, wherein the external device electronic processor is configured to generate the second key pair and distribute the second key pair in response to one of service of the server device being changed to another server device, an expiration of a previously generated public key, a user input indicating that a new key pair should be generated for the robotic garden tool, or receiving an over-the-air (OTA) update from the server device.

11. A communication system comprising:
a server device including
a server device memory;
a server device network interface configured to allow the server device to communicate with other devices; and
a server device electronic processor coupled to the server device memory and the server device network interface, the server device electronic processor configured to
generate a first key pair including a first public key for a robotic garden tool and a first private key for the server device,
store the first private key in the server device memory,
transmit, via the server device network interface, the first public key for storage in the robotic garden tool,
generate a certificate associated with the first public key, and
transmit, via the server device network interface, the certificate to the robotic garden tool for storage by the robotic garden tool; and
the robotic garden tool including
a housing,
a set of wheels coupled to the housing and configured to rotate to propel the robotic garden tool on an operating surface in an operating area,
at least one wheel motor coupled to one or more wheels of the set of wheels, the at least one wheel motor configured to drive rotation of the one or more wheels, and
a robotic garden tool memory,
a robotic garden tool network interface configured to allow the robotic garden tool to communicate with other devices,
a robotic garden tool electronic processor coupled to the robotic garden tool memory and to the robotic garden tool network interface, the robotic garden tool electronic processor configured to
receive, via the robotic garden tool network interface, the first public key,
store the first public key in the robotic garden tool memory,
generate a first message to be transmitted to the server device,
encrypt the first message using the first public key to generate an encrypted first message, and
transmit, via the robotic garden tool network interface, the encrypted first message to the server device;
wherein the server device electronic processor is configured to
receive, via the server device network interface, the encrypted first message from the robotic garden tool, wherein the encrypted first message was encrypted by the robotic garden tool using the first public key,
decrypt the encrypted first message using the first private key to generate a decrypted first message, and
at least one selected from the group consisting of (i) store information included in the decrypted first message in the server device memory, (ii) provide a notification to an external device based on the information included in the decrypted first message, and both (i) and (ii);
wherein the server device electronic processor is configured to
receive the certificate from the robotic garden tool along with the first public key and the encrypted first message, and
authenticate the certificate before decrypting the encrypted first message.

12. The communication system of claim 11, wherein the server device is configured to transmit the first public key to an external device, and wherein the robotic garden tool is configured to receive the first public key from the external device.

13. The communication system of claim 11, wherein the server device electronic processor is configured to generate the first key pair and transmit the first public key for storage by the robotic garden tool in response to one of service of a previous server device being changed to the server device, an expiration of a previously generated public key, or a user input indicating that a new key pair should be generated for the robotic garden tool.

14. A communication system comprising:
a robotic garden tool including
a housing,
a set of wheels coupled to the housing and configured to rotate to propel the robotic garden tool on an operating surface in an operating area, at least one wheel motor coupled to one or more wheels of the set of wheels, the at least one wheel motor configured to drive rotation of the one or more wheels, and a robotic garden tool memory, a robotic garden tool network interface configured to allow the robotic garden tool to communicate with other devices, a robotic garden tool electronic processor coupled to the robotic garden tool memory and to the robotic garden tool network interface, the robotic garden tool electronic processor configured to generate a first key pair including a first private key for the robotic garden tool and a first public key for a server device, store the first private key in the robotic garden tool memory, and transmit, via the robotic garden tool network interface, the first public key for storage in the server device; and the server device including a server device memory;

a server device network interface configured to allow the server device to communicate with other devices; and a server device electronic processor coupled to the server device memory and the server device network interface, the server device electronic processor configured to receive, via the server device network interface, the first public key and an identity of the robotic garden tool with which the first public key is associated, store the first public key and the identity of the robotic garden tool in the server device memory, generate a first instruction to be transmitted to the robotic garden tool, encrypt the first instruction using the first public key to generate an encrypted first instruction, and transmit, via the server device network interface, the encrypted first instruction to the robotic garden tool;

wherein the robotic garden tool electronic processor is further configured to receive, via the robotic garden tool network interface, the encrypted first instruction from the server device, wherein the encrypted first instruction was encrypted by the server device using the first public key, decrypt the encrypted first instruction using the first private key to generate a decrypted first instruction, and control operation of the robotic garden tool in accordance with the decrypted first instruction;

wherein the robotic garden tool electronic processor is further configured to generate a certificate associated with the first public key, transmit the certificate for storage by the server device, receive the certificate from the server device along with the first public key and the encrypted first instruction, and authenticate the certificate before decrypting the encrypted first instruction.

15. The communication system of claim 14, wherein the robotic garden tool is configured to transmit the first public key to an external device, and wherein the server device is configured to receive the first public key from the external device.

16. The communication system of claim 14, wherein the robotic garden tool electronic processor is configured to generate the first key pair and transmit the first public key for storage by the server device in response to one of service of a previous server device being changed to the server device, an expiration of a previously generated public key, a user input indicating that a new key pair should be generated for the robotic garden tool, or receiving an over-the-air (OTA) update from the server device.

* * * * *